Figure 1:
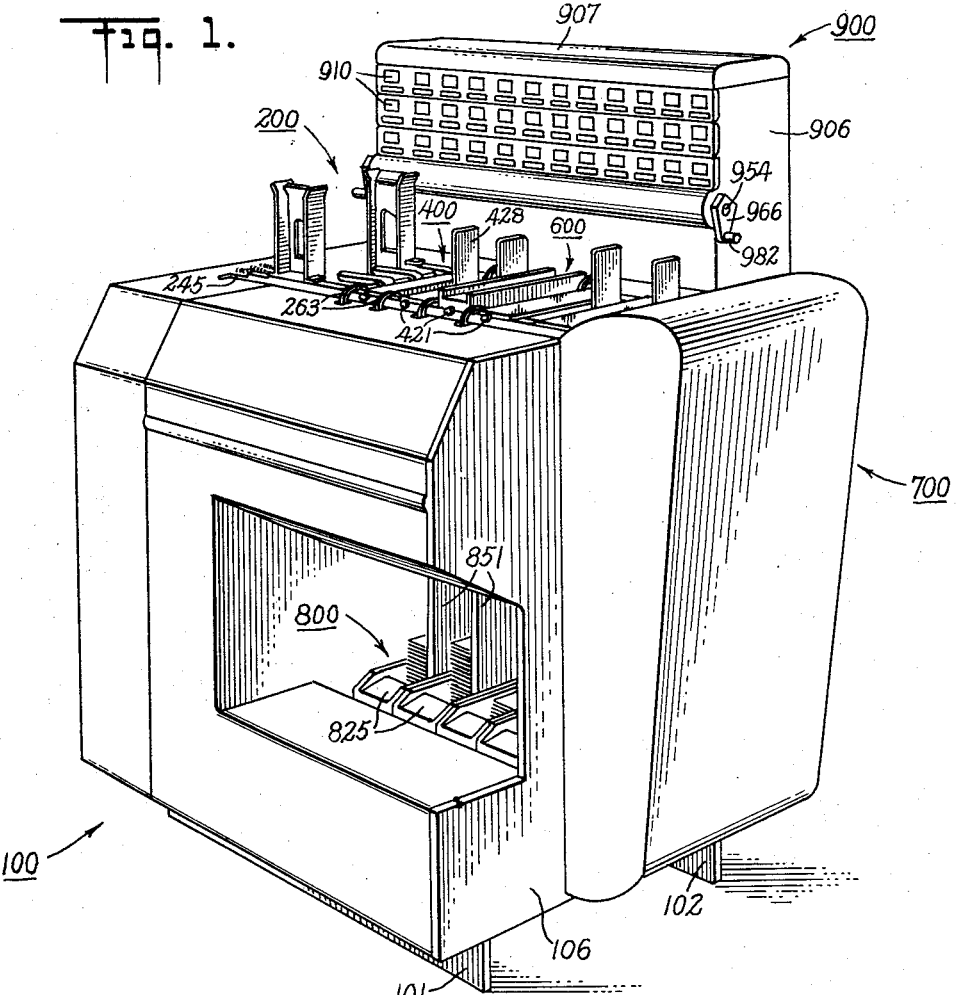

Dec. 25, 1962 W. F. HUCK ET AL 3,070,366
RECORD PROCESSING MACHINE
Filed Jan. 4, 1957 50 Sheets-Sheet 1

INVENTORS
WILLIAM F. HUCK
G. HAMLIN LEONARD
BY
*Curtis Morris + Safford*
ATTORNEYS

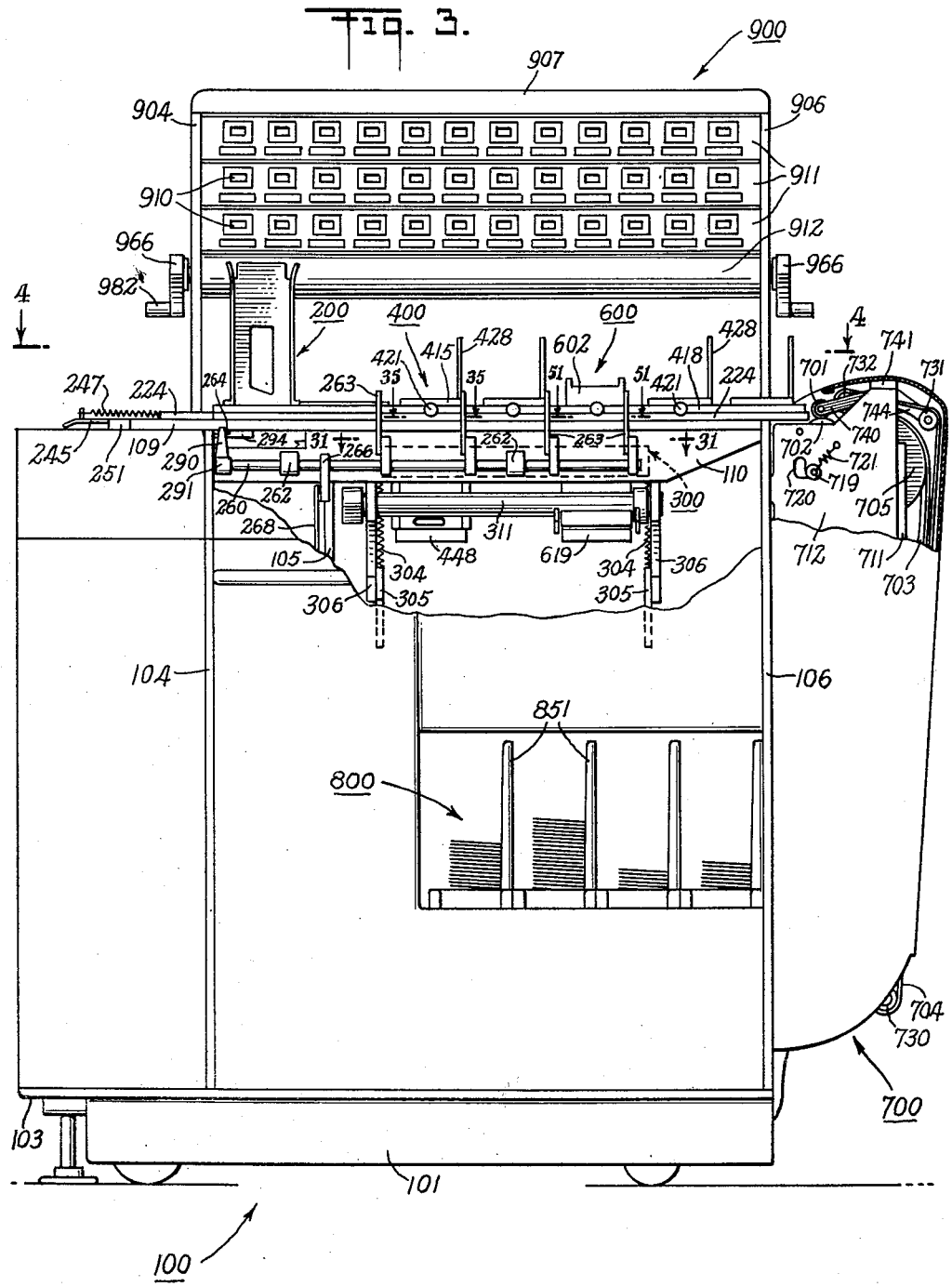

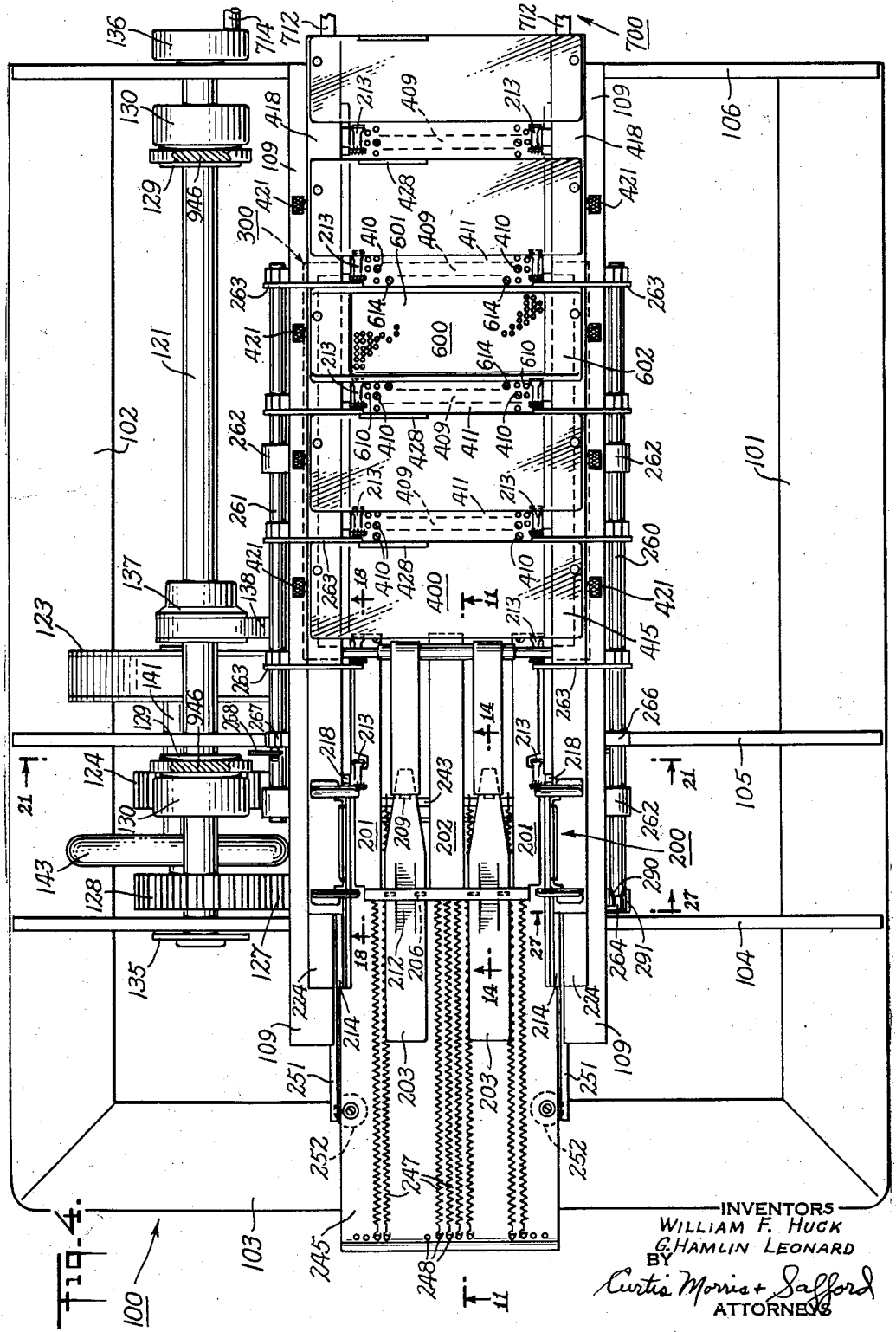

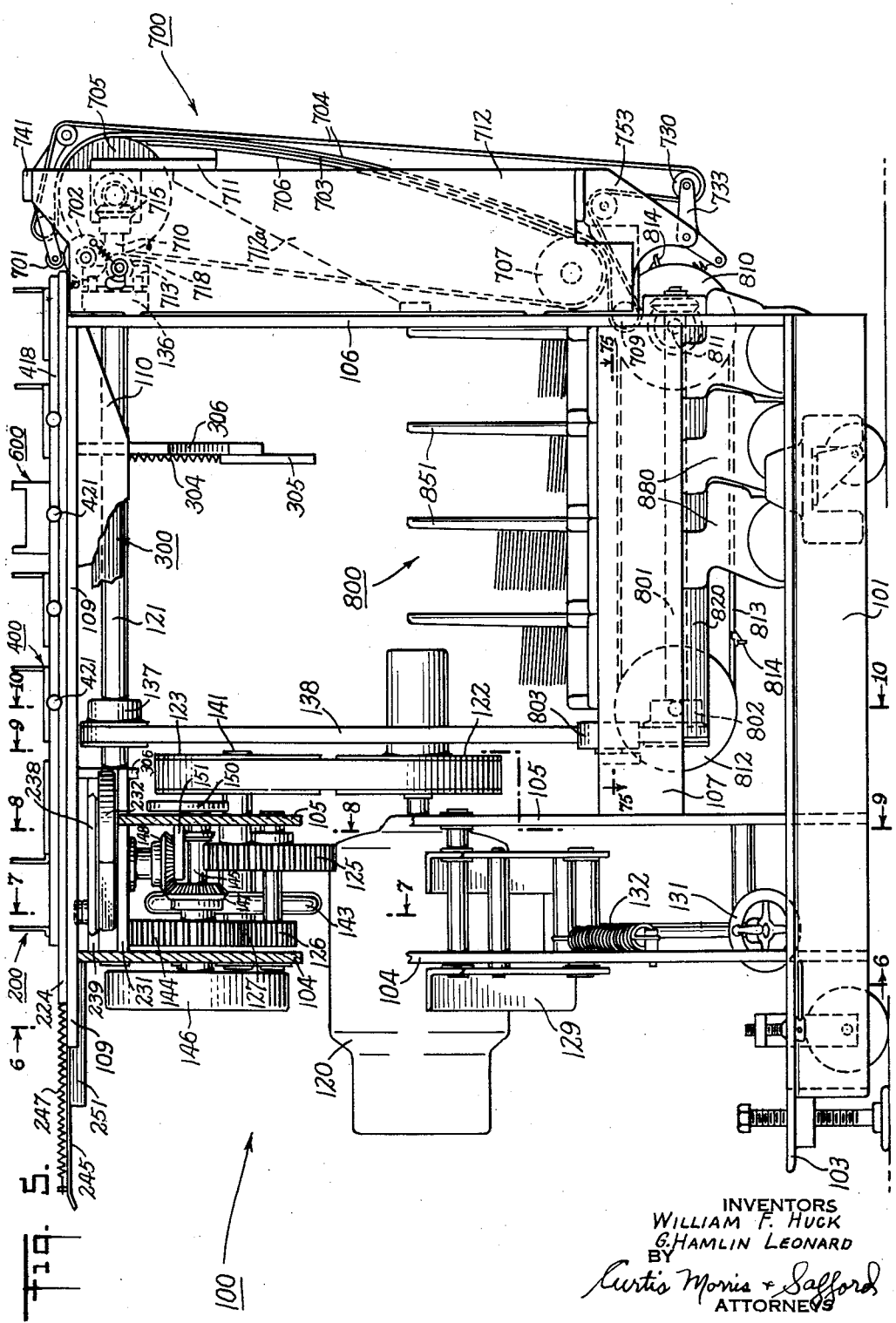

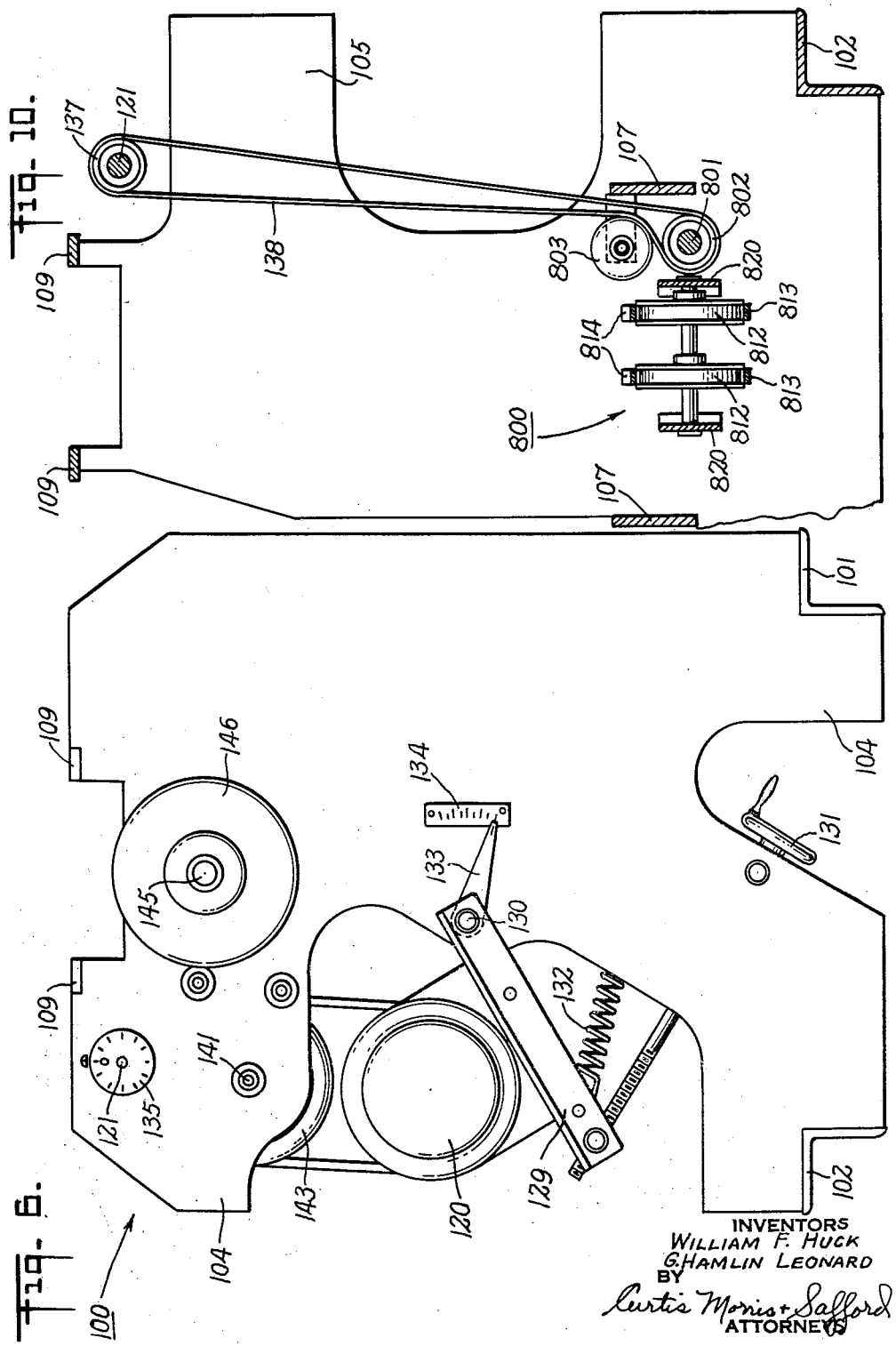

Dec. 25, 1962 W. F. HUCK ET AL 3,070,366
RECORD PROCESSING MACHINE
Filed Jan. 4, 1957 50 Sheets-Sheet 6
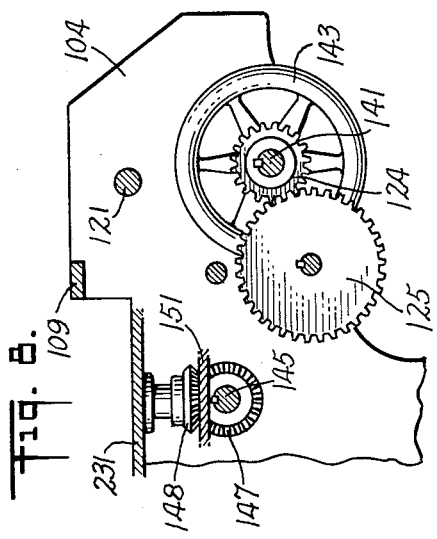
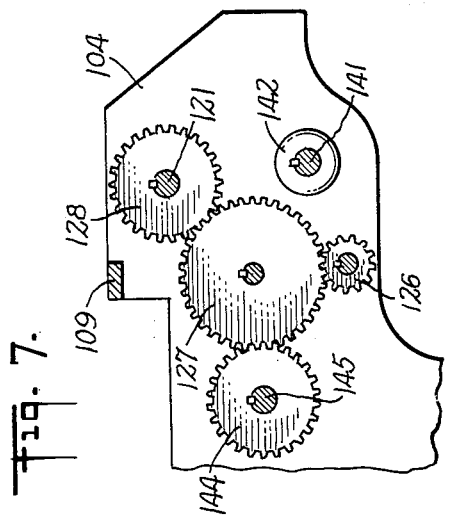
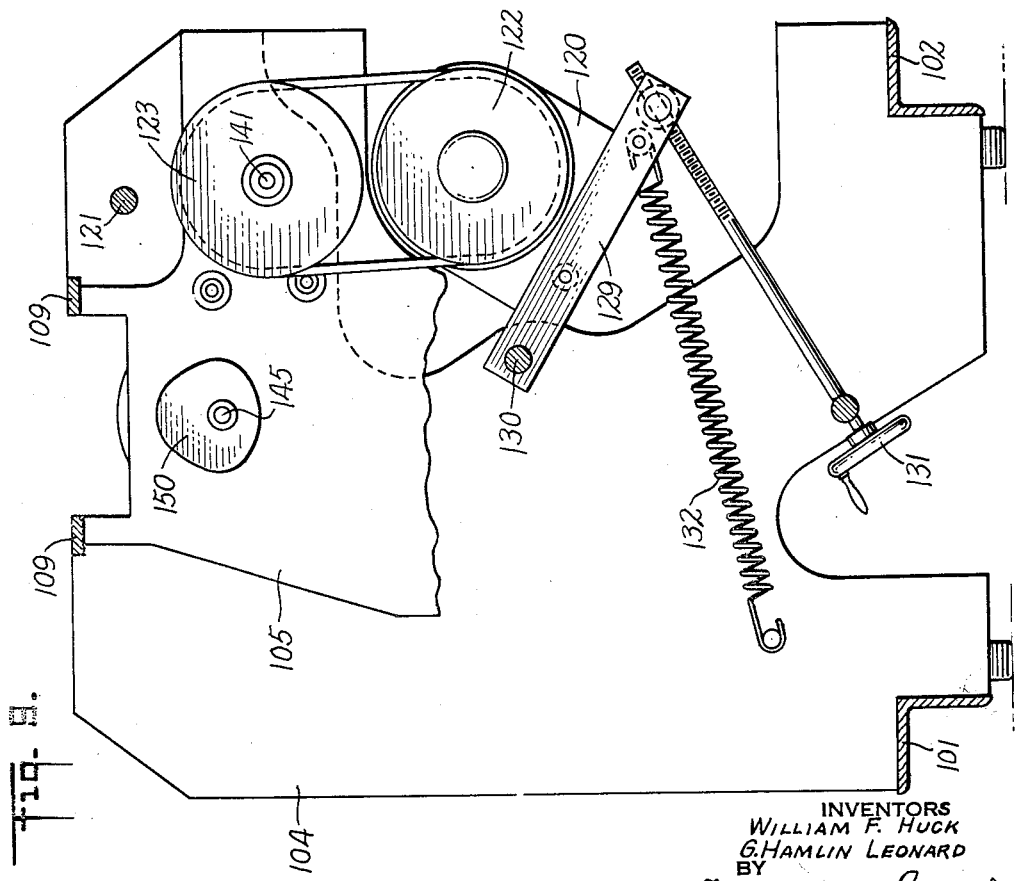
INVENTORS
WILLIAM F. HUCK
G. HAMLIN LEONARD
BY
Curtis Morris + Safford
ATTORNEYS

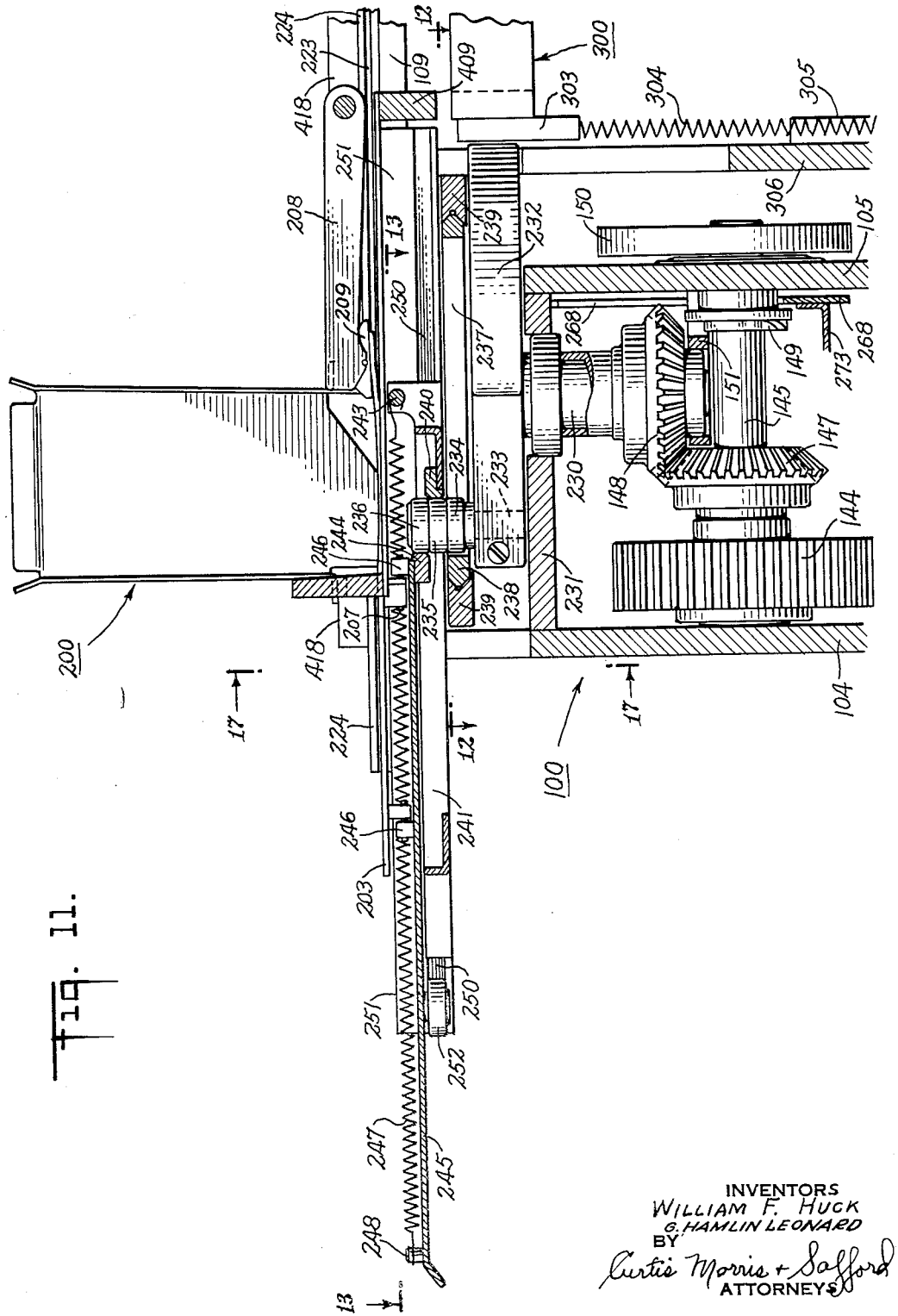

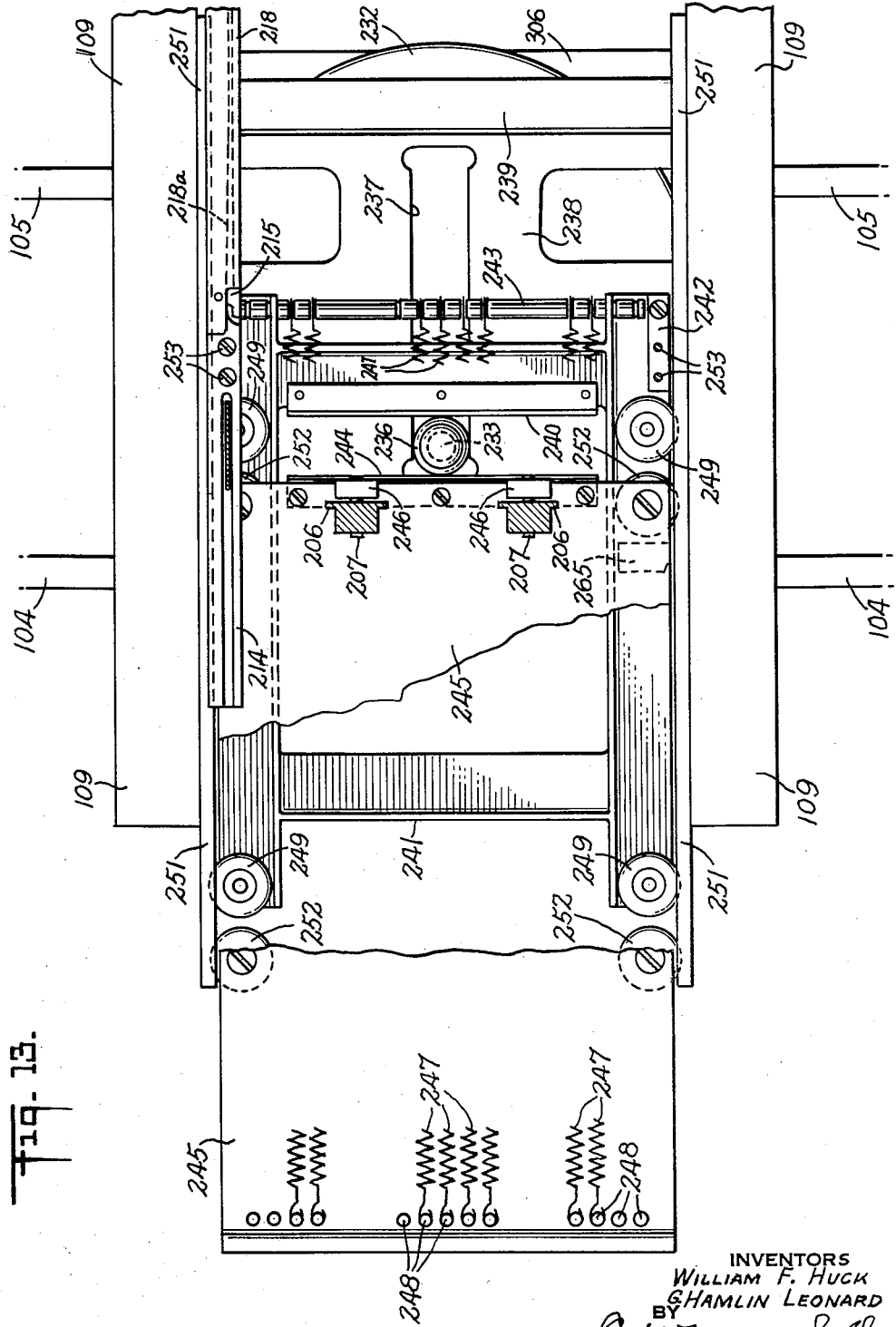

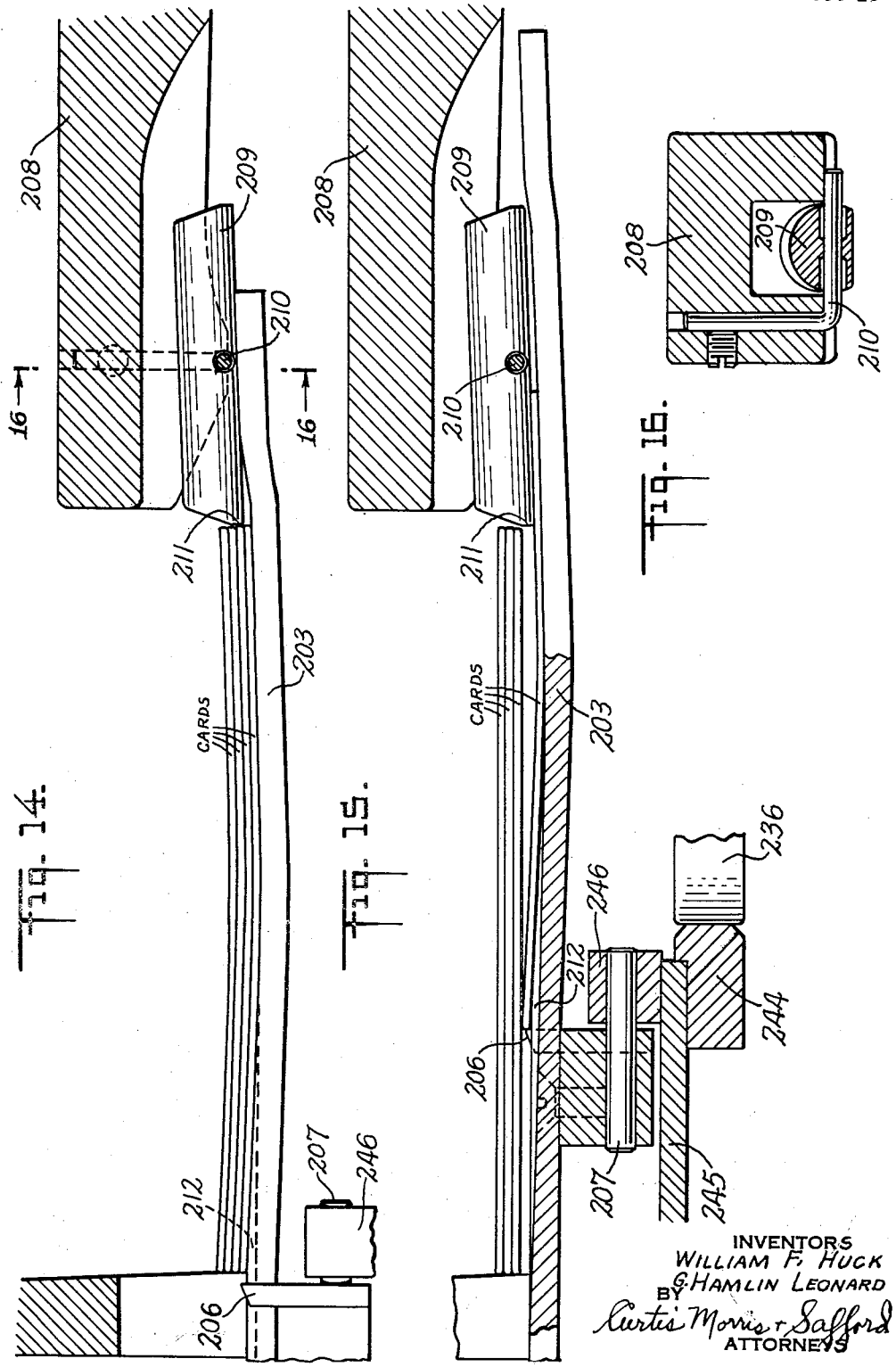

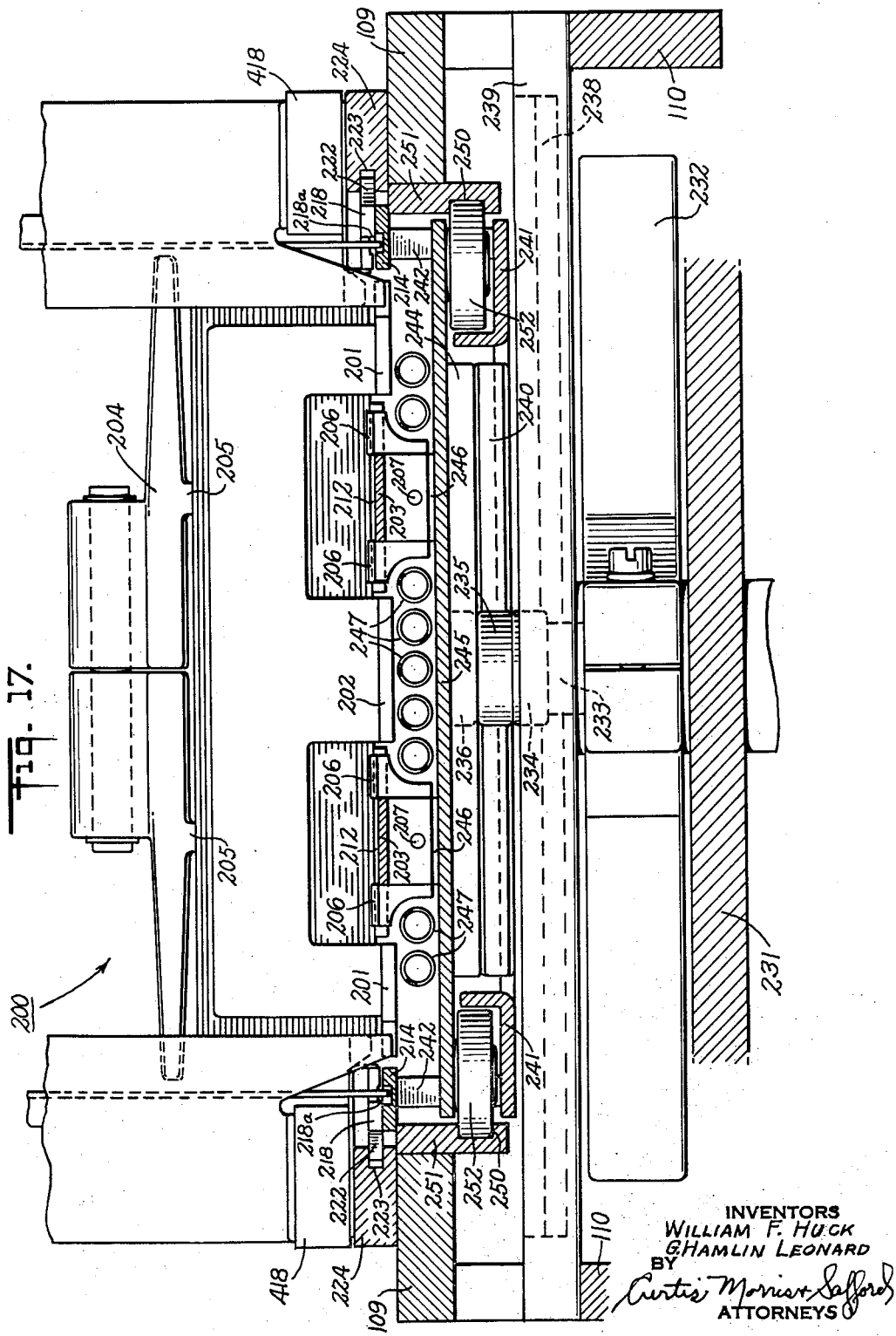

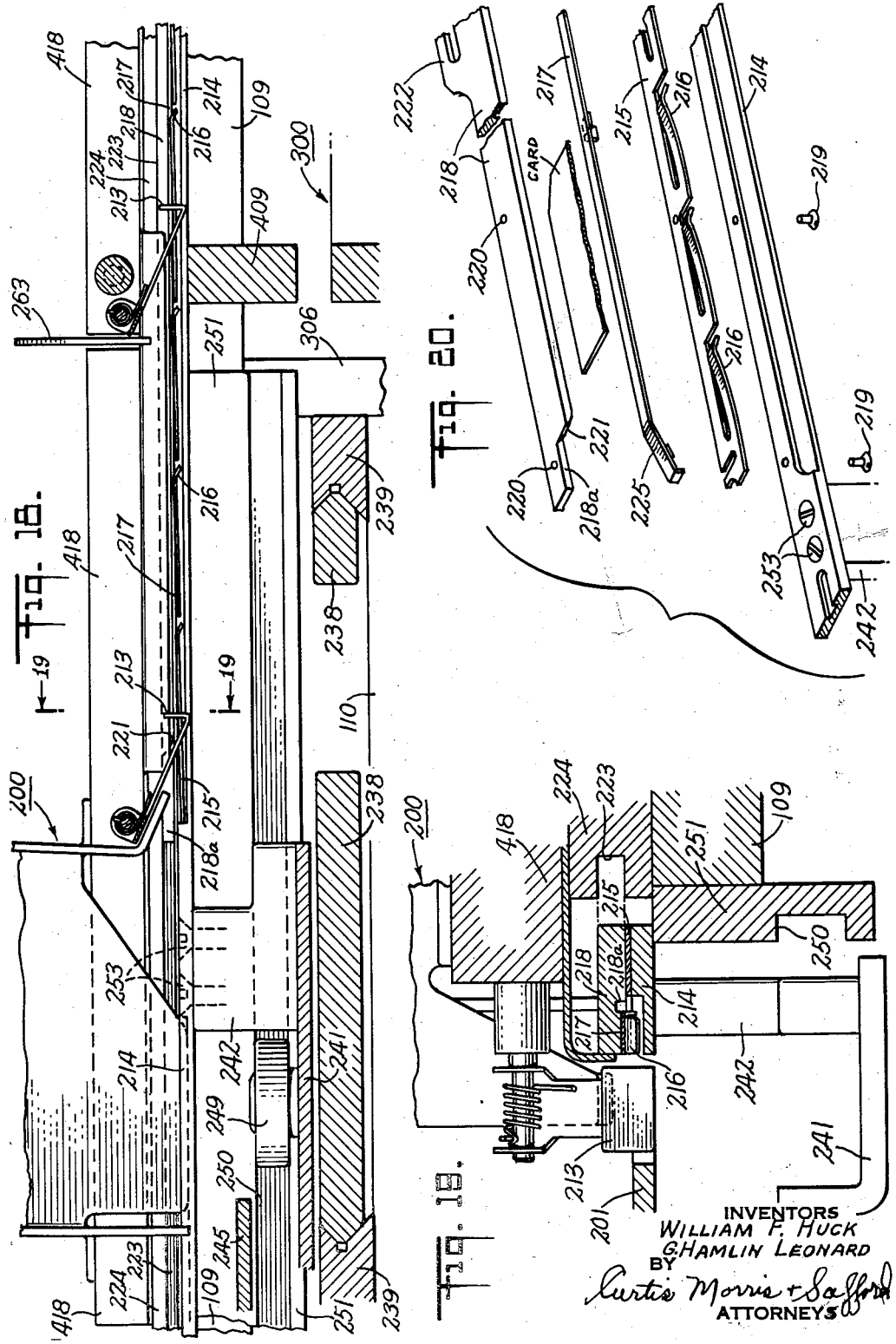

Dec. 25, 1962 — W. F. HUCK ET AL — 3,070,366
RECORD PROCESSING MACHINE
Filed Jan. 4, 1957 — 50 Sheets-Sheet 13
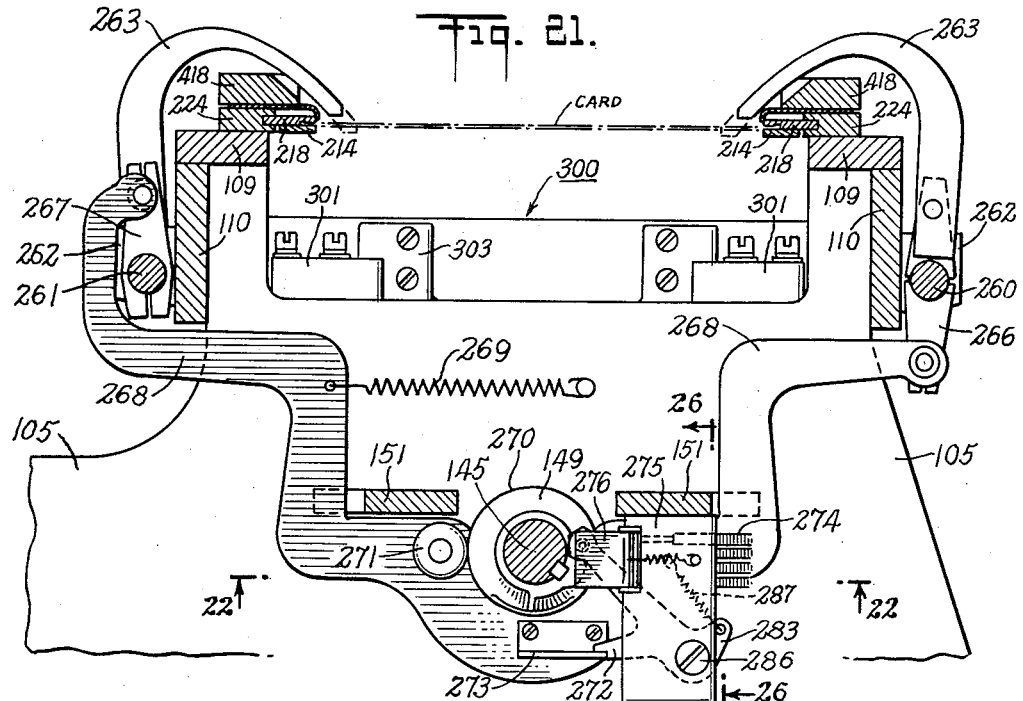
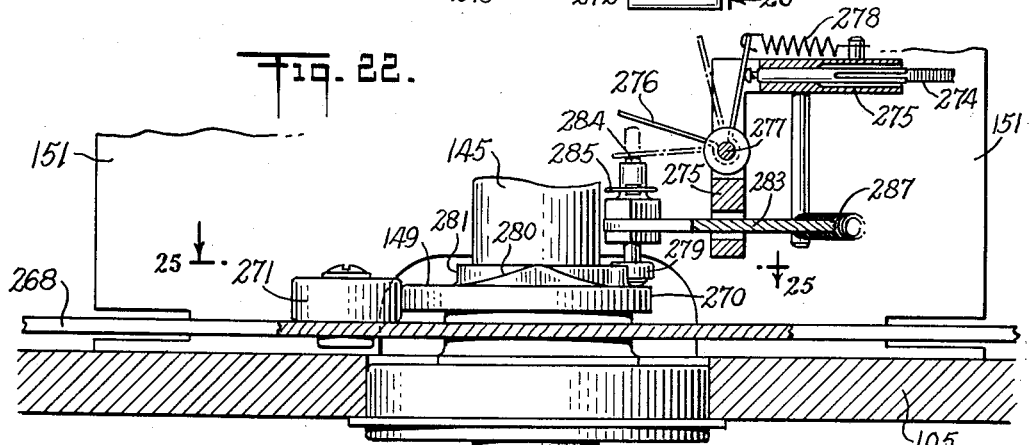
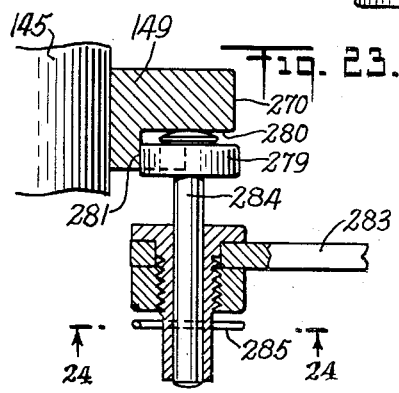
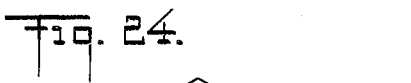
INVENTORS
WILLIAM F. HUCK
G. HAMLIN LEONARD
BY
Curtis, Morris & Safford
ATTORNEYS Dec. 25, 1962 W. F. HUCK ET AL 3,070,366
RECORD PROCESSING MACHINE
Filed Jan. 4, 1957 50 Sheets-Sheet 14

INVENTORS
WILLIAM F. HUCK
G. HAMLIN LEONARD
BY
Curtis Morris Safford
ATTORNEYS

Dec. 25, 1962   W. F. HUCK ET AL   3,070,366
RECORD PROCESSING MACHINE
Filed Jan. 4, 1957   50 Sheets-Sheet 15
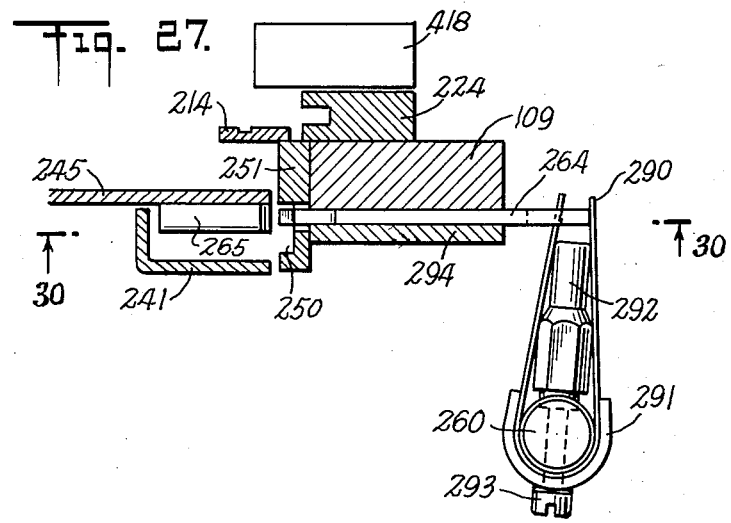
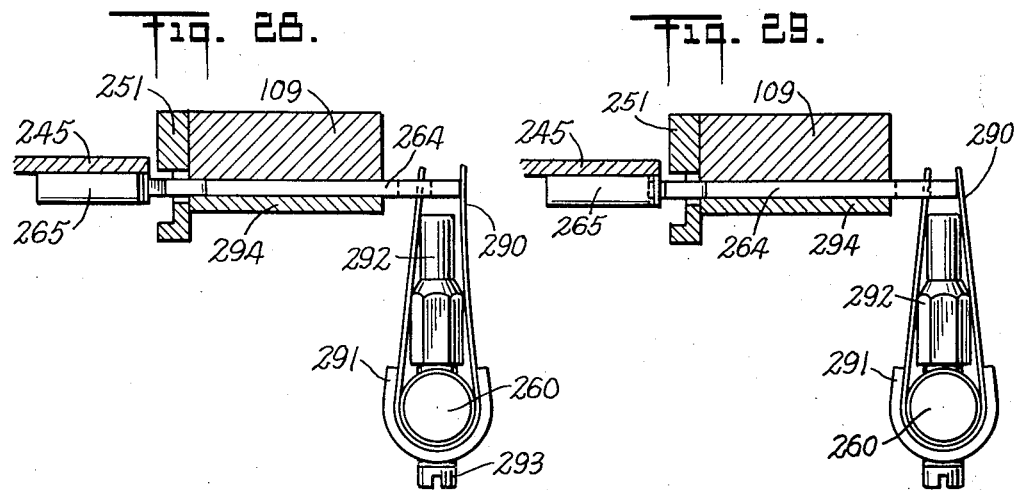
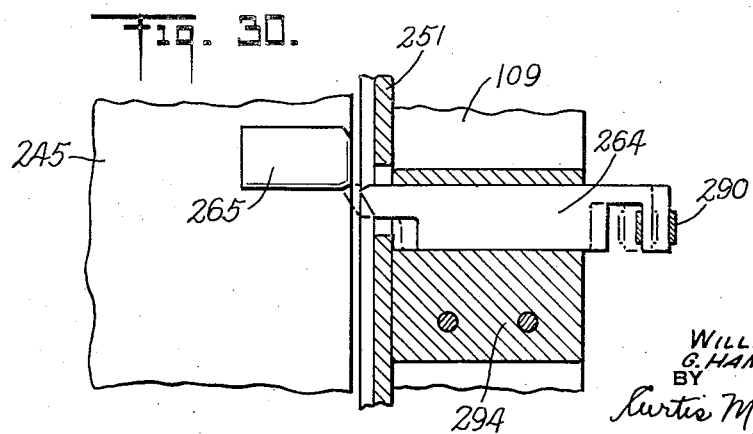
INVENTORS
WILLIAM F. HUCK
G. HAMLIN LEONARD
BY
Curtis Morris & Safford
ATTORNEYS

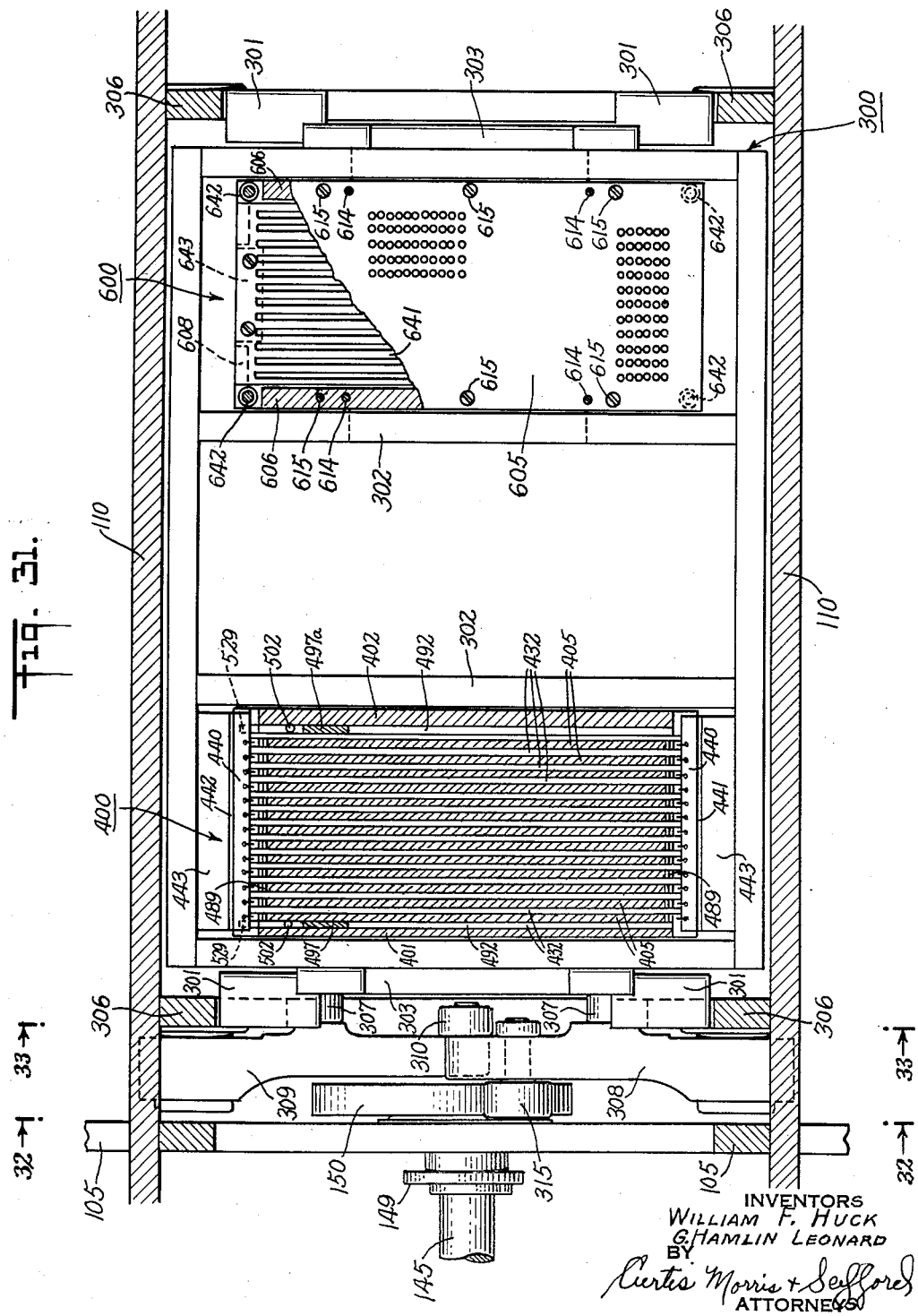

Dec. 25, 1962  W. F. HUCK ET AL  3,070,366
RECORD PROCESSING MACHINE
Filed Jan. 4, 1957  50 Sheets-Sheet 17

INVENTORS
WILLIAM F. HUCK
G. HAMLIN LEONARD
BY
Curtis Morris Safford
ATTORNEYS

Dec. 25, 1962 W. F. HUCK ET AL 3,070,366
RECORD PROCESSING MACHINE
Filed Jan. 4, 1957 50 Sheets-Sheet 19

INVENTORS
WILLIAM F. HUCK
G. HAMLIN LEONARD
BY
Curtis, Morris & Safford
ATTORNEYS

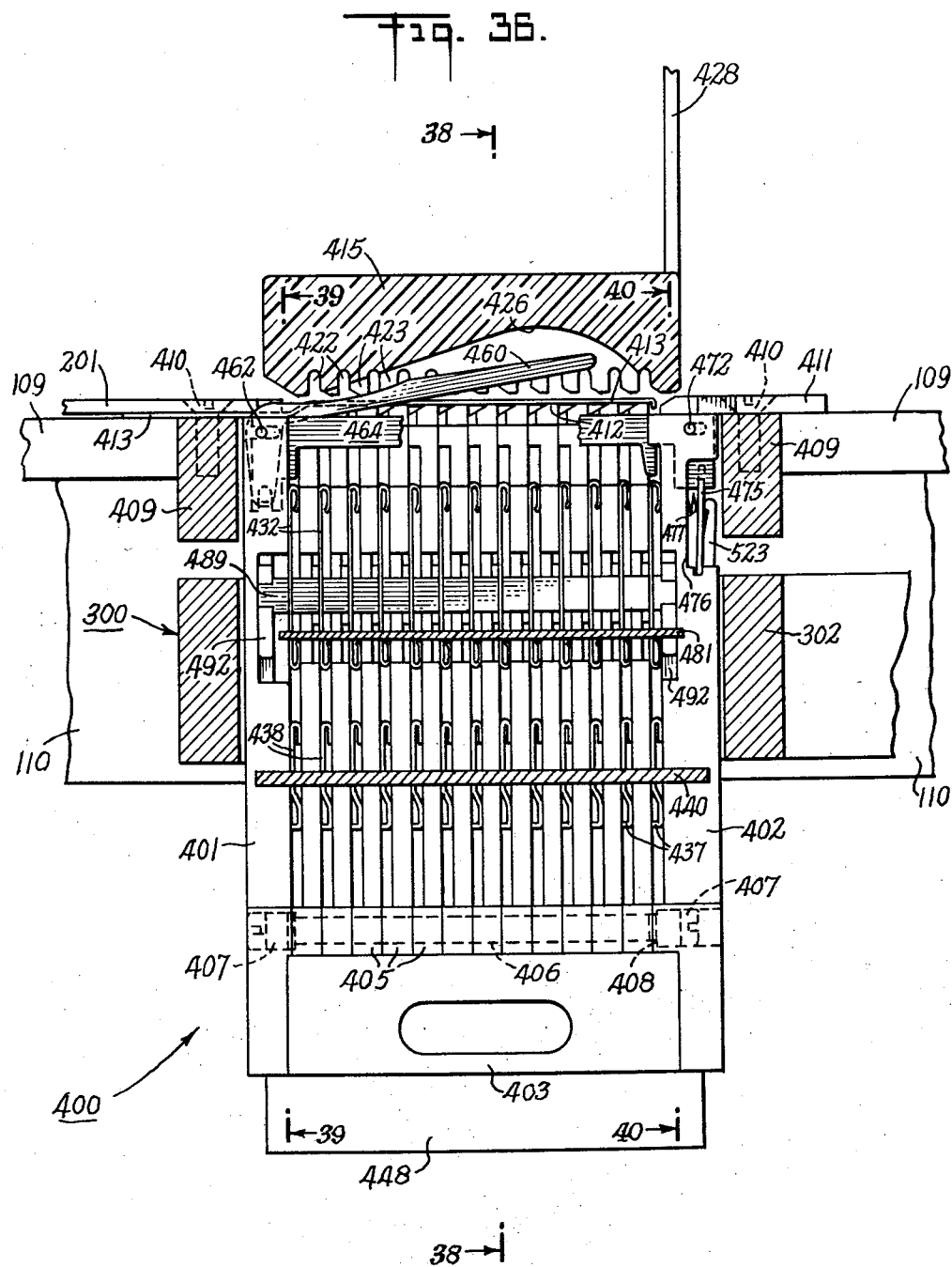

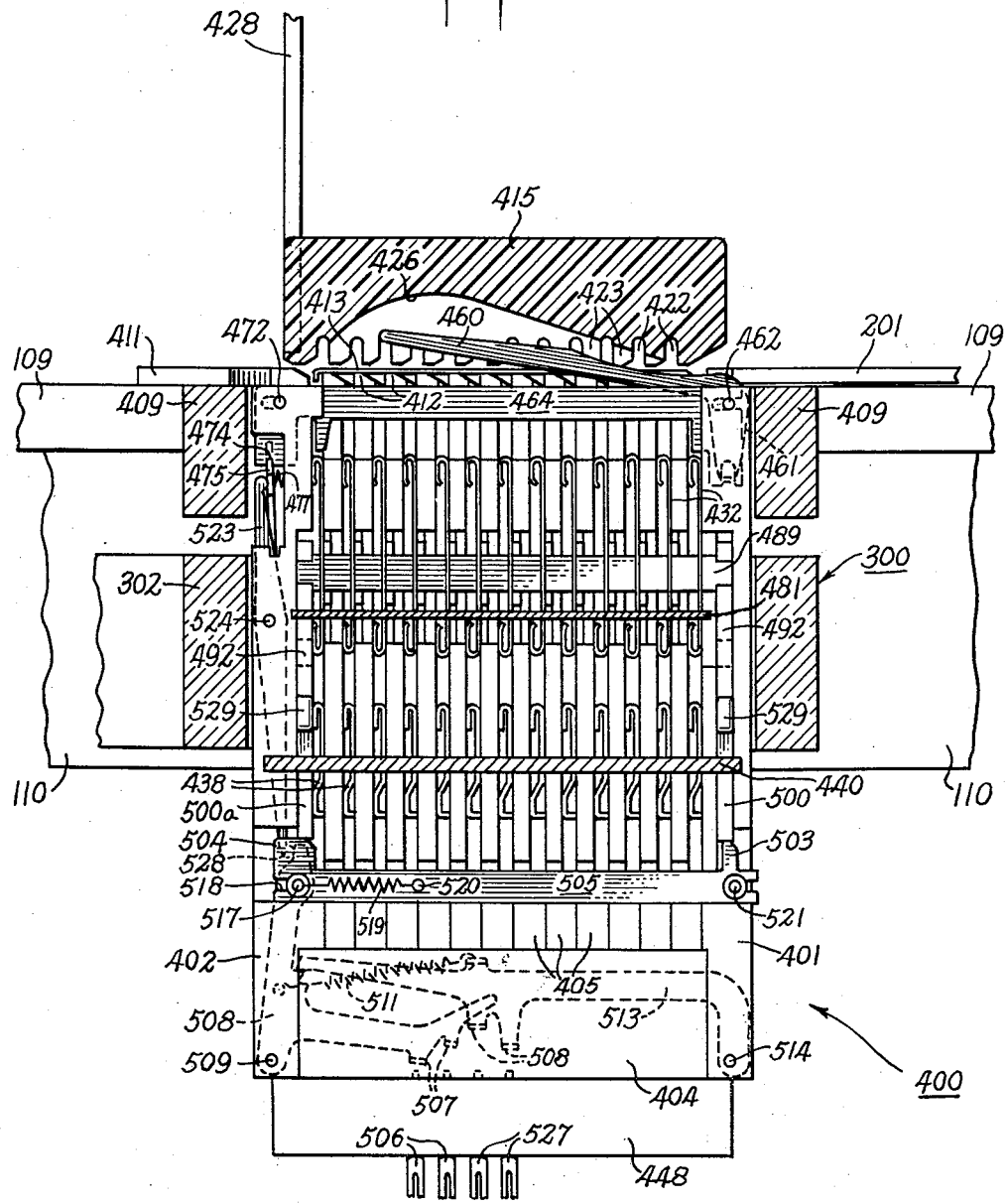

Dec. 25, 1962 W. F. HUCK ET AL 3,070,366
RECORD PROCESSING MACHINE
Filed Jan. 4, 1957 50 Sheets-Sheet 22

INVENTORS
WILLIAM F. HUCK
G. HAMLIN LEONARD
BY
Curtis Morris & Safford
ATTORNEYS Dec. 25, 1962  W. F. HUCK ET AL  3,070,366
RECORD PROCESSING MACHINE
Filed Jan. 4, 1957  50 Sheets-Sheet 23

INVENTORS
WILLIAM F. HUCK
G. HAMLIN LEONARD
BY
Curtis Morris & Safford
ATTORNEYS

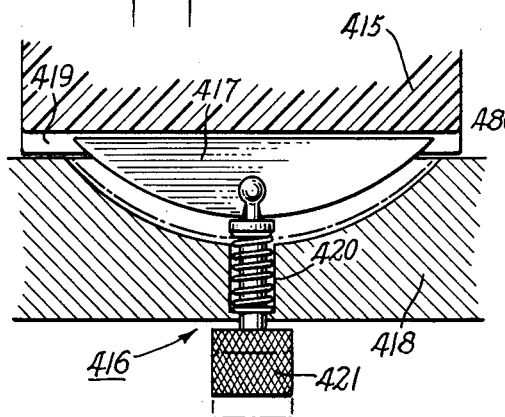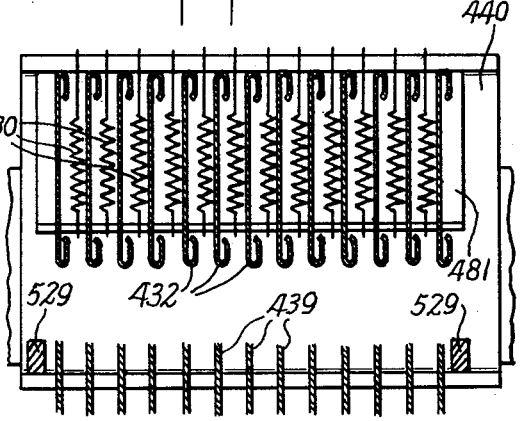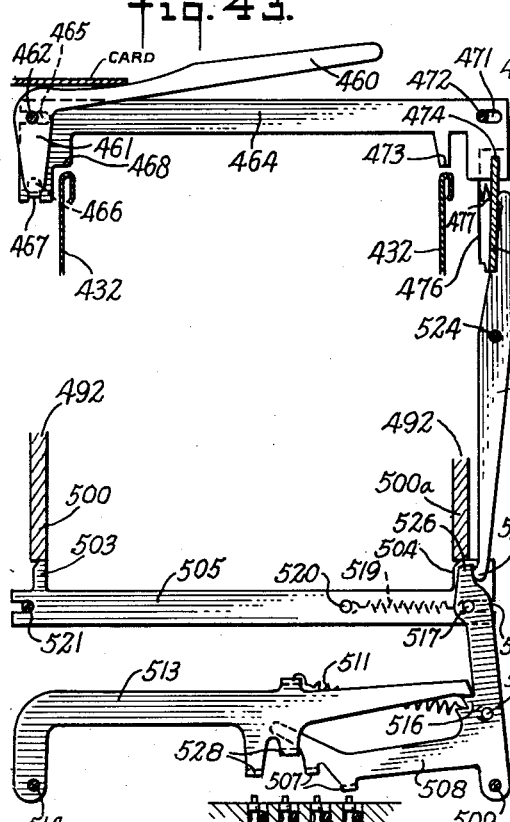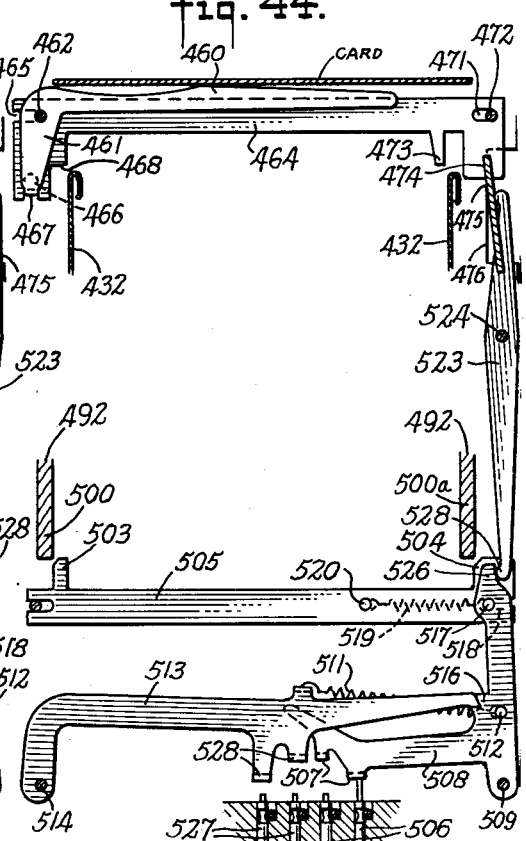

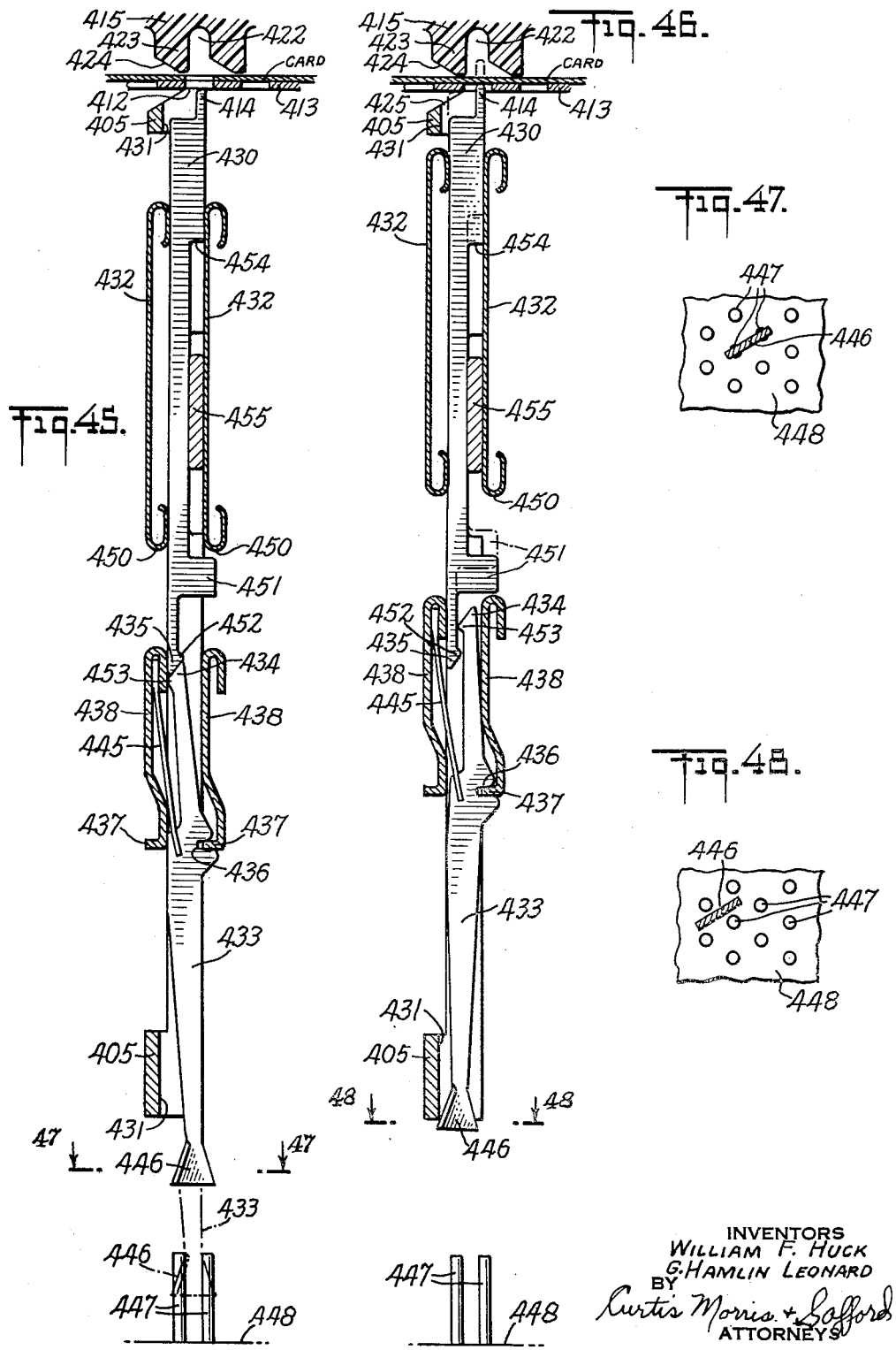

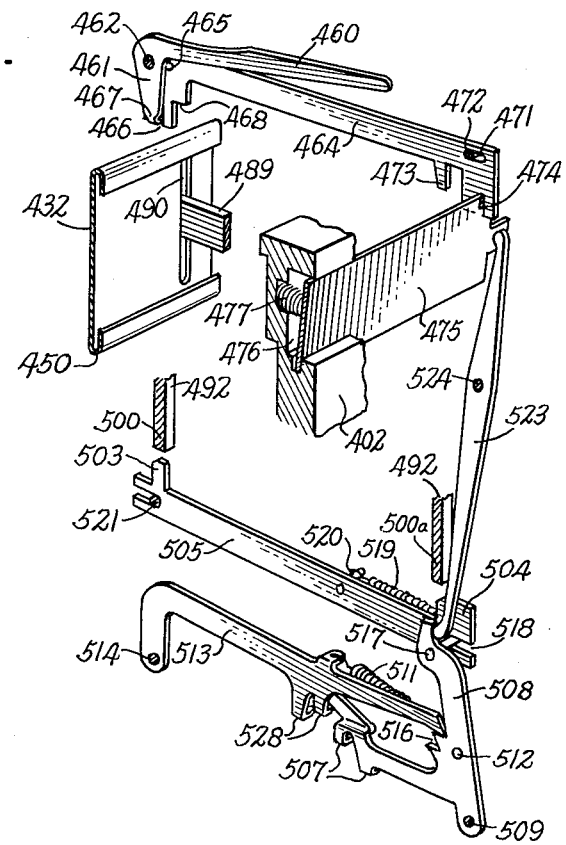

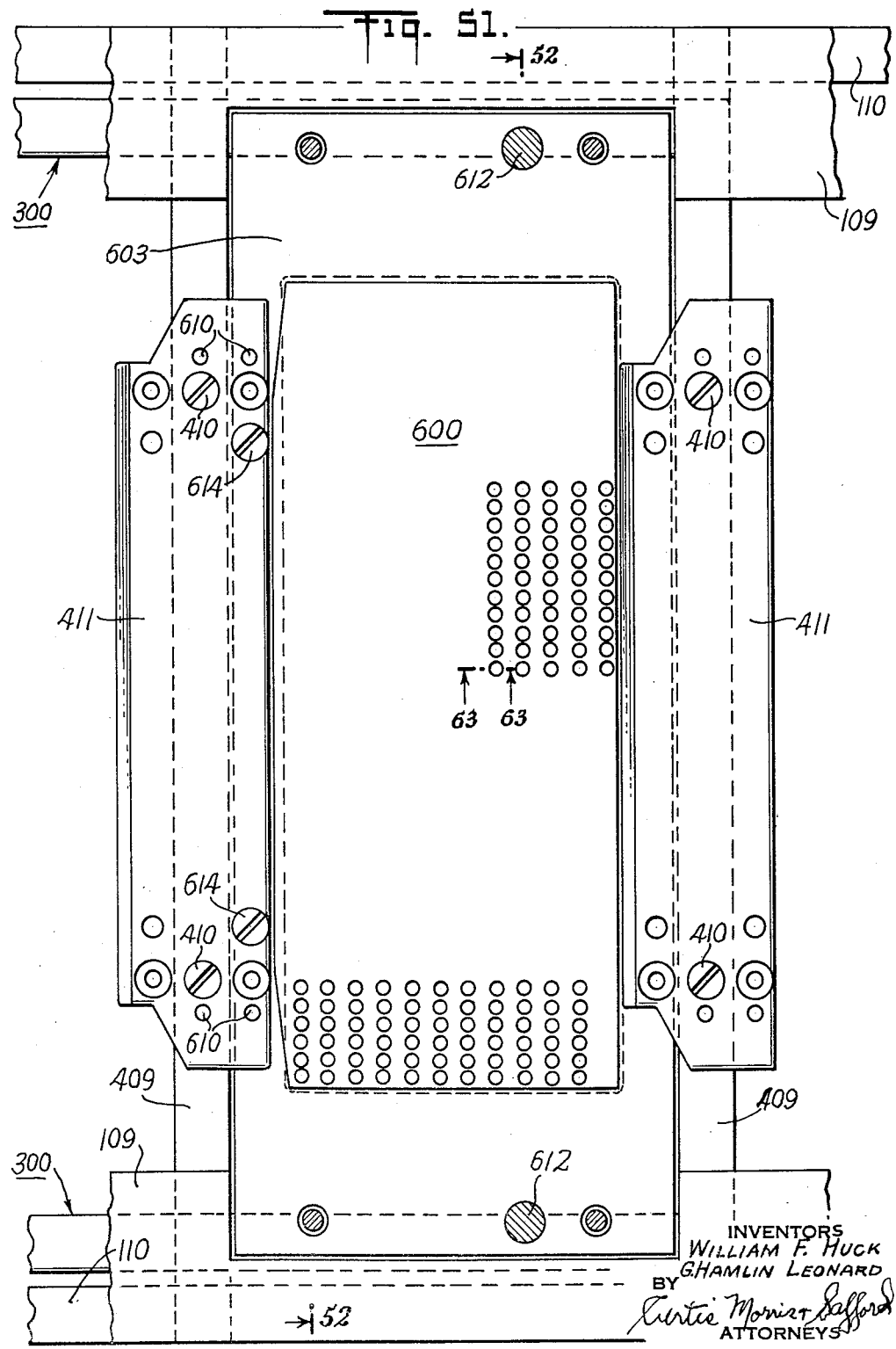

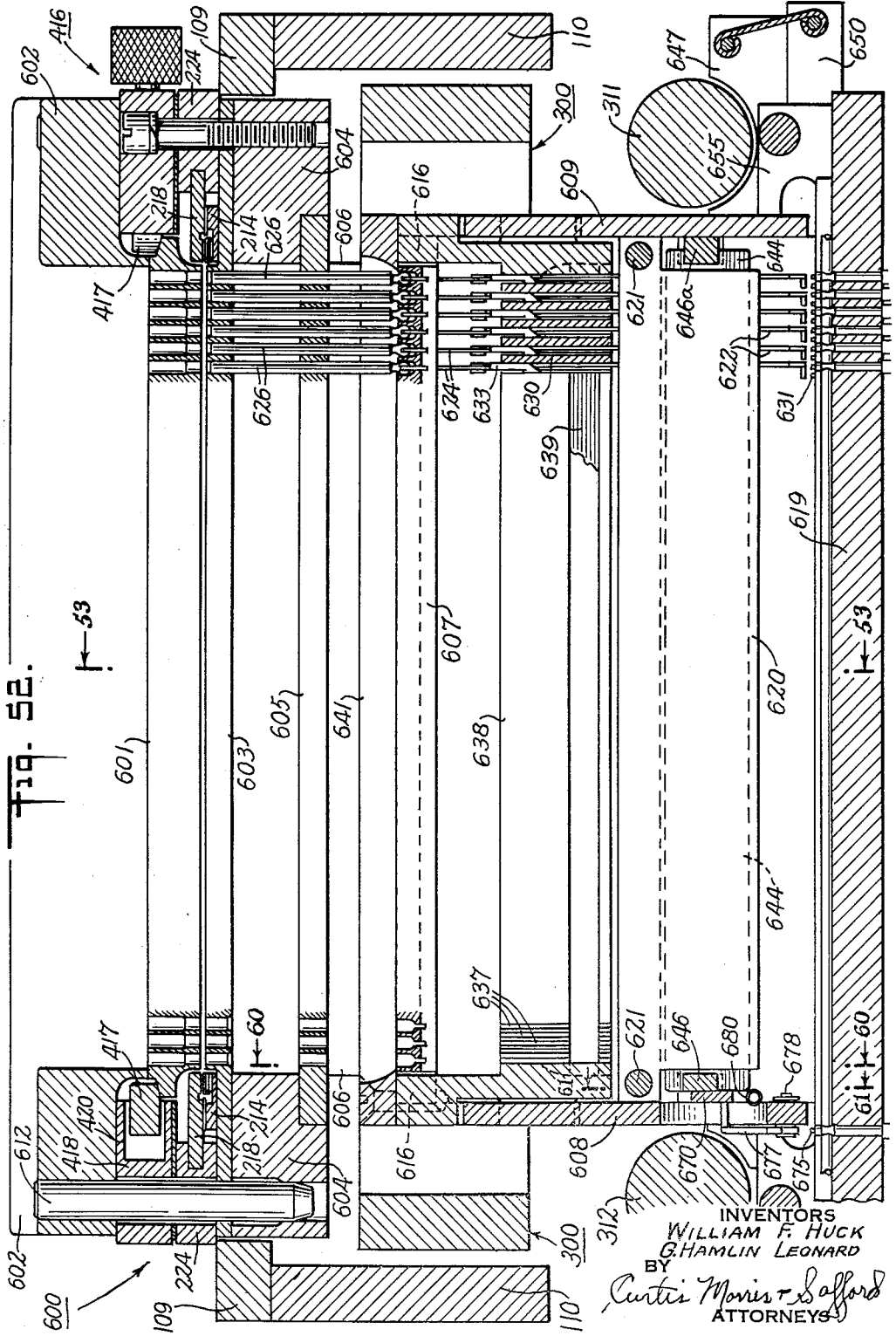

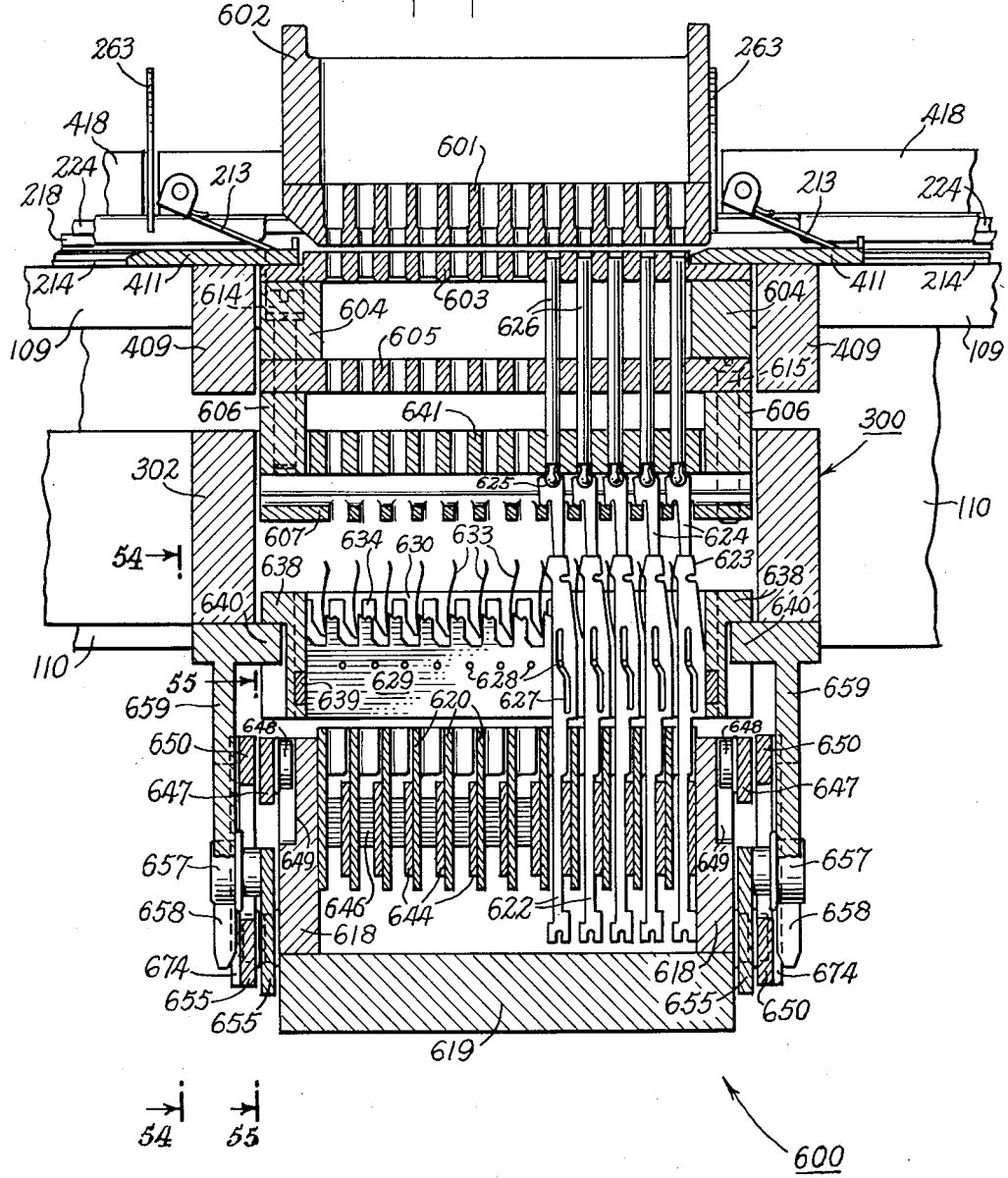

Dec. 25, 1962  W. F. HUCK ET AL  3,070,366
RECORD PROCESSING MACHINE
Filed Jan. 4, 1957  50 Sheets-Sheet 30
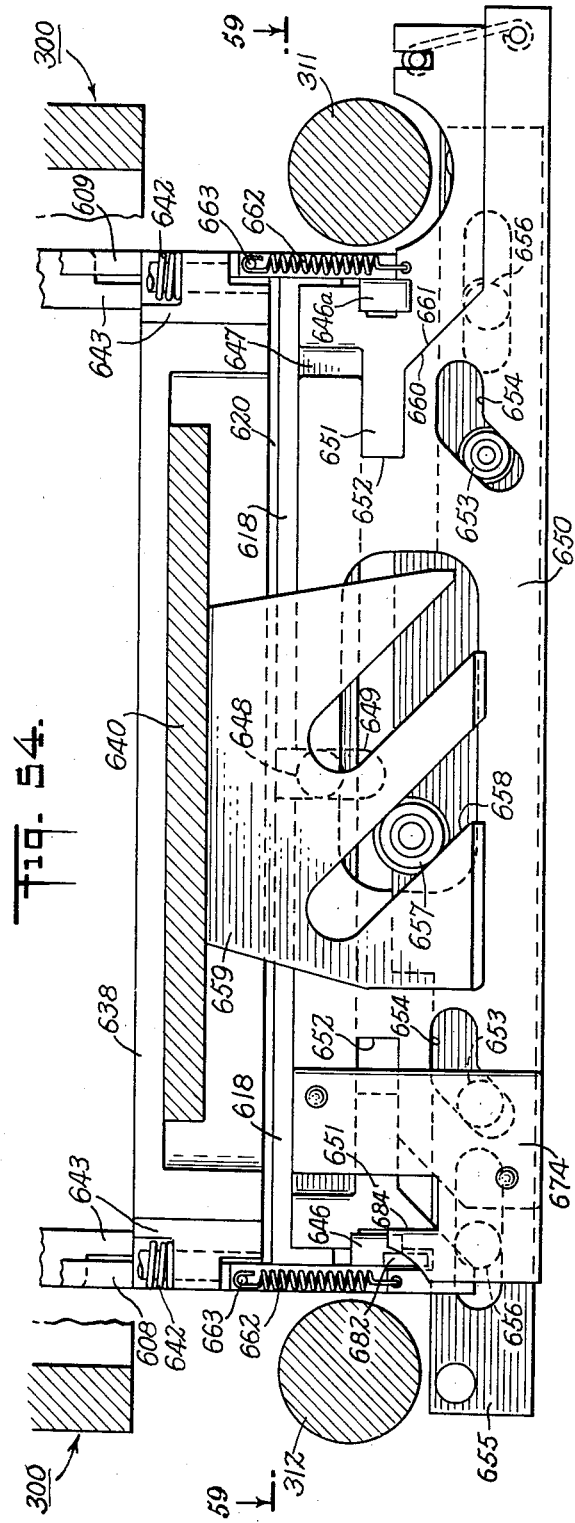
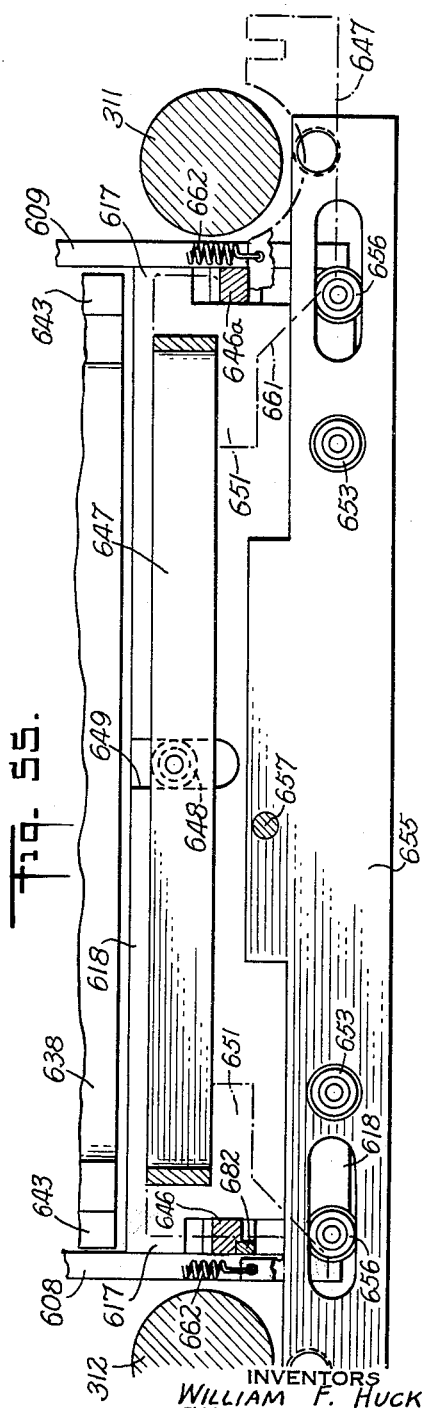
INVENTORS
WILLIAM F. HUCK
G. HAMLIN LEONARD
BY
Curtis Morris & Safford
ATTORNEYS

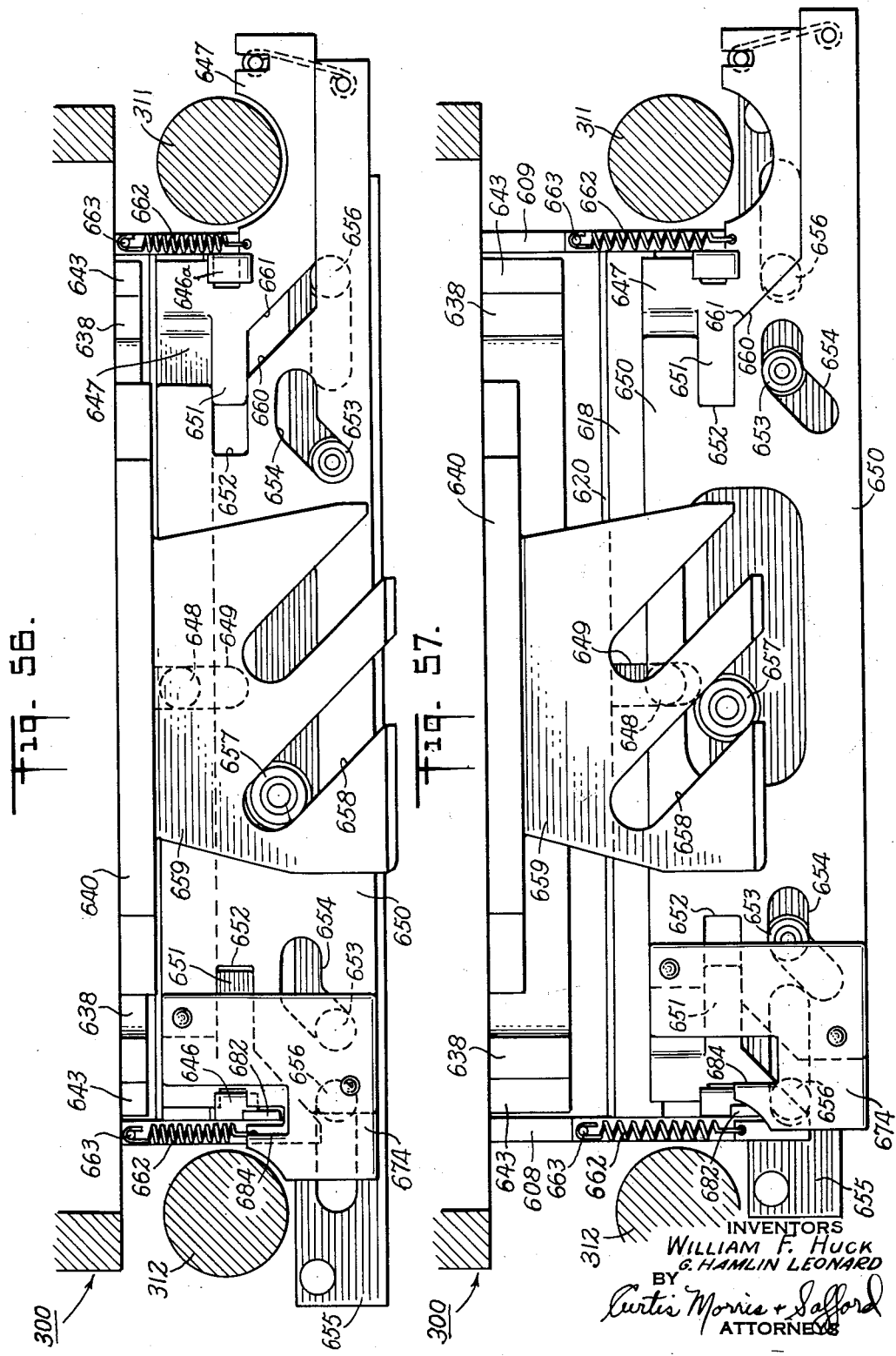

Dec. 25, 1962 W. F. HUCK ET AL 3,070,366
RECORD PROCESSING MACHINE
Filed Jan. 4, 1957 50 Sheets-Sheet 32

INVENTORS
WILLIAM F. HUCK
G. HAMLIN LEONARD
BY
Curtis Morris + Safford
ATTORNEYS Dec. 25, 1962  W. F. HUCK ET AL  3,070,366
RECORD PROCESSING MACHINE
Filed Jan. 4, 1957  50 Sheets-Sheet 33
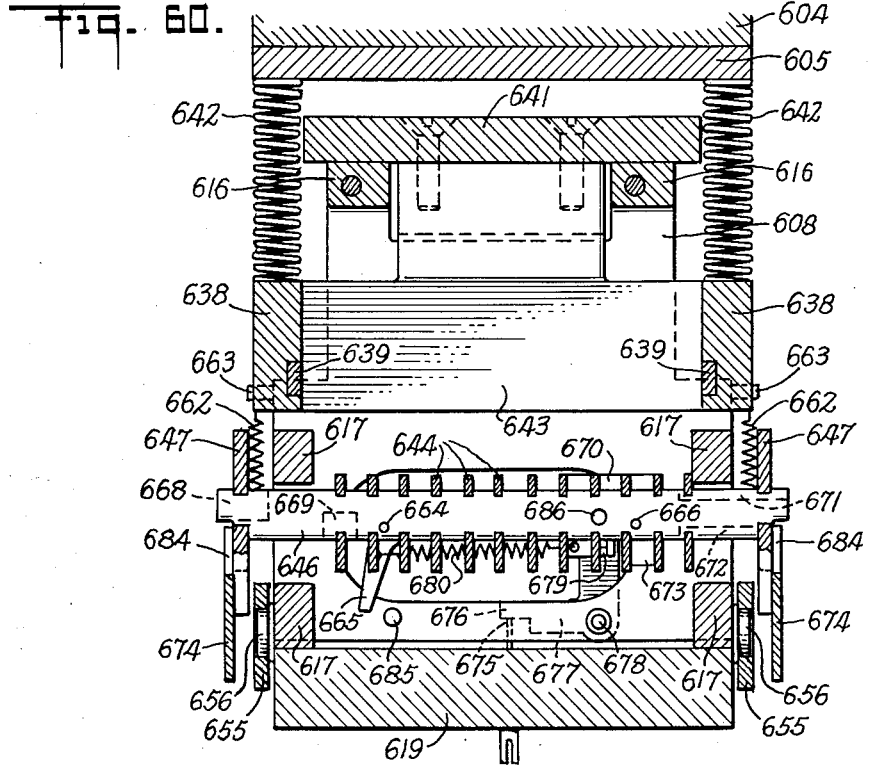
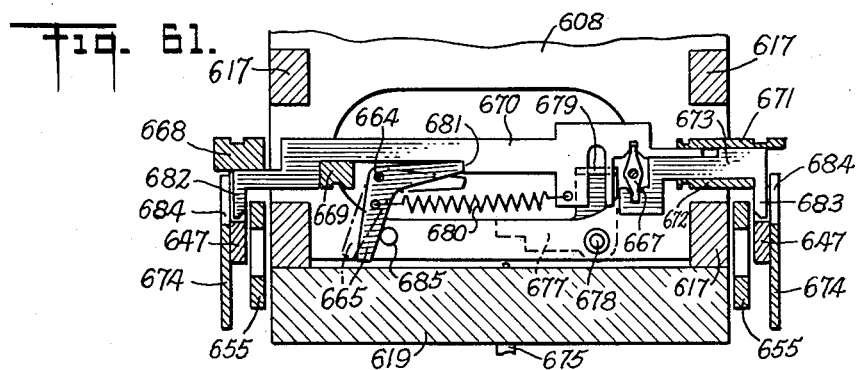
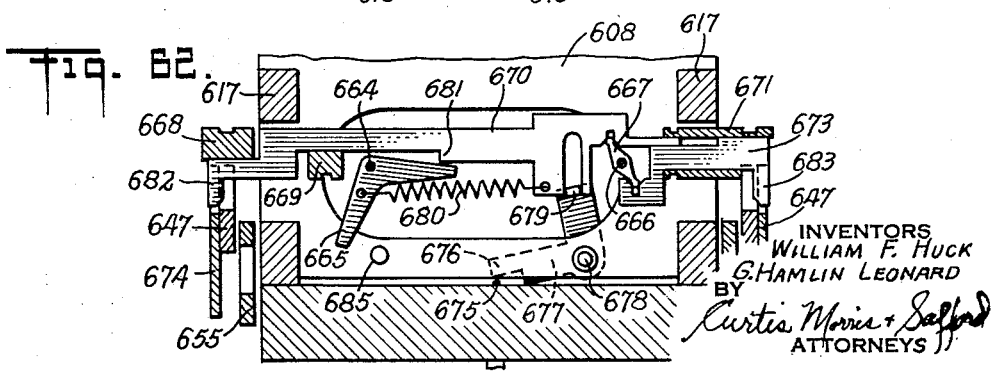
INVENTORS
WILLIAM F. HUCK
G. HAMLIN LEONARD
BY
Curtis, Morris + Safford
ATTORNEYS

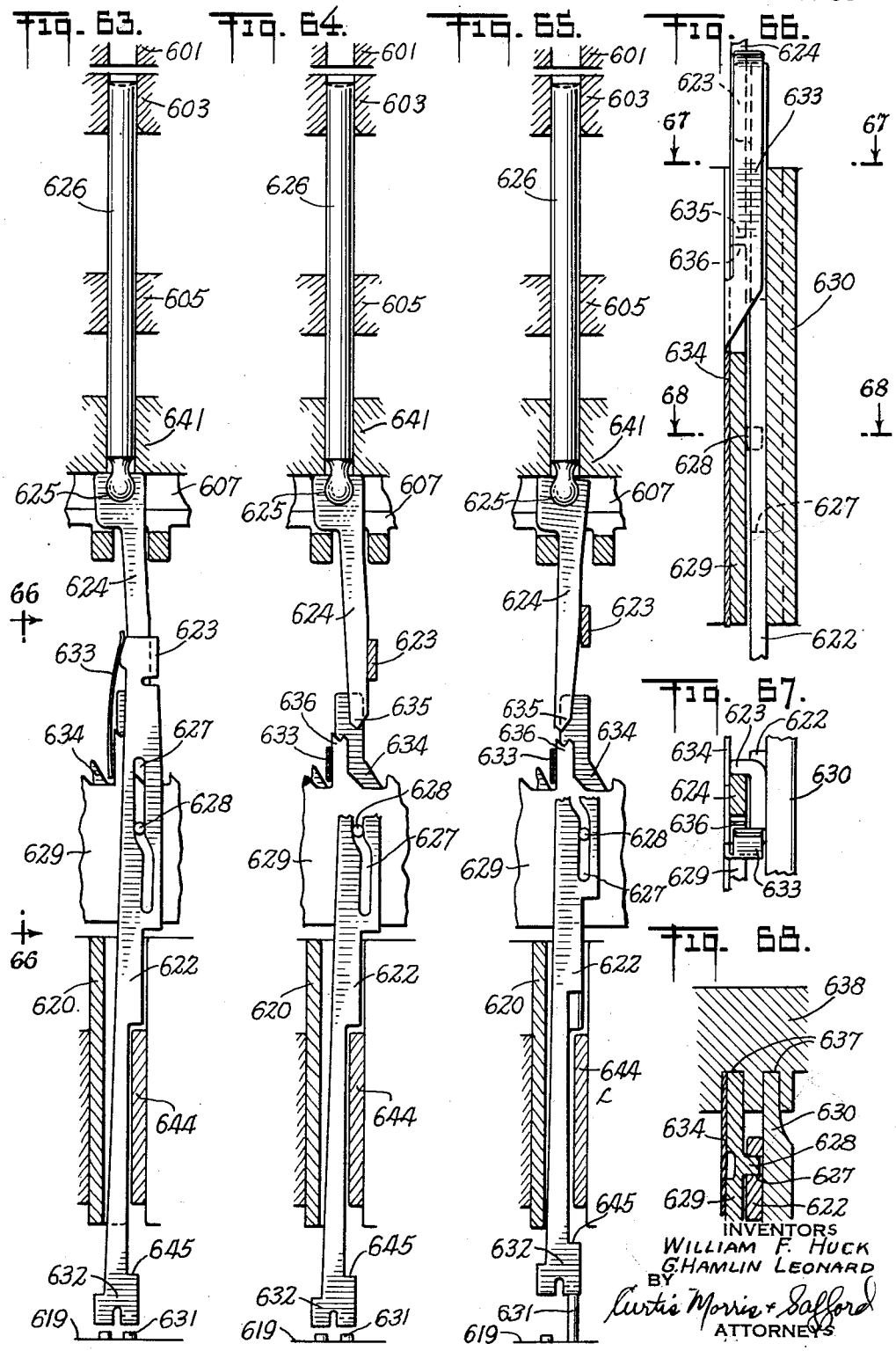

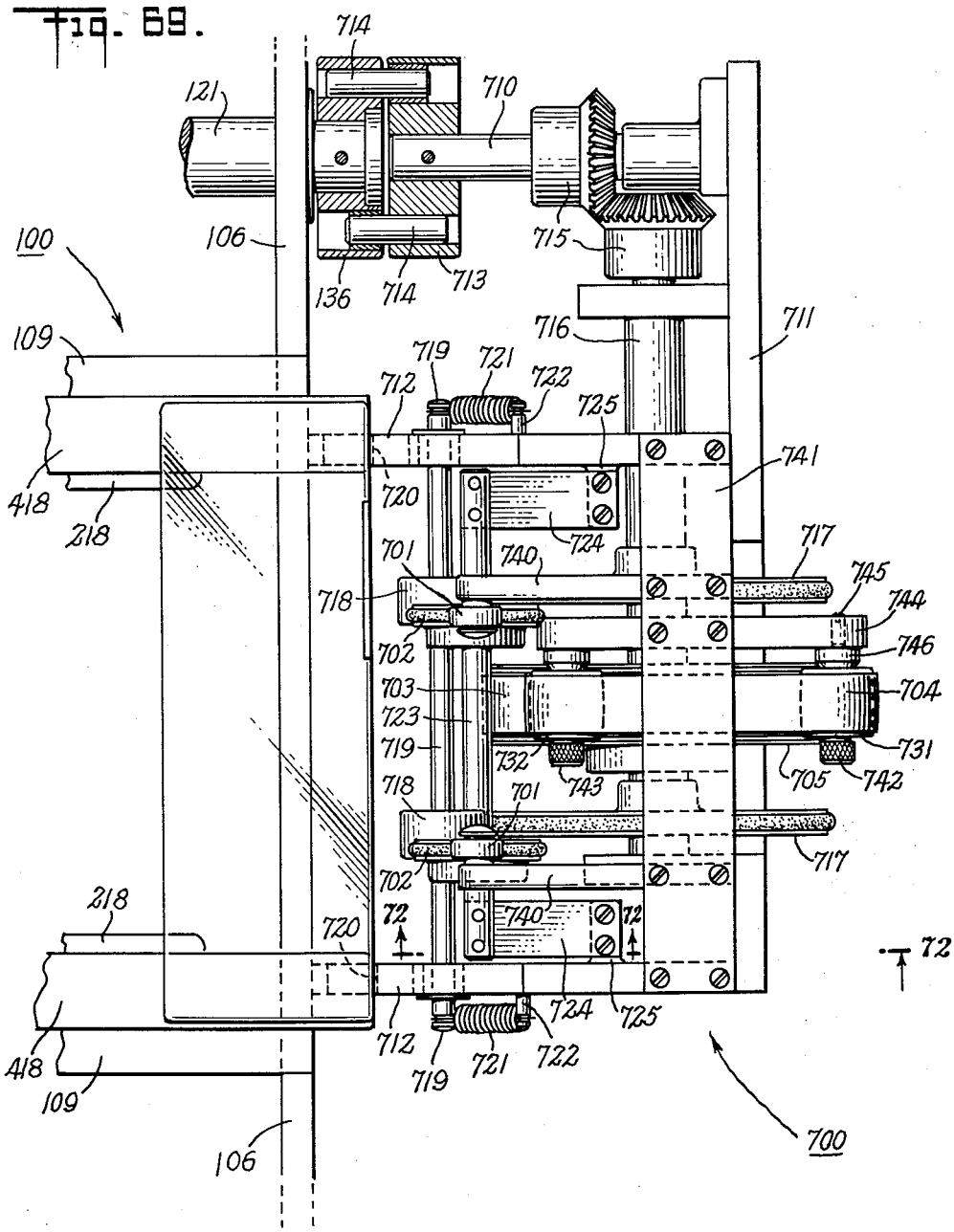

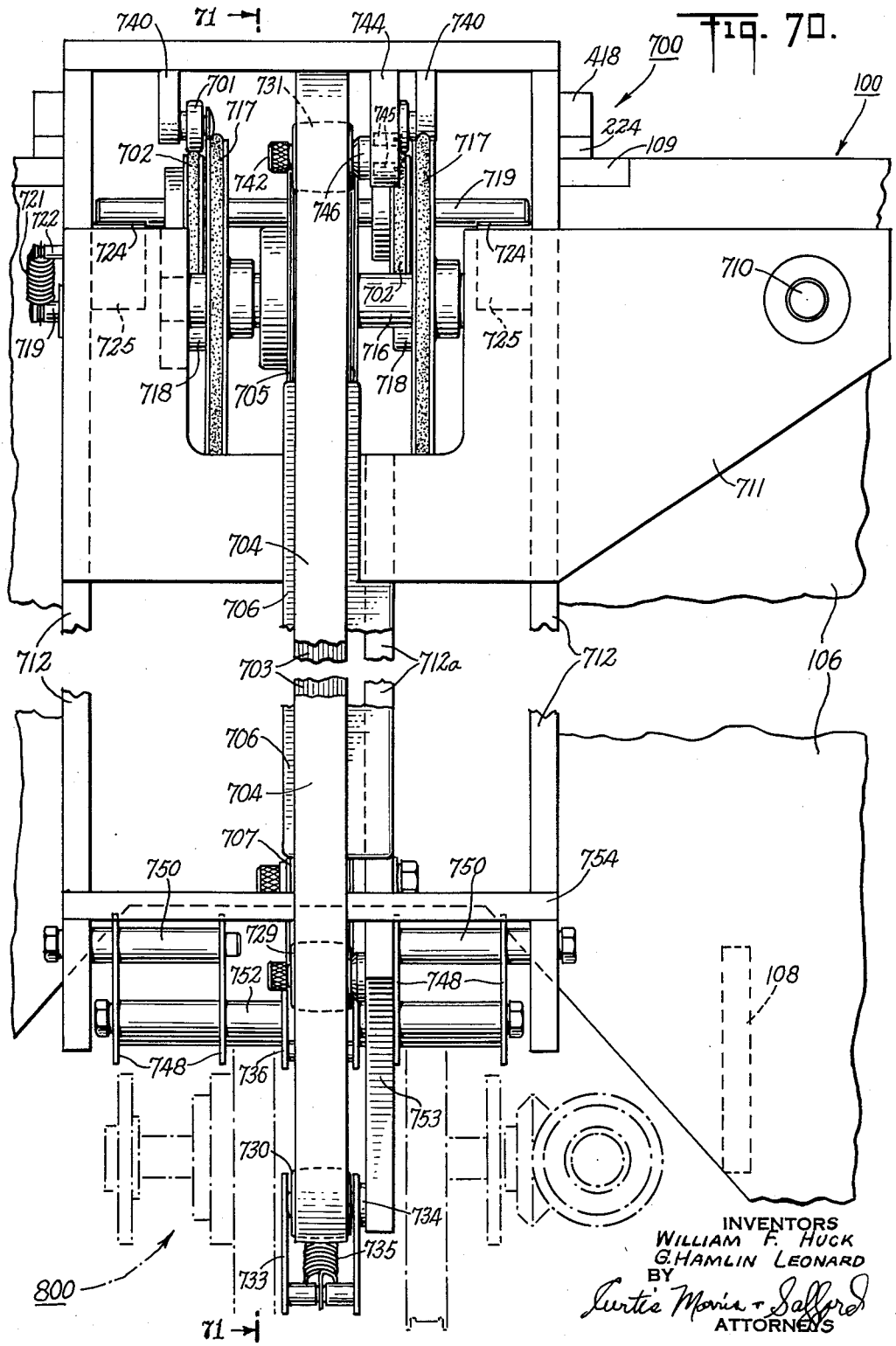

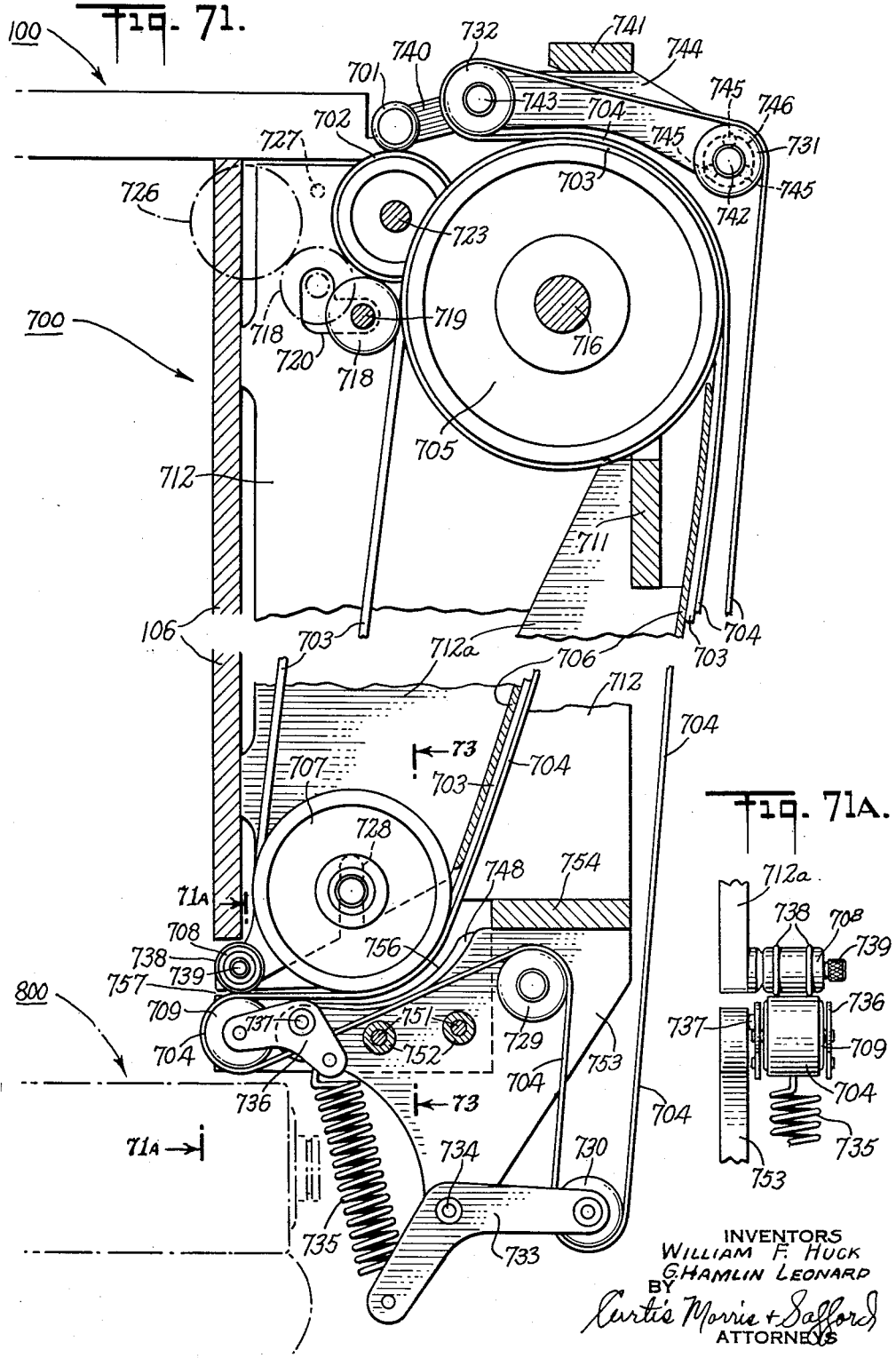

Dec. 25, 1962  W. F. HUCK ET AL  3,070,366
RECORD PROCESSING MACHINE
Filed Jan. 4, 1957  50 Sheets-Sheet 38

INVENTORS
WILLIAM F. HUCK
G. HAMLIN LEONARD
BY
Curtis Morris & Safford
ATTORNEYS Dec. 25, 1962 — W. F. HUCK ET AL — 3,070,366
RECORD PROCESSING MACHINE
Filed Jan. 4, 1957 — 50 Sheets-Sheet 41

INVENTORS
WILLIAM F. HUCK
G. HAMLIN LEONARD
BY
Curtis, Morris & Safford
ATTORNEYS

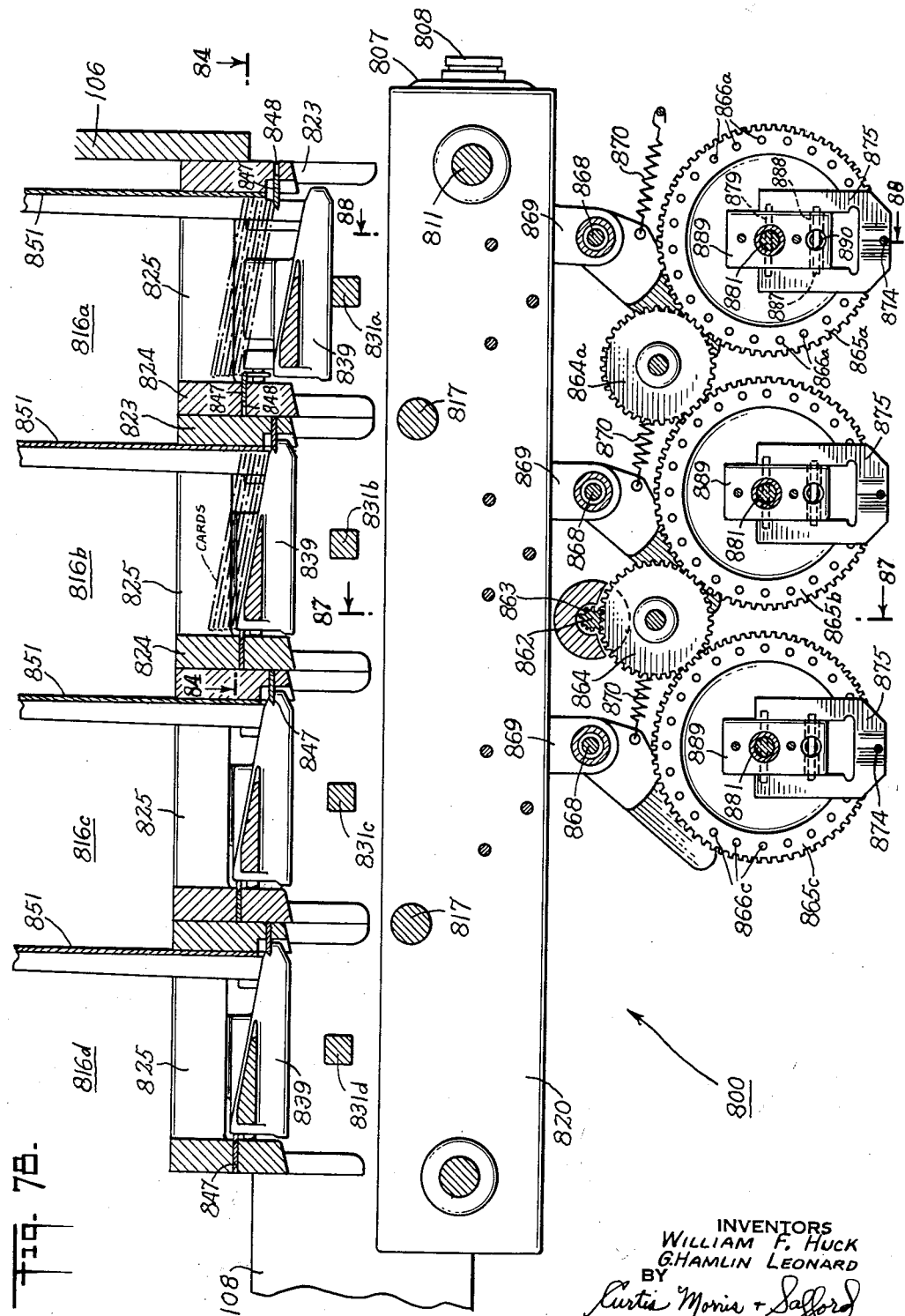

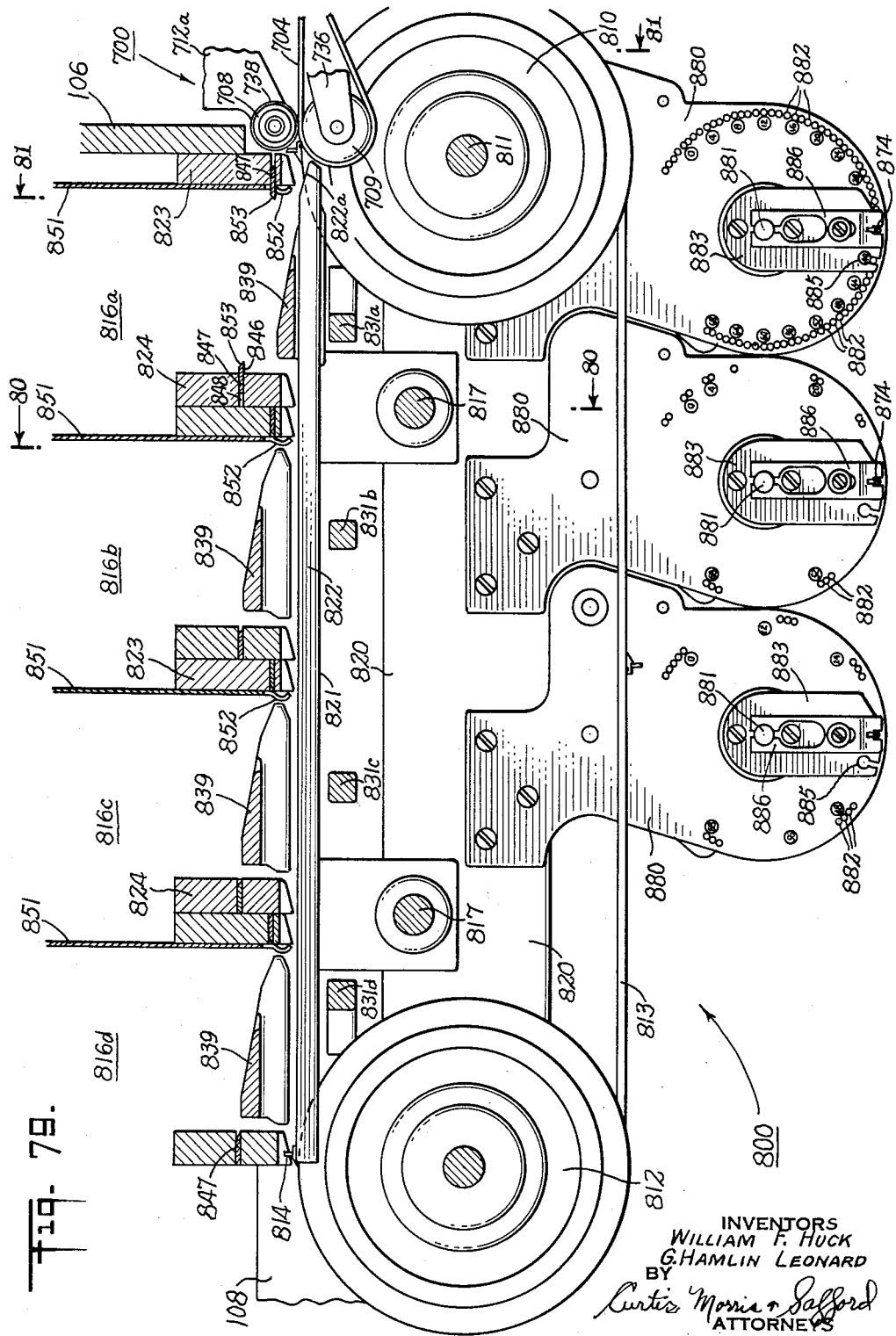

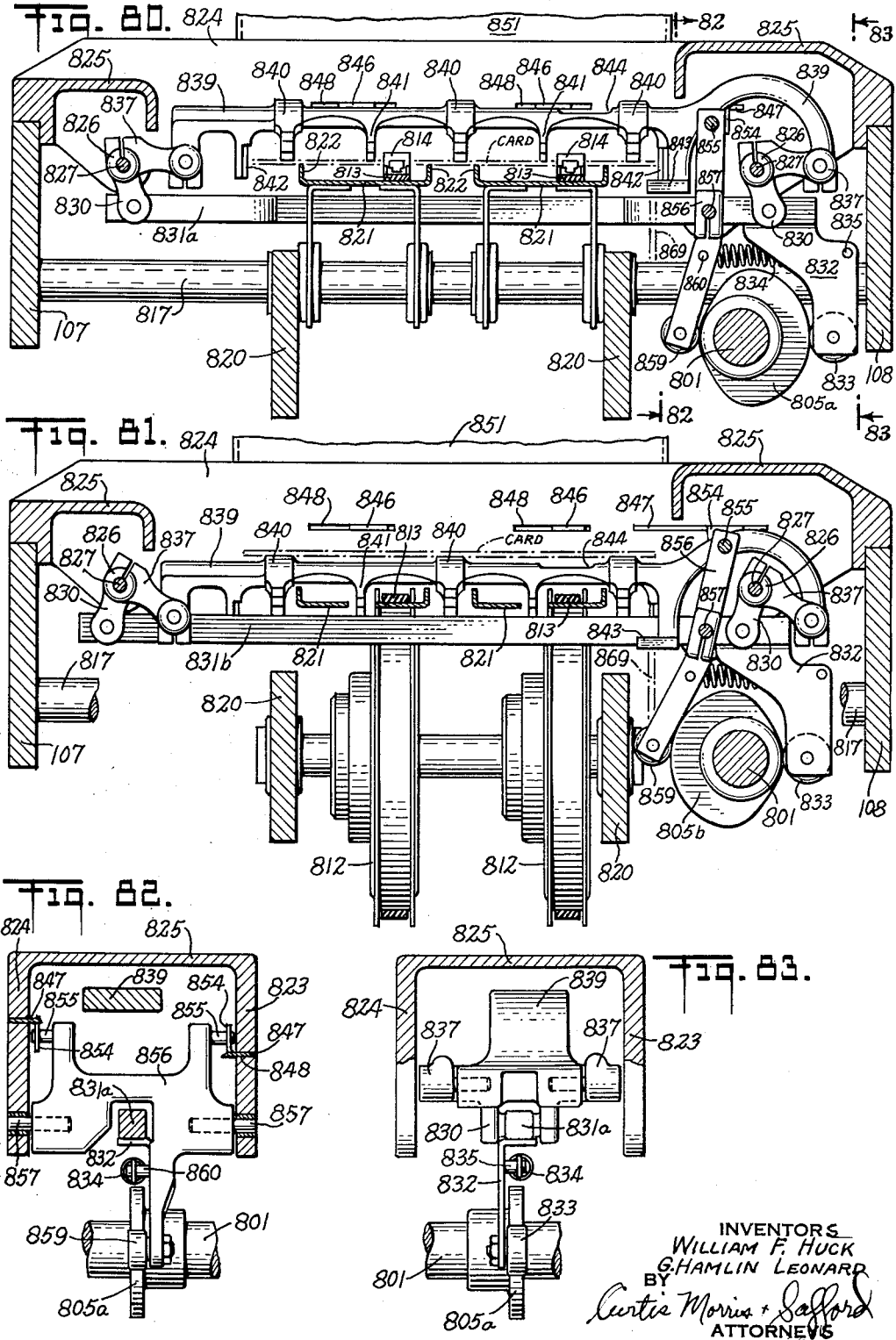

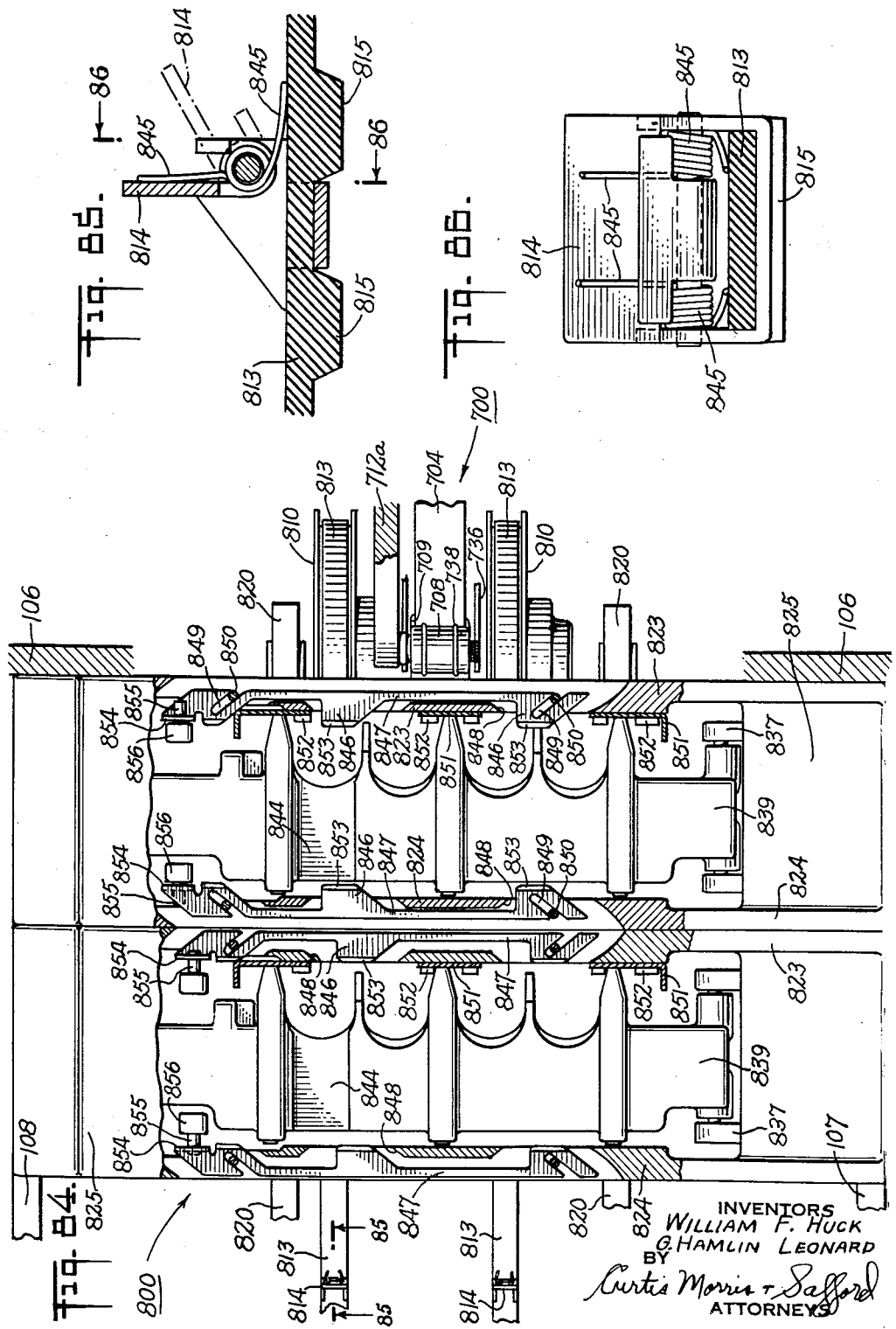

Dec. 25, 1962 W. F. HUCK ET AL 3,070,366
RECORD PROCESSING MACHINE
Filed Jan. 4, 1957 50 Sheets-Sheet 46
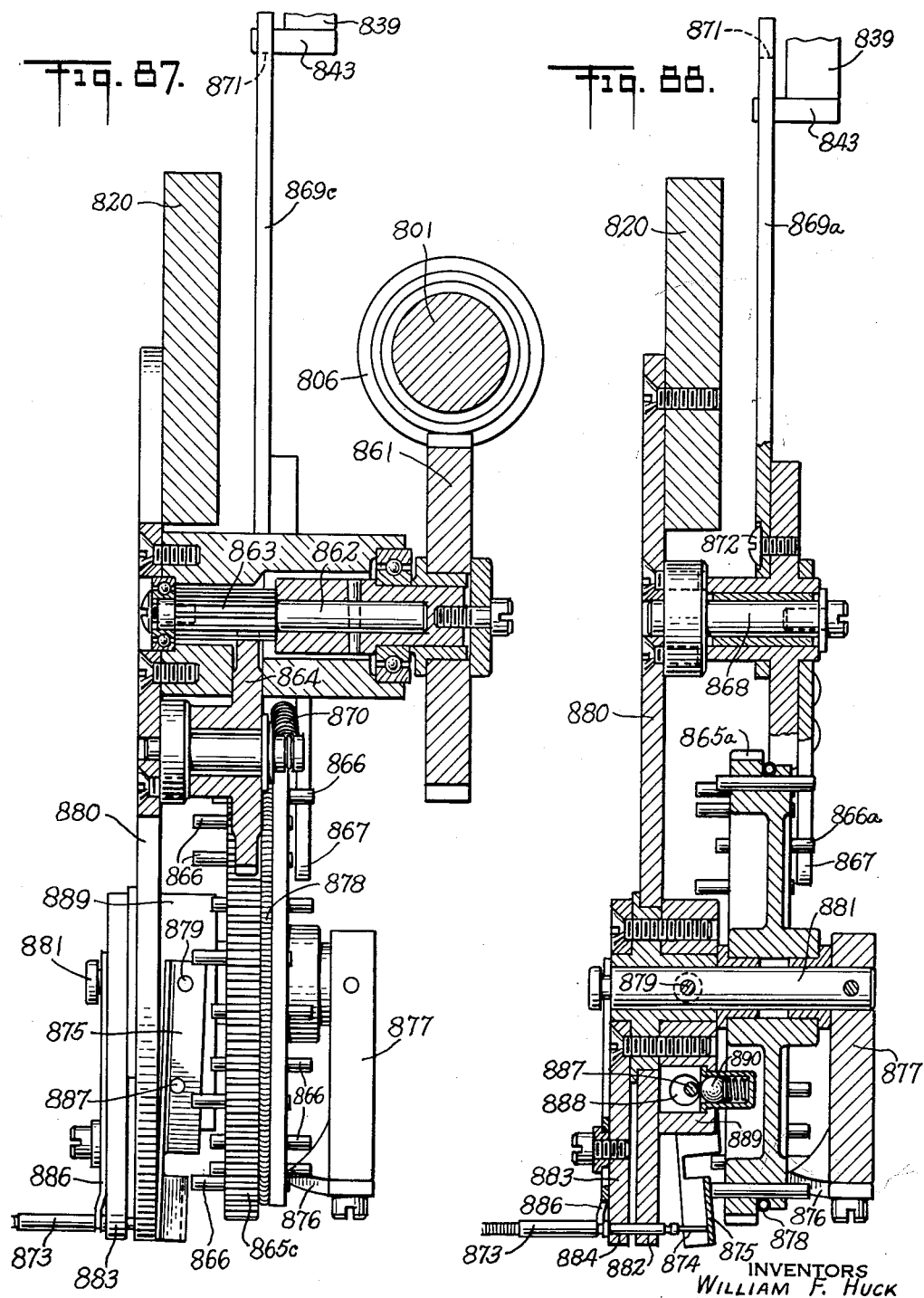
INVENTORS
WILLIAM F. HUCK
G. HAMLIN LEONARD
BY
Curtis, Morris + Safford
ATTORNEYS

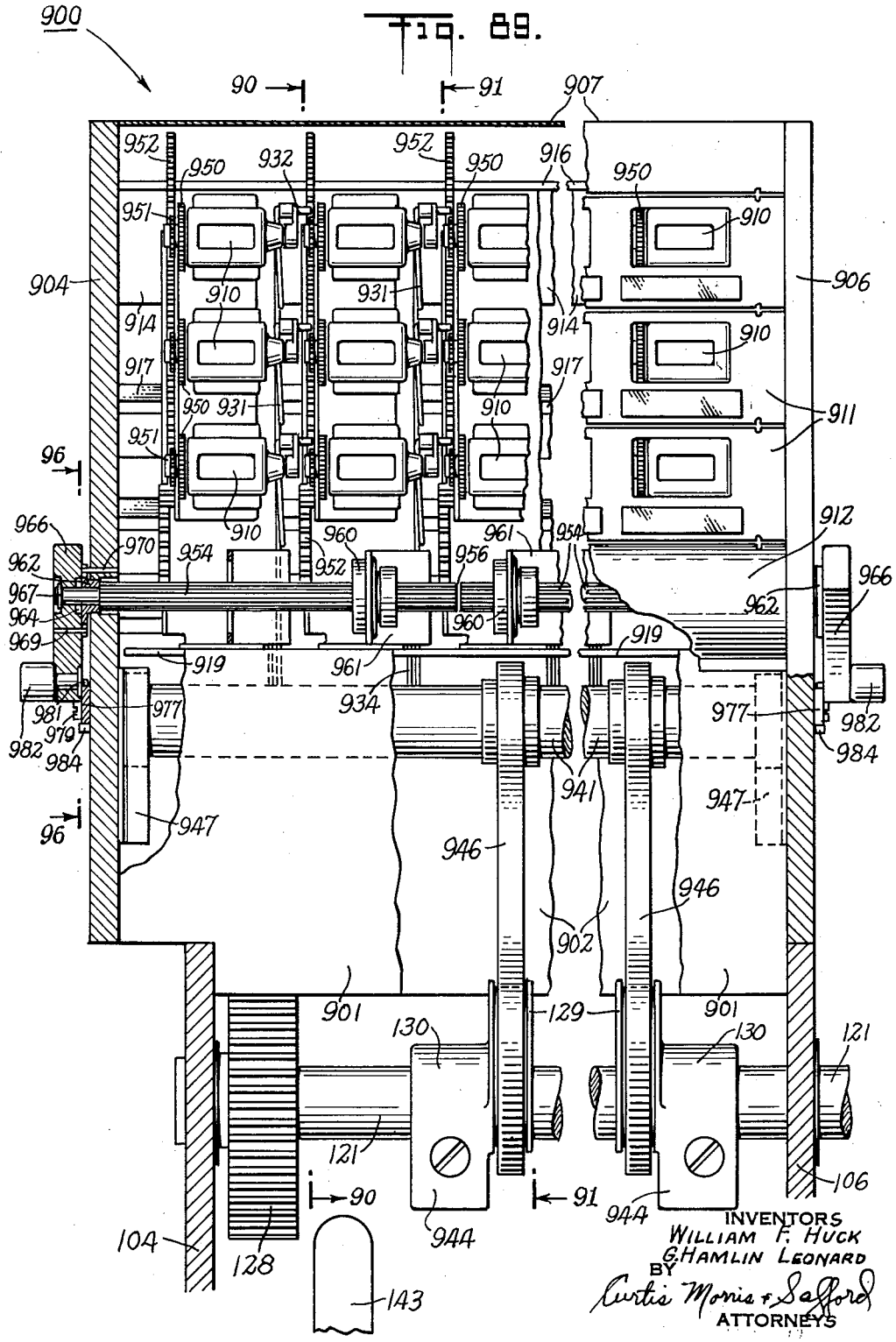

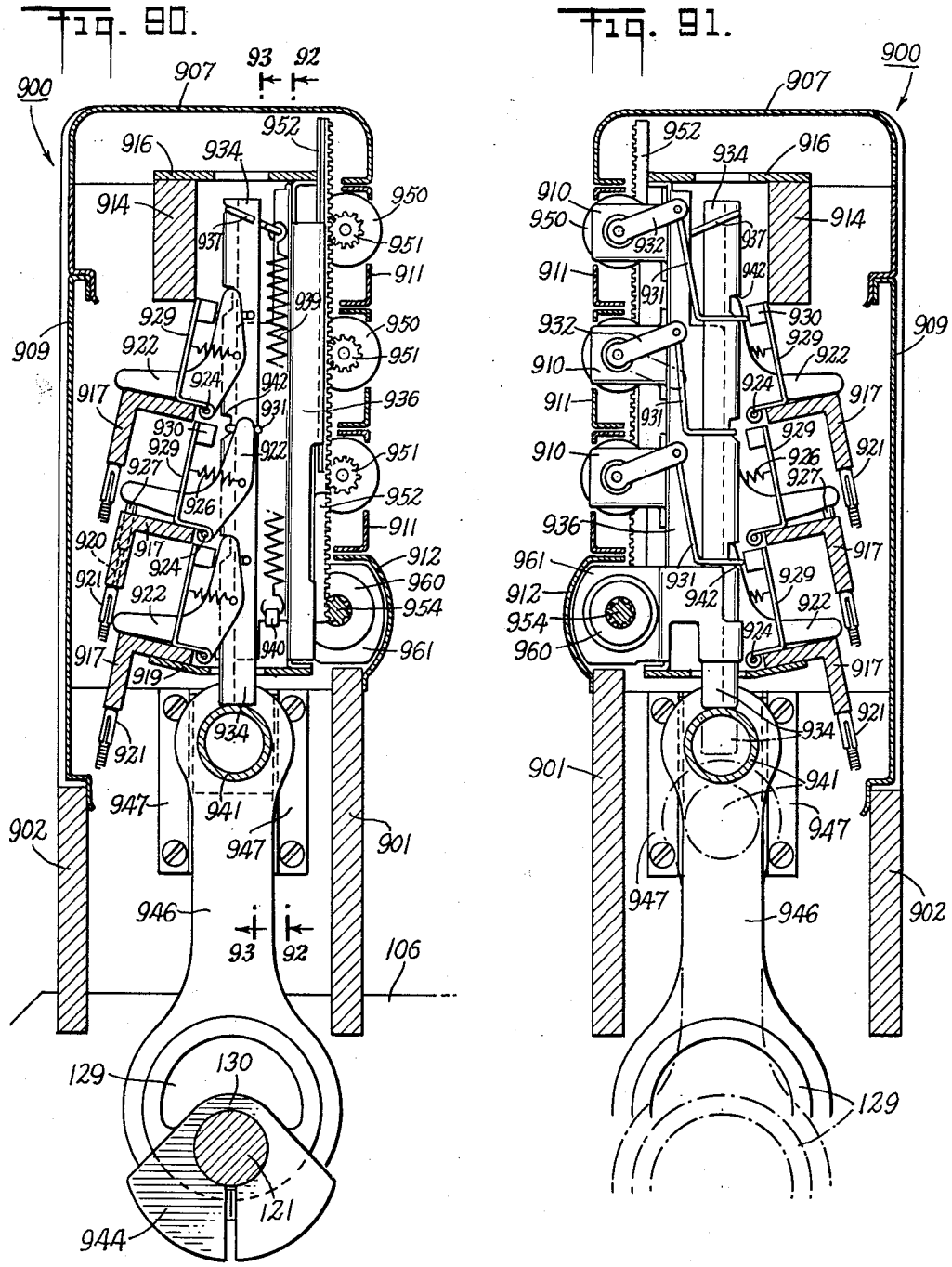

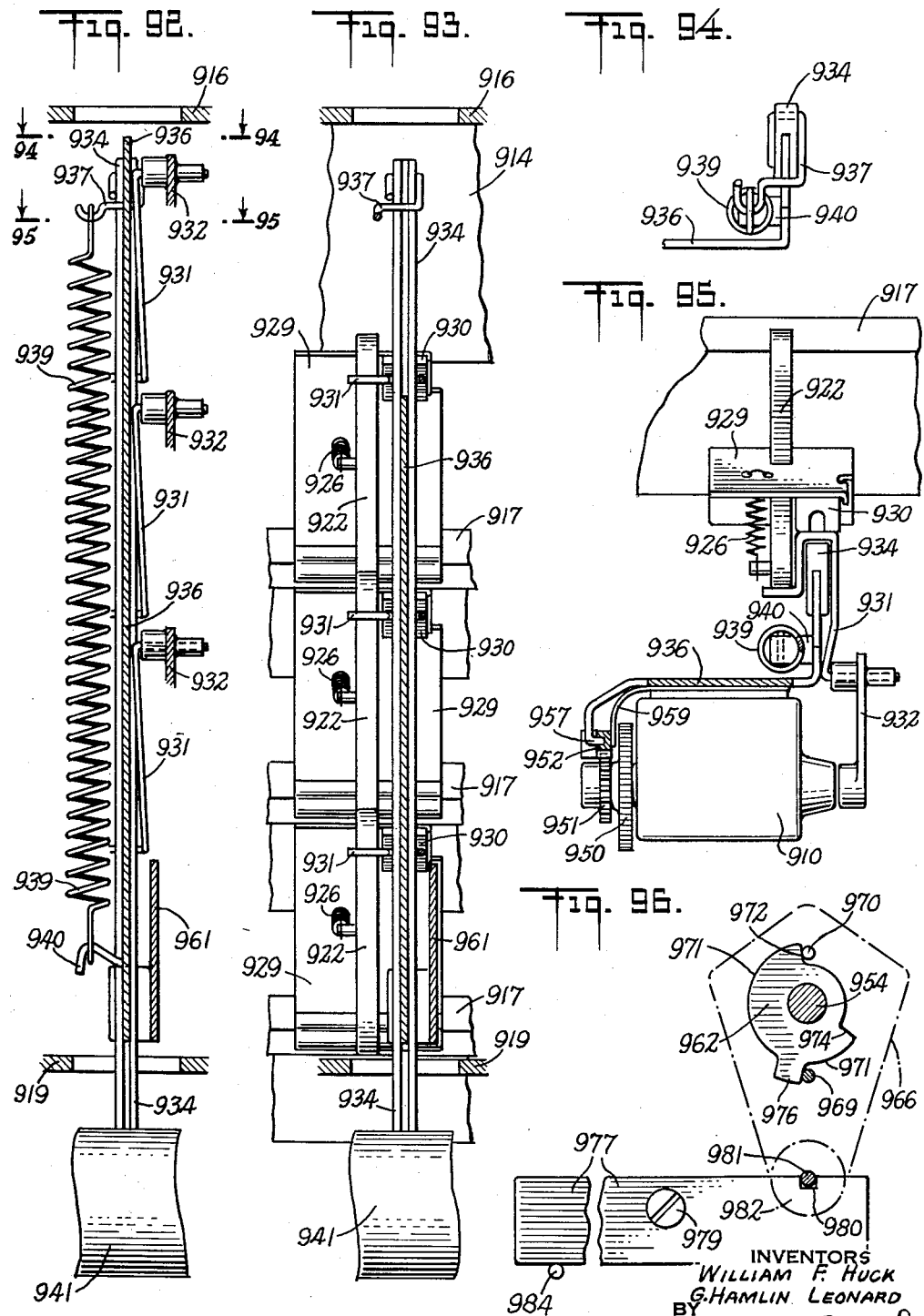

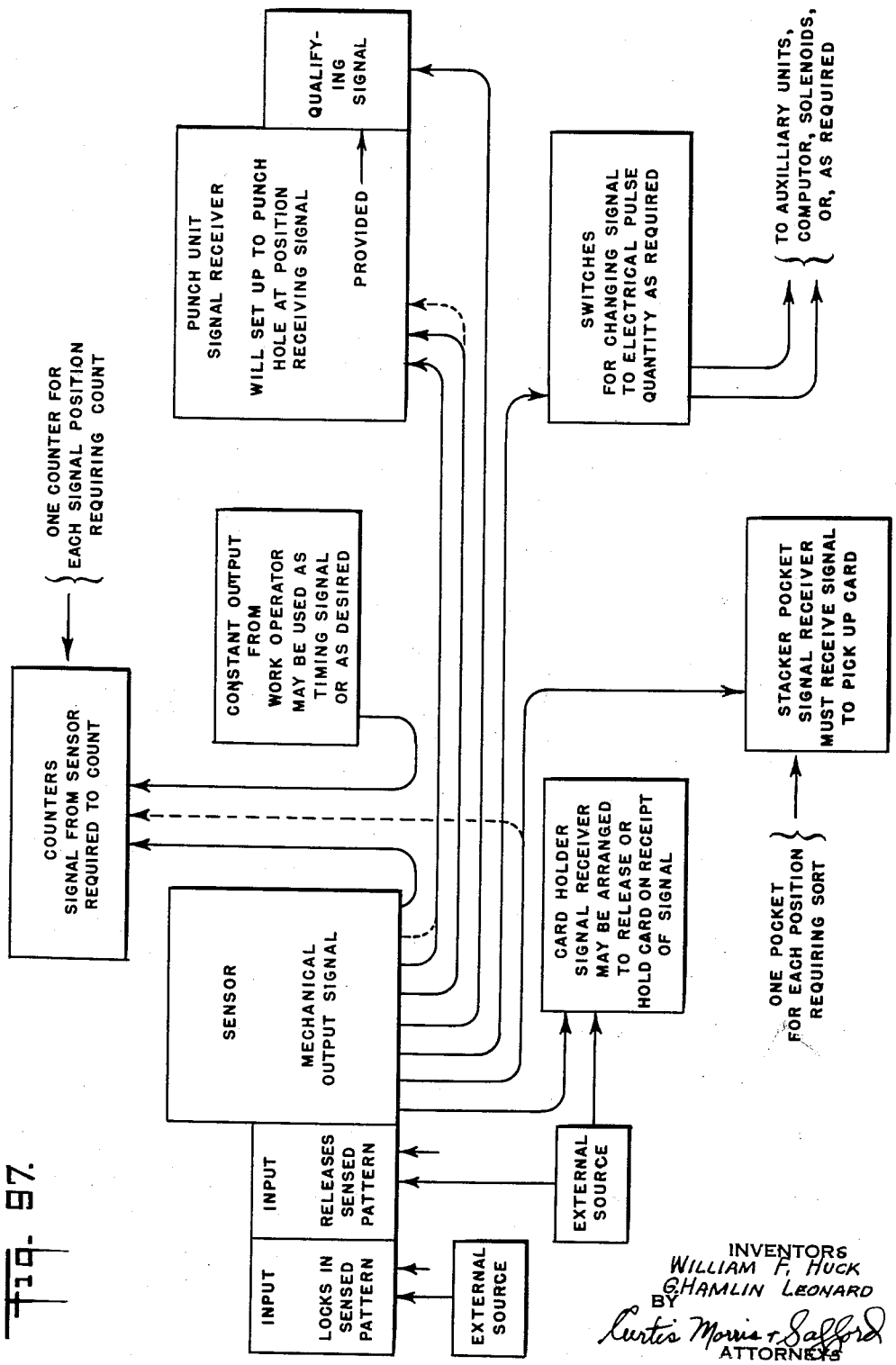

United States Patent Office 3,070,366
Patented Dec. 25, 1962

3,070,366
RECORD PROCESSING MACHINE
William F. Huck, Forest Hills, N.Y., and George H. Leonard, Darien, Conn., assignors, by mesne assignments, to William F. Huck, doing business as Huck Company, New York, N.Y.
Filed Jan. 4, 1957, Ser. No. 632,525
21 Claims. (Cl. 271—10)

This invention relates to an improved business machine and to improvements in subcombinations thereof. More specifically, it relates to improvements in machines and machine components for receiving, handling, sensing, punching, conveying, sorting, stacking and tabulating information from record cards or the like.

The machine of the invention is useful by itself for a variety of tasks such as punching record indicia in the form of perforations in record cards, sensing data on record cards and providing a statistical analysis thereof, and sorting record cards into categories based on the information sensed from or punched on the cards.

The machine is also useful for driving and/or directing the activities, e.g., the printing of bills, dick strips and the like, of one or more auxiliary machines in response to information sensed from record cards processed in the machine or abstracted directly from said cards in such auxiliary units. In addition, the machine of the invention, whether used with or independently of such units, is useful in combination with computers, memory devices and the like for such tasks as punching more detailed information on a card at one station in the machine in response to signals from a memory device acting on abbreviated information sensed at a previous station and relayed to the memory device.

Generally, the machine of the invention comprises a combination of assemblies, each of which contributes to the processing and feeding of record cards or the like at speeds of the order of 130 to 390 per minute from a magazine, over sensing and punching stations, and through a card return unit to a stacking and sorting unit while recording statistical information in a counter assembly.

The machine and its major component parts have a considerable number of unique features and important advantages. One outstanding advantage is that the machine is readily adaptable to sensing and/or recording information on cards in the form of round holes or more closely spaced rectangular perforations in accordance with prevailing practices, and of being equally adaptable to other indicia-recording systems as well. Another advantage is that the sensing and/or punching of information can, if desired, be restricted to a preselected area of the record cards.

Still another advantage and most unique feature is that the operating parts, particularly of the sensing and punching assemblies, are situated under rather than around or over the travel path of the cards, thus making the cards visible at all times, while said assemblies are themselves readily accessible and replaceable. Further, the sensing assemblies are provided with means for automatically interrupting their respective operations when a card is not presented, or is improperly presented, to them and, upon signal, for repeating their operations in identical manner even though, in the case of the sensor, no new cards are presented and, in the case of the punch, no new signals are received.

Another advantage is that the cards are moved rapidly and positively, yet gently, from station to station and from the work table to the stacking and sorting mechanism without injury. A further feature is that provisions are available for either interrupting or selectively releasing, upon signal, the movement of record cards through the machine. Another unique feature is that the card feed, card return and stacking assemblies are readily adaptable to the movement of the cards through auxiliary devices that may with advantage be driven directly by and therefore in precise synchronism with the basic unit.

The sorting and stacking assemblies, like the sensing, punching, card return and counter assemblies, have the advantage, common to them, of being modular in the sense that their number and location can readily be altered to suit. Thus, for example, the sensing and punching assemblies are interchangeable, being mounted and operated in substantially the same manner; the card return is equally effective whether mounted directly on the basic machine or on an auxiliary device some distance away; the stacker assembly can collect the processed record cards in a single stack, in up to four preselected categories as indicated by signals received from the sensor or an external source if the basic unit alone is used, or in as many as about sixty cataegories if a sufficient number of auxiliary units are connected to the basic unit embodying this invention; and the counter assembly can readily be adapted to accommodate an almost indefinite number of counters.

The stackers have the unique advantage of adding new cards to the bottoms of stacks of previously received cards so that the top cards in a stack can easily be removed in the order processed without in any way interfering with or interrupting operation of the machine. Many of the assemblies, particularly the sensing, punching, sorting and tabulating assemblies operate on the principle of effectively translating the relatively weak impulse of an actuated signal device into a force, derived from the machine drive, of sufficient strength to accomplish an intended function such as sending a signal from a sensor, punching a card, operating a stacker device or cranking a counter. Furthermore, and perhaps most important for speed of operation, these translations of relatively weak impulses into relatively strong actuating forces advantageously take place while the impulses for the next cycle are already being prepared.

Figure 2:
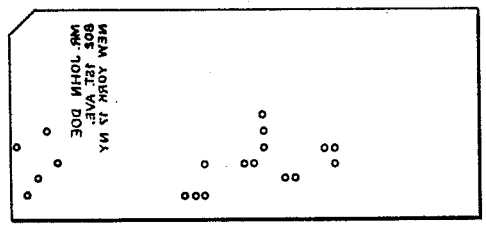

These and innumerable other advantages, as well as the utility of the machine embodying the invention and subcombinations thereof will become apparent from the following description of a specific embodiment selected for illustrative purposes only, said description being made with reference to the accompanying drawings, wherein:

FIGURES 1 to 10, inclusive, illustrate the general arrangement and drive mechanism of the basic unit. FIGURE 1 is a perspective view of the assembled unit; FIGURE 2 is a view of a typical card; FIGURE 3 is a front view of the assembled unit with the casing broken away; FIGURE 4 is a plan view of the table taken on section line 4—4 of FIGURE 3; FIGURE 5 is a front view of the machine with the housing removed to show the drive mechanism, the counter assembly being omitted; and FIGURES 6 to 10, inclusive, are sectional views taken on the correspondingly numbered section lines in FIGURE 5.

Figure 12:
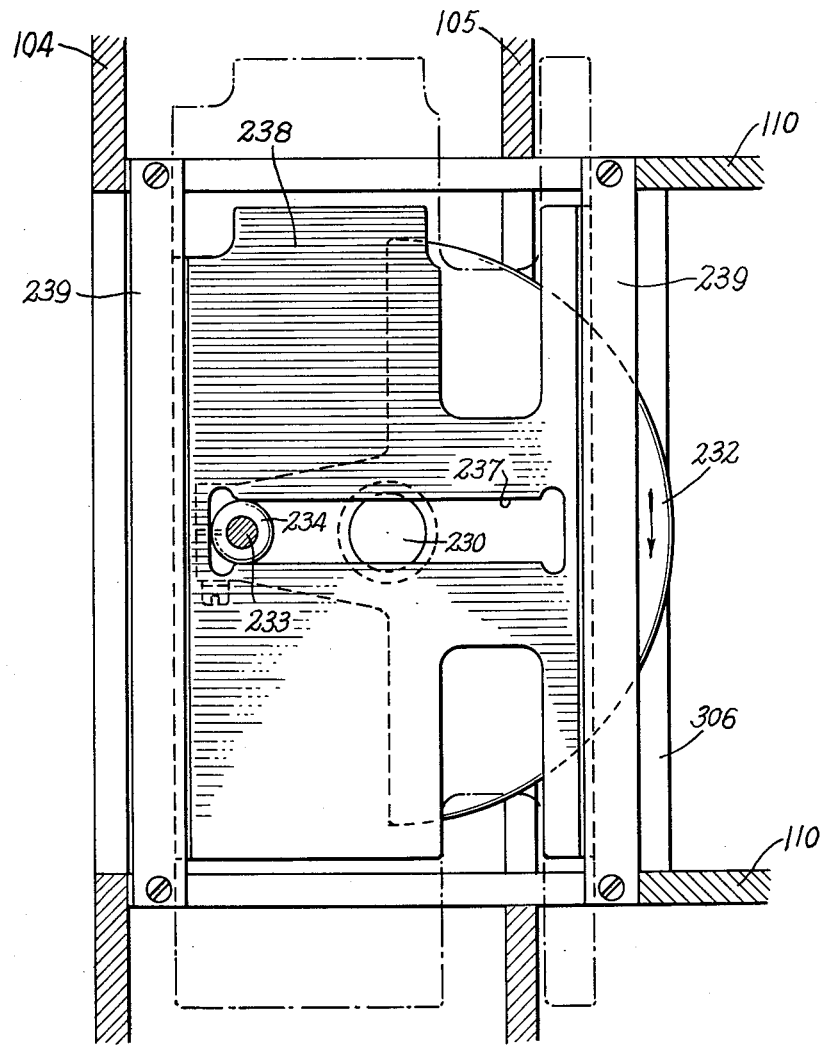

FIGURES 11 to 20, inclusive, illustrate the card feed mechanism. FIGURE 11 is a sectional view taken on section line 11—11 of FIGURE 4; FIGURES 12 and 13 are horizontal sections taken on the correspondingly numbered section lines in FIGURE 11; FIGURE 14 is a sectional view taken on section line 14—14 of FIGURE 4; FIGURE 15 is a view similar to FIGURE 14 showing the bottom card advancing from under a stack of cards in the magazine; FIGURE 16 is a cross section taken on section lines 16—16 of FIGURE 14; FIGURE 17 is a cross section through the feed mechanism and supporting structure taken on section line 17—17 of FIGURE 11; FIGURE 18 is a longitudinal view in section taken on section line 18—18 of FIGURE 4; FIGURE 19 is a detail of the card feeding assembly and a stop taken on section line 19—19 of FIGURE 18; and FIGURE 20 is an exploded view in perspective of the card feeding assembly shown in FIGURE 19.

Figure 25:
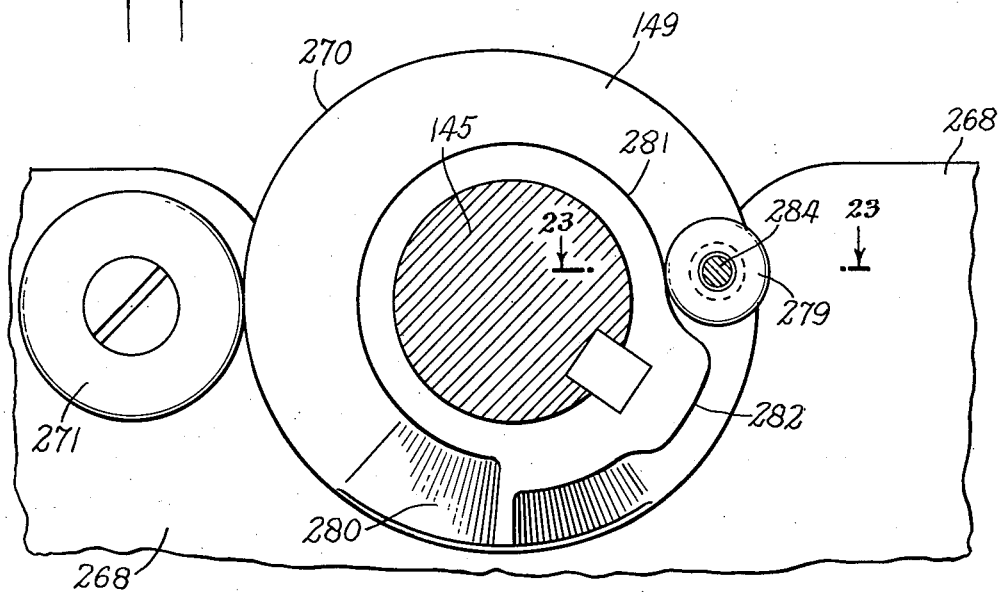
Figure 26:
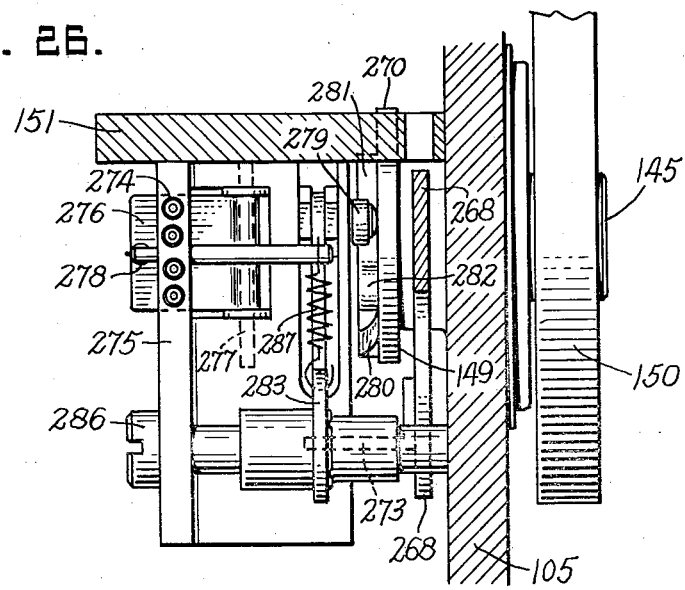

FIGURES 21 to 30, inclusive, illustrate a card interrupt mechanism that is convertible into a selective card release mechanism. FIGURE 21 is a view in section taken on line 21—21 of FIGURE 4; FIGURE 22 is a horizontal view, looking up, taken on section line 22—22 of FIGURE 21; FIGURE 23 is an enlarged detail of a latch release actuator taken on section line 23—23 of FIGURE 21; FIGURE 24 is a detail taken on section line 24—24 of FIGURE 23; FIGURE 25 is a vertical section taken on section line 25—25 of FIGURE 22; FIGURE 26 is a vertical section taken on section line 26—26 of FIGURE 21; FIGURE 27 is a section taken on section line 27—27 of FIGURE 4; FIGURES 28 and 29 are views similar to FIGURE 27 showing the parts in different positions; and FIGURE 30 is a horizontal section, from below, taken on section line 30—30 of FIGURE 27.

Figure 32:
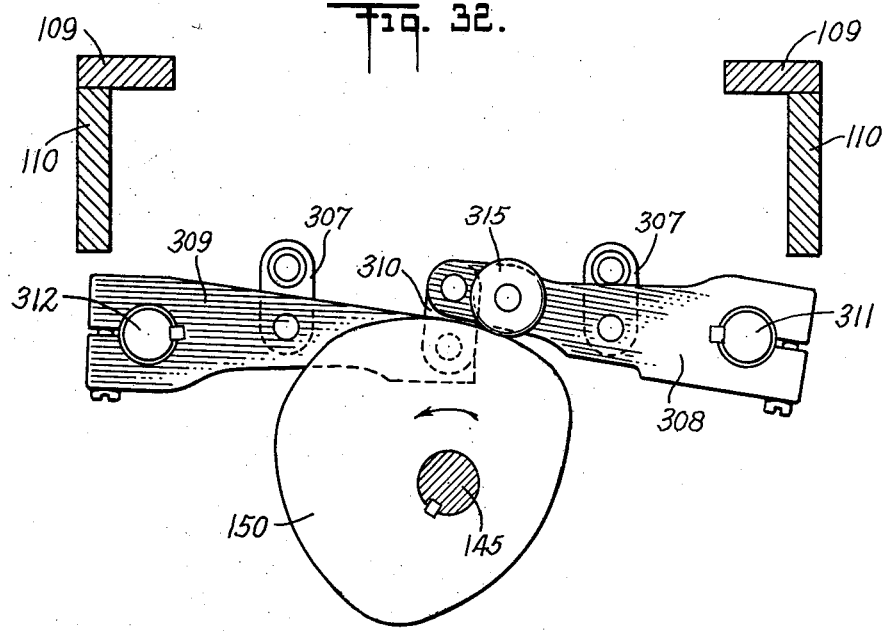
Figure 33:
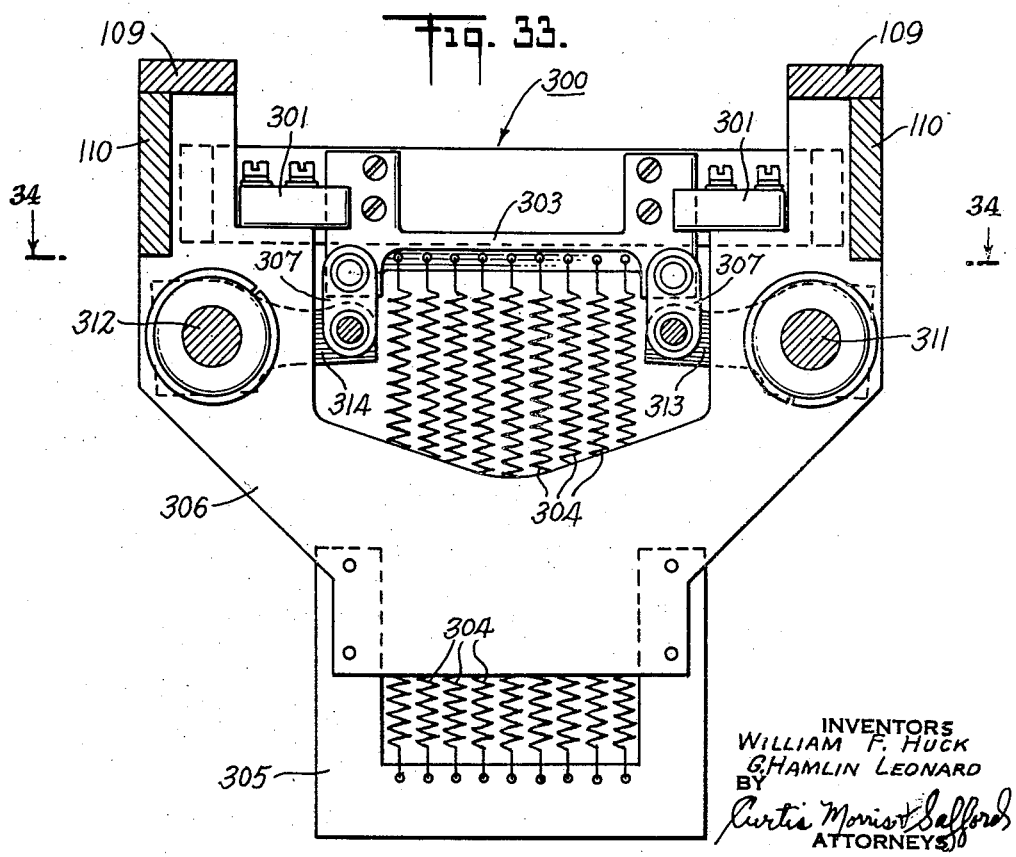
Figure 34:
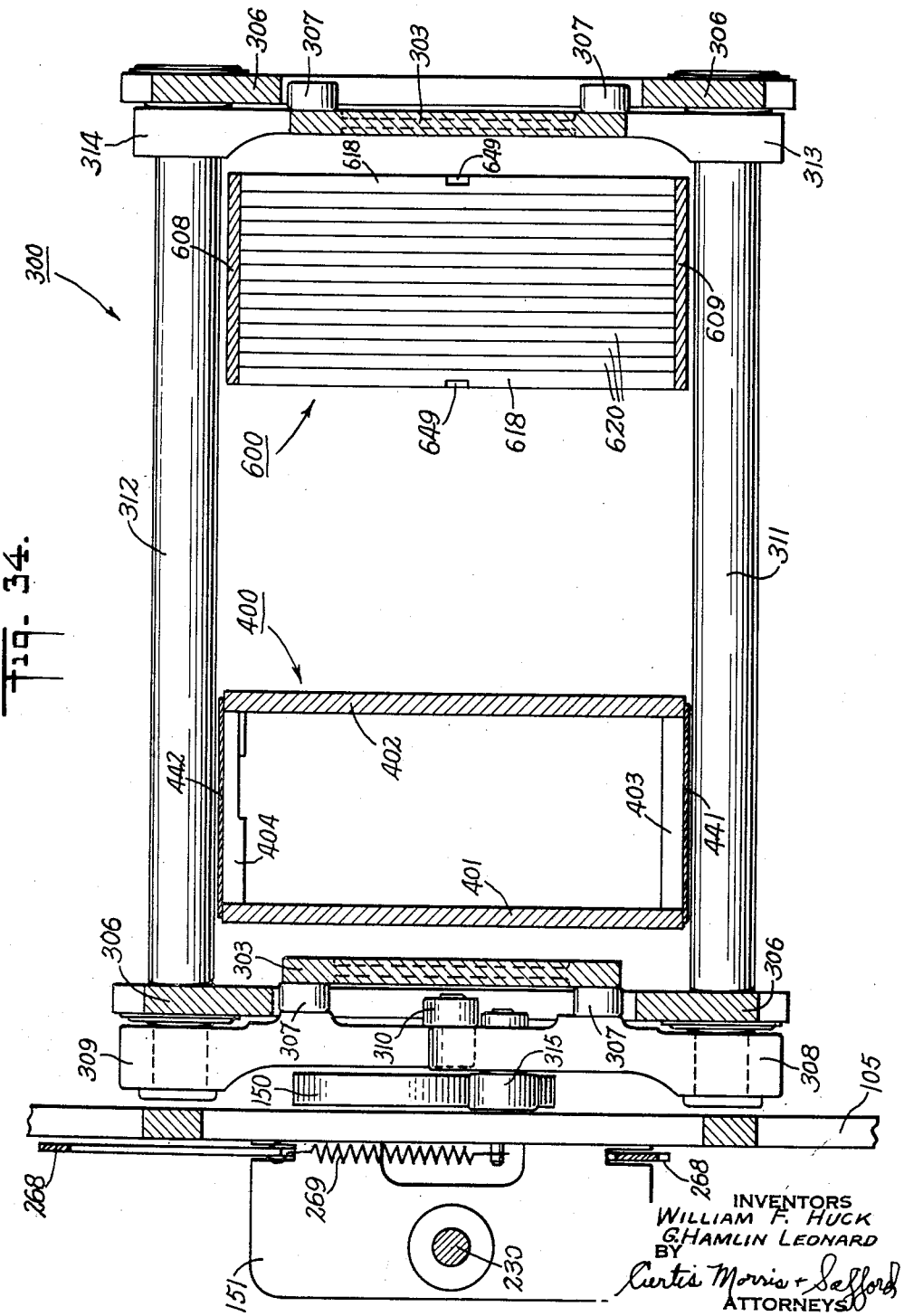

FIGURES 31 to 34, inclusive, illustrate a work operator mechanism for actuating the sensor and punching mechanism. FIGURE 31 is a plan view taken on section line 31—31 of FIGURE 3; FIGURES 32 and 33 are sectional views taken on the correspondingly numbered section lines of FIGURE 31; and FIGURE 34 is a horizontal section taken on section line 34—34 of FIGURE 33.

Figure 35:
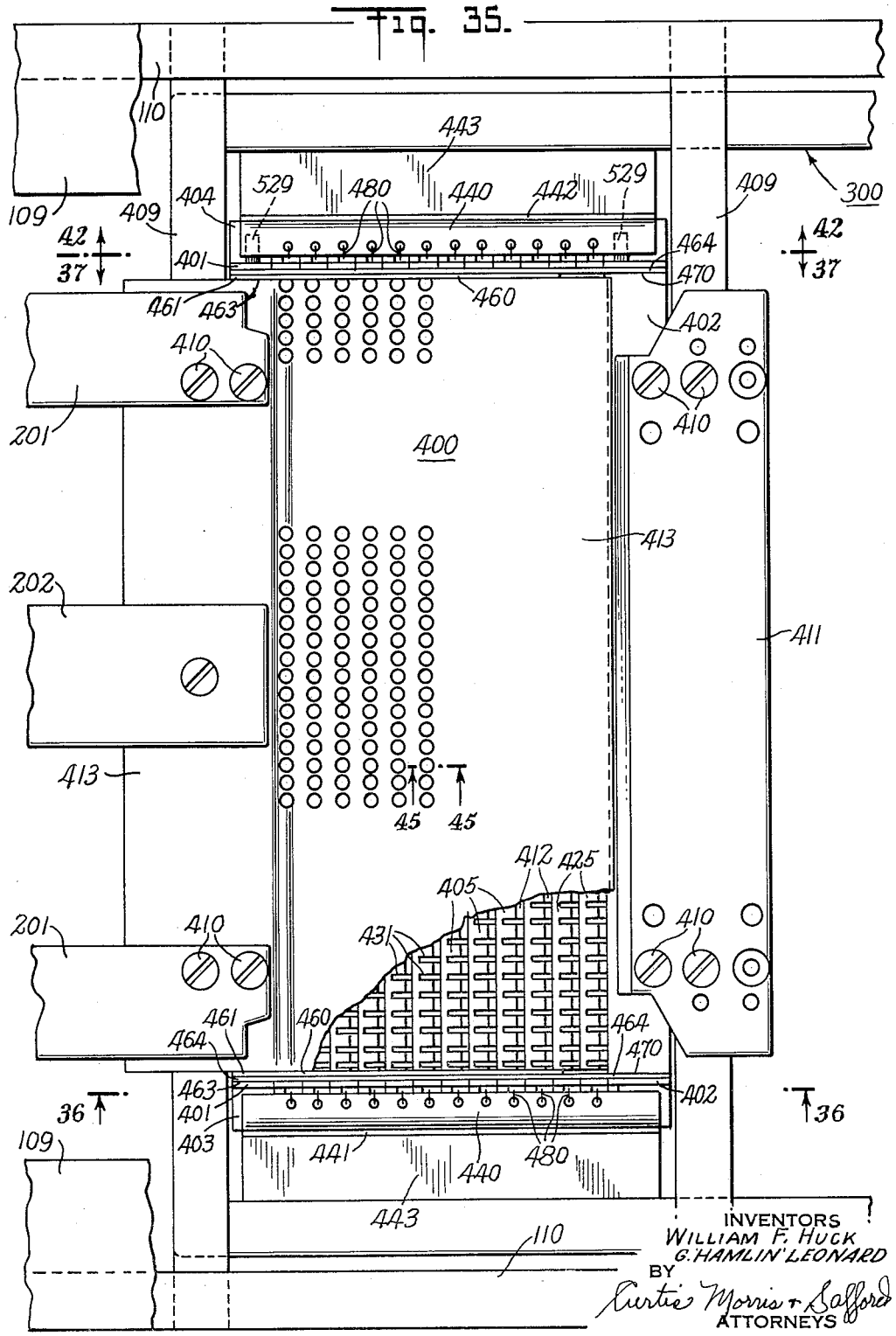
Figure 39:
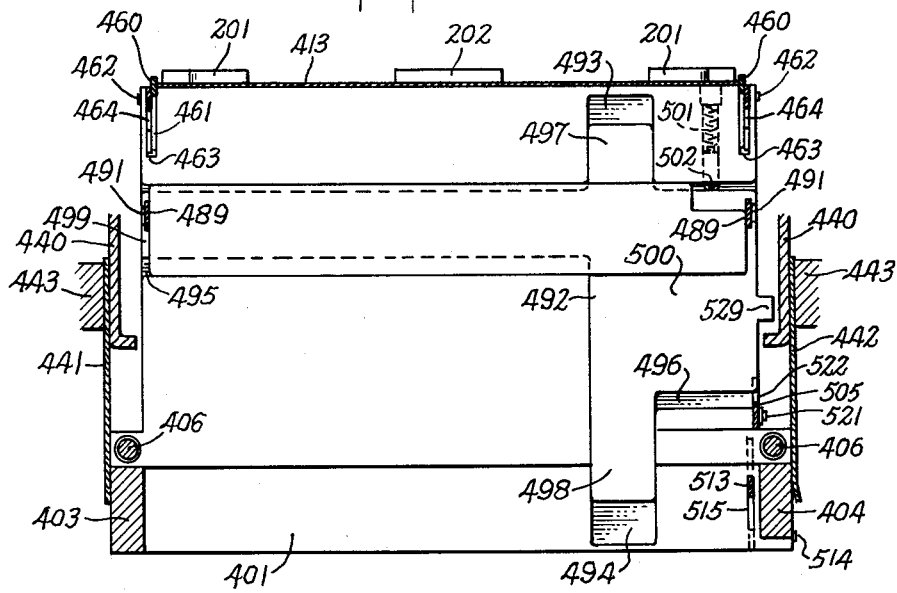
Figure 40:
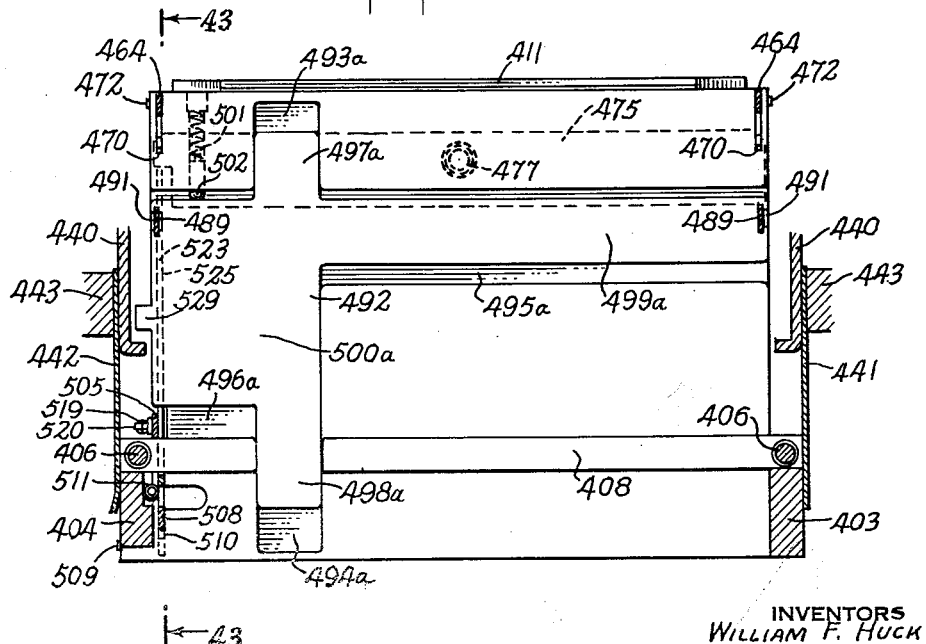

FIGURES 35 to 50, inclusive, illustrate the sensing assembly 400, shown schematically in FIGURES 1 and 3. FIGURE 35 is a plan view taken on section line 35—35 of FIGURE 3; FIGURES 36 and 37 are opposite end views taken on the correspondingly numbered section lines of FIGURE 35; FIGURE 38 is a longitudinal section taken on section lines 38—38 of FIGURE 36; FIGURES 39 and 40 are views taken in opposite directions on the correspondingly numbered section lines of FIGURE 36; FIGURE 41 is a plan view taken on section line 41—41 of FIGURE 38; FIGURE 42 is a view taken on section line 42—42 of FIGURE 35; FIGURE 43 is a view taken on section line 43—43 of FIGURE 40; FIGURE 44 is a view similar to FIGURE 43 showing another position of the parts; FIGURE 45 is a view, on an enlarged scale, taken on section line 45—45 of FIGURE 35; FIGURE 46 is a view similar to FIGURE 45 showing the parts in a different position; FIGURES 47 and 48 are plan views taken on the correspondingly numbered section lines in FIGURES 45 and 46, respectively; FIGURE 49 is a detail in perspective illustrating the support and operating means for the guide channels; and FIGURE 50 is a perspective view of the elements illustrated in FIGURES 43 and 44.

Figure 58:
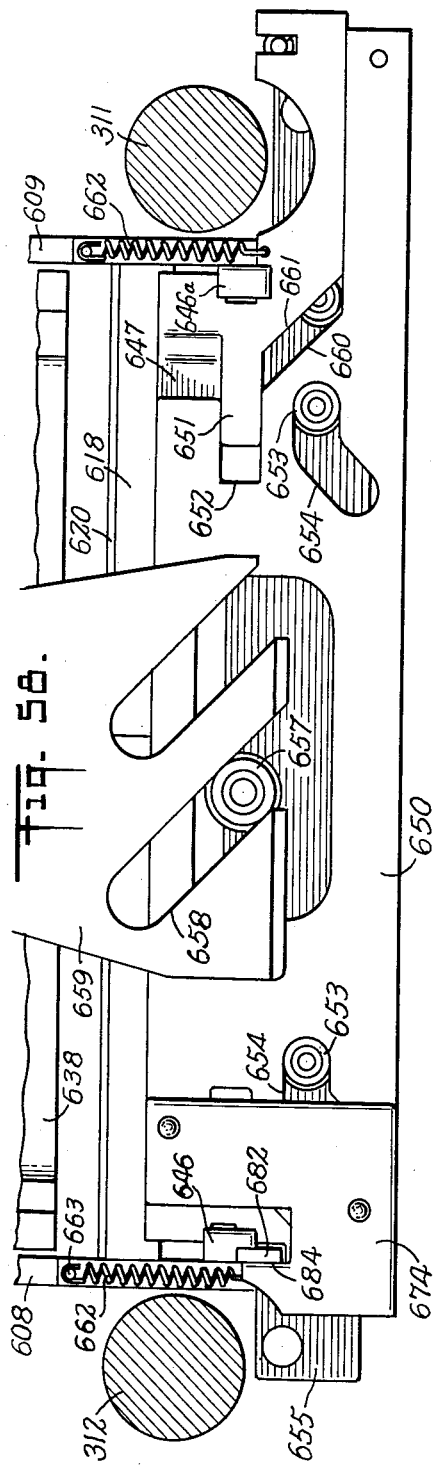
Figure 59:
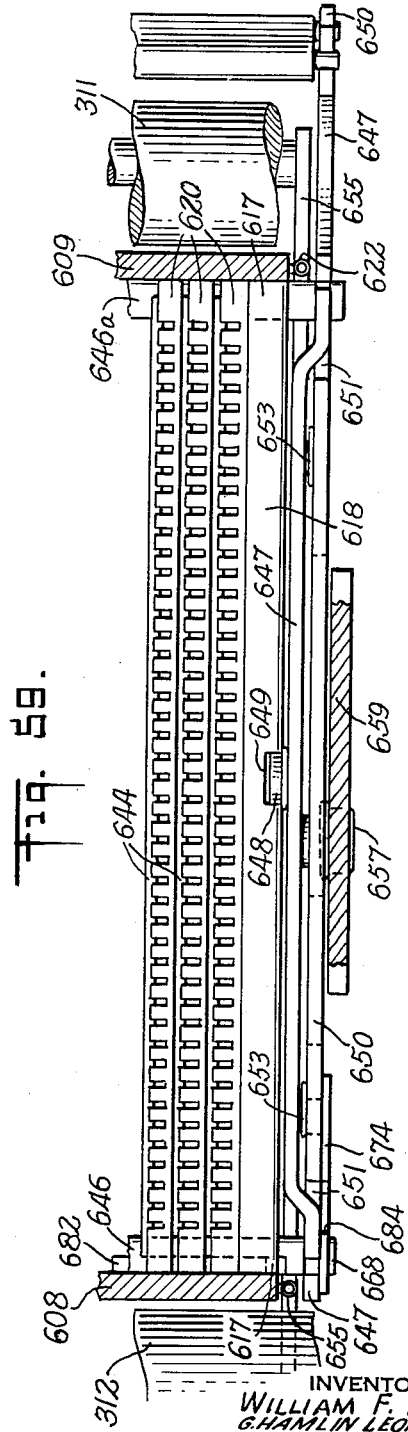

FIGURES 51 to 68 illustrate the punch assembly 600, shown schematically in FIGURES 1 and 3. FIGURE 51 is a plan view taken on section line 51—51 of FIGURE 3; FIGURE 52 is a view taken on section line 52—52 of FIGURE 51; FIGURE 53 is a cross section taken on section line 53—53 of FIGURE 52; FIGURES 54 and 55 are views taken on the correspondingly numbered section lines of FIGURE 53; FIGURES 56, 57 and 58 are views showing the parts of FIGURE 54 in different positions; FIGURE 59 is a horizontal section taken on section line 59—59 of FIGURE 54; FIGURES 60 and 61 are views taken on the correspondingly numbered section lines of FIGURE 52; FIGURE 62 is a view similar to FIGURE 61 showing the parts in a different position; FIGURE 63 is a view, on an enlarged scale, taken on section line 63—63 of FIGURE 51; FIGURES 64 and 65 are views similar to FIGURE 63 with the parts shown in different operative position; and FIGURES 66, 67 and 68 are views taken on the correspondingly numbered section lines of FIGURE 63.

Figure 72:
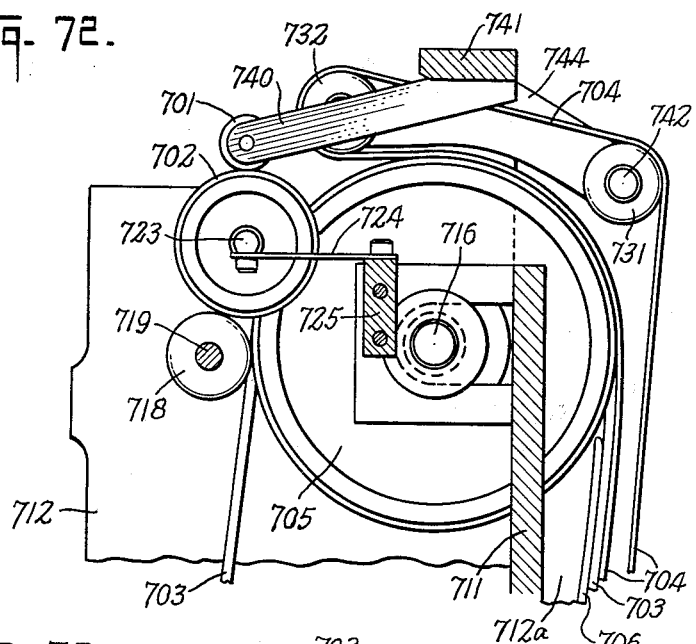
Figure 73:
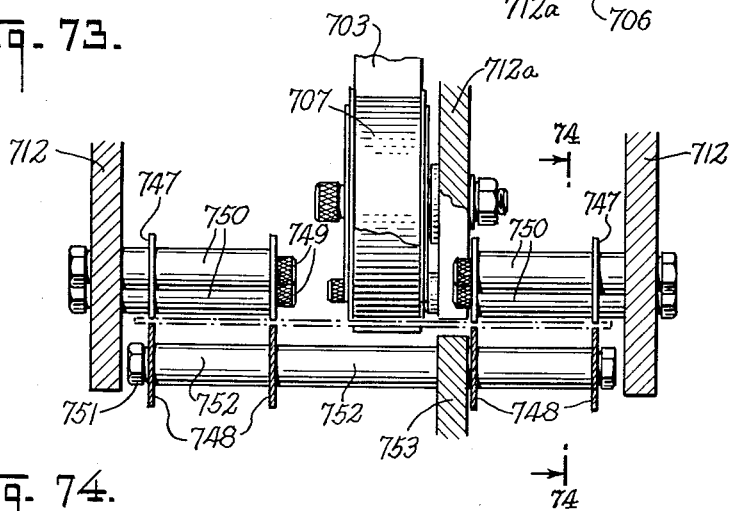
Figure 74:
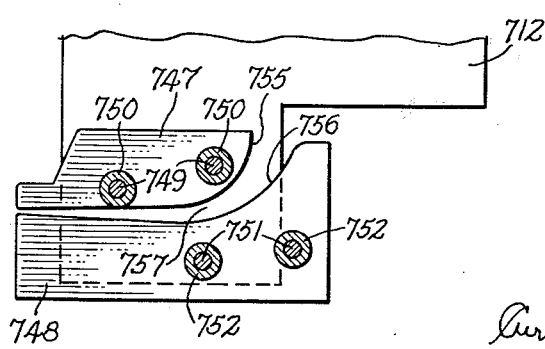

FIGURES 69 to 74 illustrate the card return 700, shown on FIGURES 1 and 3. FIGURE 69 is a plan view of the right end of FIGURE 3 with the housing removed;

FIGURE 70 is an end view looking toward the left of FIGURE 69; FIGURE 71 is a sectional view taken on section line 71—71 of FIGURE 70; FIGURE 71A is a section taken on section line 71a—71a of FIGURE 71; FIGURE 72 is a detailed view taken on section line 72—72 of FIGURE 69; FIGURE 73 is a sectional view taken on section line 73—73 of FIGURE 71; and FIGURE 74 is a detail taken on section line 74—74 of FIGURE 73.

Figure 75:
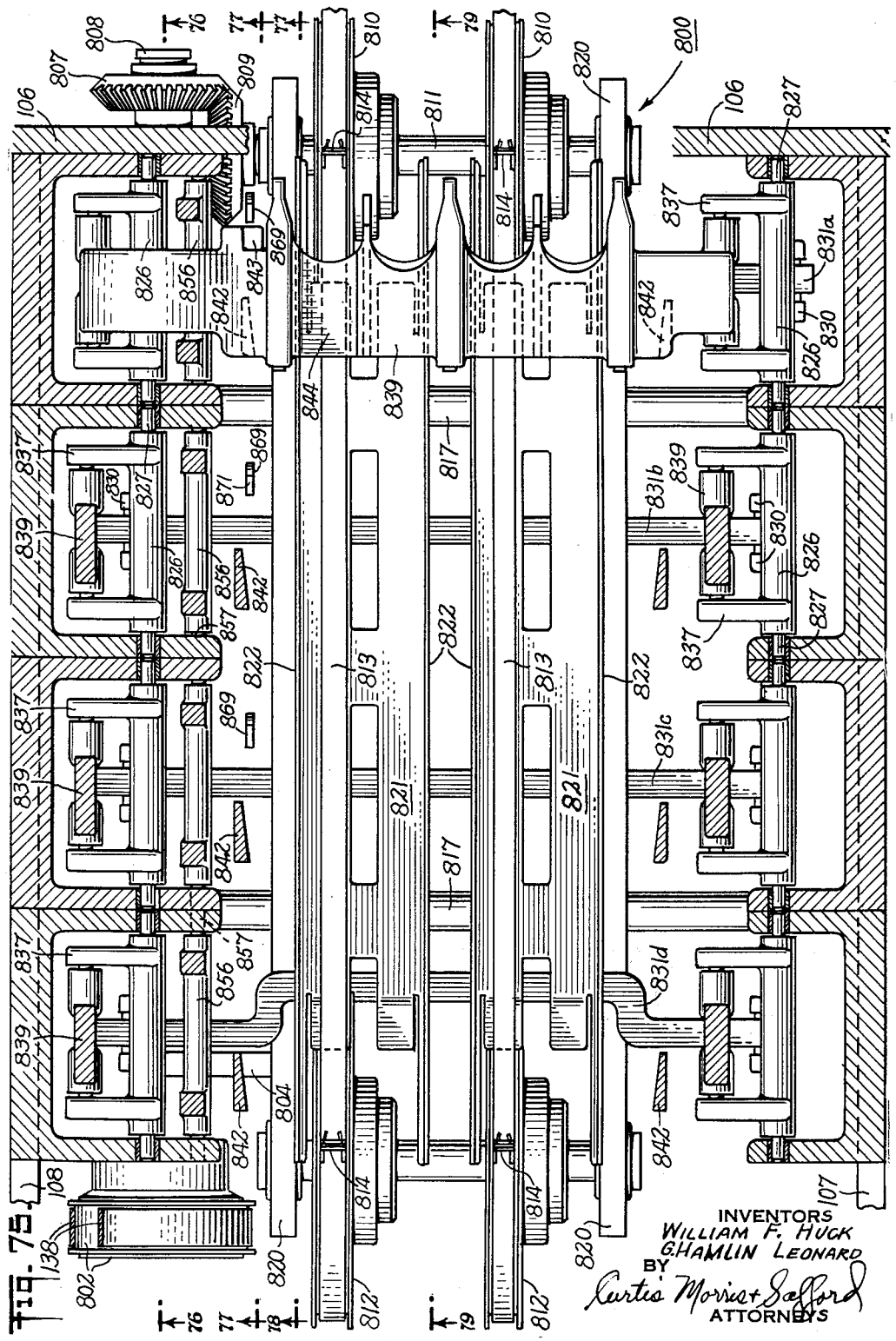
Figure 76:
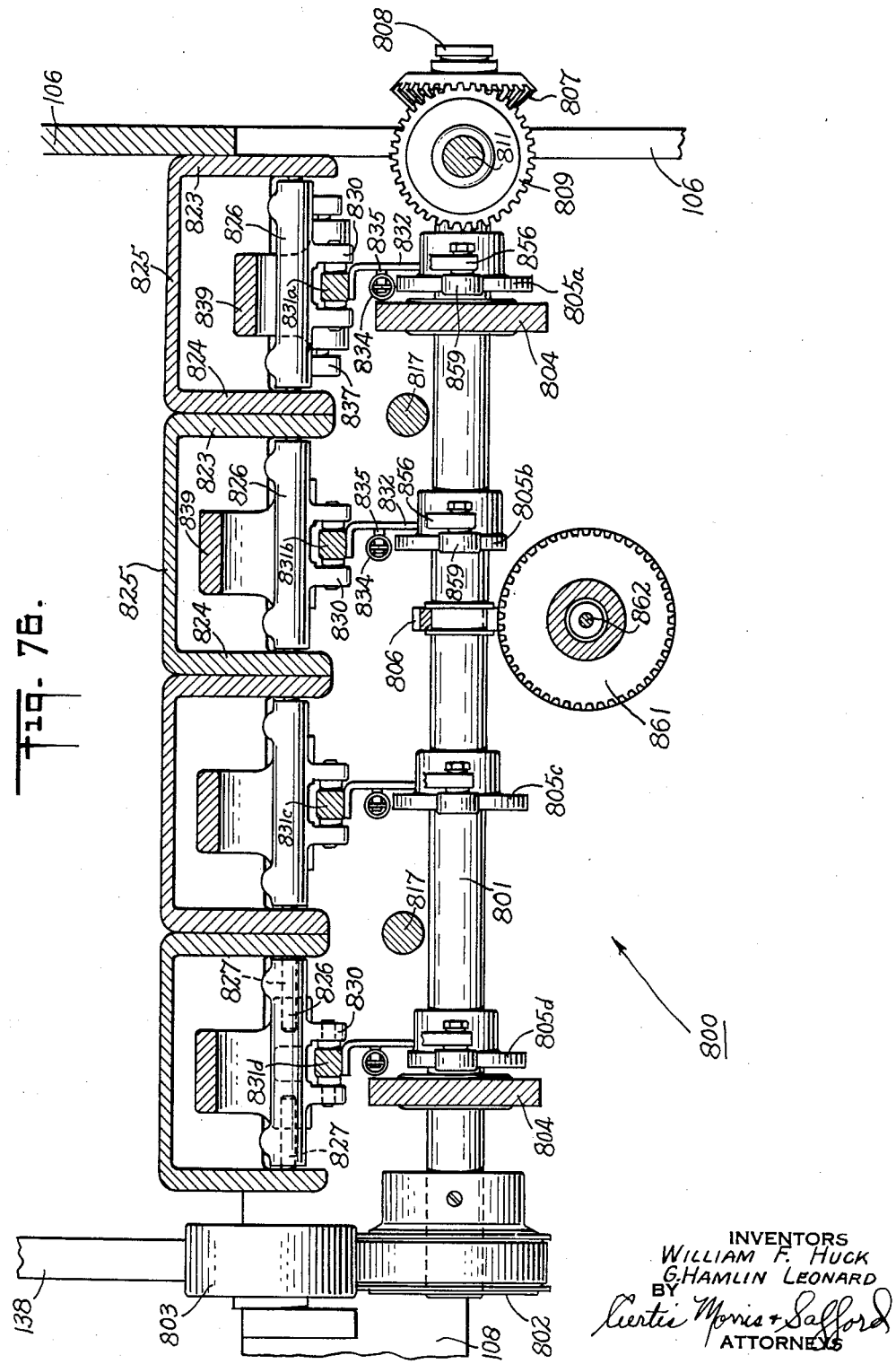

FIGURES 75 to 88 illustrate the stacker and sorting assembly 800, shown schematically in FIGURES 1, 3 and 5. FIGURE 75 is a horizontal section taken on section line 75—75 of FIGURE 5; FIGURES 76, 77, 78 and 79 are sections taken on the correspondingly numbered section lines of FIGURE 75; FIGURES 80 and 81 are sectional views taken on the correspondingly numbered section lines of FIGURE 79; FIGURES 82 and 83 are detailed sectional views taken on the correspondingly numbered section lines of FIGURE 80; FIGURE 84 is a plan view taken on section line 84—84 of FIGURE 78; FIGURE 85 is a detail, on an enlarged scale, taken on section line 85—85 of FIGURE 84; FIGURE 86 is a section taken on line 86—86 of FIGURE 85; and FIGURES 87 and 88 are sections taken on the correspondingly numbered section lines of FIGURE 78.

FIGURES 89 to 96 illustrate the counter assembly 900, shown schematically in FIGURES 1 and 3. FIGURE 89 is a front view partly in section; FIGURES 90 and 91 are sectional views taken on the correspondingly numbered section lines of FIGURE 89; FIGURES 92 and 93 are sectional views, on an enlarged scale, taken on the correspondingly numbered section lines of FIGURE 90; FIGURES 94 and 95 are sectional views taken on the correspondingly numbered section lines of FIGURE 92; and FIGURE 96 is a section taken on section line 96—96 of FIGURE 89.

FIGURE 97 is a flow sheet schematically illustrating signal connections among various parts of the apparatus.

General Assembly

The basic unit 100 of the machine of the invention comprises mechanism for advancing record cards such as illustrated in FIGURE 2 individually and in rapid succession from a magazine 200 along the top of the unit 100 to one or more sensing stations 400 and punching stations 600, as illustrated in FIGURES 1 and 3. The basic unit may be, and preferably is, provided with a stacker unit 800 for selectively collecting record cards that have passed through the sensing and punching stations into two or more classified stacks, a card return 700 that may be attached directly to the basic unit 100, as shown, or to the last of one or more auxiliary units operated by and in conjunction with the basic unit, and a counter 900.

The structural framework of the basic unit 100 includes, as best shown in FIGURES 4 to 10, a lower U-frame comprising front and rear frame members 101 and 102 and a transverse frame member 103, vertical bulkheads 104, 105 and 106, front and rear longitudinal braces 107 and 108 and upper longitudinal members 109 and 110. For mobility, the basic unit is provided with casters 111 and, for levelling, with suitable levelling devices 112.

Drive Mechanism of Basic Unit

The drive for powering the card return, stacker, counter and any auxiliary units between the basic unit and the card return is from a motor 120 to a main drive shaft 121 by way of a belt-connected variable pitch pulley 122 and companion sheave 123, and a gear train 124, 125, 126, 127, 128 for rotating the main drive shaft 121 at a speed of one revolution per machine cycle. To adjust this speed by means of the belt-connected variable speed pulleys 122 and sheave 123, the motor 120 is mounted on a rack 129 pivoted on a pin 130 between bulkheads 104 and 105 and adjusted to a preselected position by means of translating screw and hand wheel 131 against the action of a spring 132. Conveniently, a pointer 133 is mounted on a rack 129 at the pivot pin 130 to indicate speed on an indicator 134 calibrated in terms of cards per minute.

The main drive shaft 121 runs along substantially the entire length of the unit from bulkheads 104 to 106. At the extreme left end, the shaft is provided with a timing device 135 and at the extreme right end, as best shown in FIGURES 4 and 5, with a coupling member 136 for transmitting the drive to the card return mechanism 700 and, if desired, to one or more auxiliary units that may be interposed between the basic unit 100 and the card return unit 700. Between bulkheads 105 and 106, the main drive shaft 121 carries a geared pulley 137 and timing belt 138 for driving, likewise at precisely one revolution per machine cycle, a card stacker cam shaft 801 by way of geared pulley 802 and a tensioning idler 803, as shown best in FIGURE 10. In addition, the main drive shaft 121 carries eccentrics 129 secured thereto by collars 130 for operation of the counter mechanism 900.

To prevent reverse movement of any portion of the machine with consequent damage, maladjustment or jamming of the record cards, the shaft 141 for sheave 123 and gear 124 is provided with an anti-reverse clutch 142. A hand wheel 143 is fixed to the shaft 141 to enable the operator easily to adjust, test and clean the machine.

The idler gear 127 in the train of gears 124—128 engages a gear 144 on a work shaft 145 carrying a fly wheel 146 for steadying the drive of the machine, a matter gear 147 for driving the card feed mechanism by way of companion miter gear 148, a cam 149 for operating a card interrupt device, which is optional on the basic unit, and a cam 150 for actuating a work operator for the sensing and punching mechanisms 400 and 600, respectively. The miter gear 148 is journaled for rotation between a fixed plate 231 and a lower bearing plate 151.

Card Feed Mechanism

This mechanism, as the name implies, is designed to feed record cards at speeds within the approximate range of 130 to 390 cards per minute from a record card magazine 200 along the top of the basic unit 100 and over the work stations such as the sensor 400 and punch 600 for delivery to a card return mechanism 700 and, if desired, across one or more intermediate auxiliary units. This card feed mechanism is best illustrated in FIGURES 4 and 11 to 20.

In the operation of the machine, the record cards to be processed are stacked in a magazine 200 for holding the cards loosely in position over side rail members 201, a central rail member 202 and a pair of intermediate curve slats 203. A weight 204 having projections 205 on the undersurface centered over the slats 203 is placed on top of the stack of cards in the magazine. The function of projections 205 is to bow the cards downward, i.e., slightly concave as viewed from the left end of the basic unit to assure positive contact of the bottom card in the stack with the slats 203 and associated pickers 206 which project upwardly beyond the tops of the slats 203 a distance no more than, and preferably less than, the thickness of a card. In order further to insure positive contact between the trailing edge of the bottom card and the pickers 206, the slats and pickers are mounted for limited free oscillation about horizontal pivot pins 207 laterally of the path of movement of the slats, as shown best in FIGURES 14 and 17, so that the slats may conform to the natural configuration of the actual cards and accommodate themselves to their curvature.

The slats and picker assembly 203, 206 reciprocates to pick up the lowest card in a stack of cards in the magazine 200 at the left end of its stroke and to deliver the card to a transfer position under a pair of pivoted and weighted arms 208, each carrying a shoe 209 pivoted both longitudinally and laterally on a pin 210. As shown in FIGURES 15 and 16, each shoe 209 is adapted to rock longitudinally on pivot pin 210. As shown in FIGURE 16, each shoe has a bore providing a loose fit on pin 210 and counterbores at each end to provide a narrow annular rim engaging the pin to adapt the shoe to rock laterally as well as longitudinally. The surfaces of the slats 203 are made concave, as best illustrated in FIGURE 14, to permit the leading edge of only one card to move under the shoes 209 as the card and the underlying slats are advanced to the right. The left bottom edges 211 of the shoes 209 operate to stop advancement of any card other than the bottom card in the magazine 200.

As the assembly of slats 203 and pickers 206 advances to the right, the pickers 206 pass on either side of the shoes 209. The weight of the arms 208 acting on the card through the shoe 209 artificially distorts the card downward into relief areas 212 so that when the next lower card in the stack comes down behind the card just removed from the magazine, the distortion will allow the shoes 209 to abut the leading edge of the next card, thus preventing it from following the first one until the slat and pusher assembly 203, 206 has completed its stroke and returned to the starting position. The relief areas 212 in the slats 203, in cooperation with the projections 205 on the weight 204, also assure positive feeding of the very last card in the magazine while the weight of the arms 208 acting on the card through shoe 209 assures positive engagement of the trailing edge of the card with the pickers 206 until the end of the advancing stroke is reached.

As the slat and picker assembly 203, 206 approaches the end of its card-advancing stroke, it pushes the trailing edge of a card past spring-biased stops 213. During the succeeding return stroke, the stops 213 keep the card from retreating from the position to which it has advanced while the card is centered and its ends are gripped by an assembly comprising a base rail member 214, an elongated intermediate strip 215 provided with a plurality of spring members 216, a pressure strip 217 and a cover strip 218, best illustrated in FIGURE 20, one such assembly being provided on each side for longitudinal reciprocation along the length of the basic unit. The assemblies 214–218 are held together by means of screws 219 passing through registering threaded holes 220 so that when they engage the ends of a record card it will be held resiliently between the pressure strips and cover strips 217 and 218, respectively, by pressure of the detents 216. This pressure is sufficient to advance the card past the next adjacent spring-biased stops 213 adjacent succeeding working positions for the cards, but insufficient to prevent the stops 213 from holding the cards in their advanced positions while the assemblies 214–218 at each side of the card path are retracted to their extreme left position.

To facilitate entry of a card edge into the card-advancing assembly 214–218, the pressure strip 217 is provided with a ramp 225 and the cover strip 218 is provided with a curved entrance portion 221. For centering the card, the undersides of the cover strips are milled to provide converging guide walls 218a, shown in FIGURES 13, 17 and 19. The major portion of the cover strip 218 is widened, as shown at 222, to support the assembly for sliding reciprocation in grooves 223 of the longitudinal rails 224 on the frame members 109.

In order to accomplish these card-advancing functions, the mechanism described is driven by means of vertical shaft 230 fast to the miter gear 148 and journalled in a fixed plate 231 between bulkheads 104 and 105 for rotating a counterbalance crank 232 carrying an eccentric crank pin 233. The crank pin 233 in turn carries three adjacent rollers 234, 235 and 236. The roller 234, by travel in a longitudinal groove 237, actuates reciprocation of a transverse sliding counterweight 238, best shown in FIGURE 12, in order to cooperate with the crank 232 to minimize vibration. As shown in FIGURE 11, the transverse sliding counterweight 238 slides in grooved members 239.

In order to impart longitudinal reciprocation to the slats 203 and picker 206 assembly for moving record cards from the magazine 200 and to the card end-gripping assembly 214–218 for moving the cards along the working top of the basic unit 100, the next higher roller 235 on the crank pin 233 engages the wear plate 240 of a longitudinally reciprocable carriage assembly comprising a lower frame 241, block members 242 and a transverse spring-retaining pin 243. The base rail members 214 of the assemblies 214–218 are made fast to the block members 242 by any suitable means such as machine screws 253, as shown best in FIGURE 18.

The third roller 236 on the crank pin 233 engages a wear plate 244 for an upper carriage frame member 245 upon which the supports 246 for the horizontal pivot pins 207 of the slats 203 are fixed.

A set of tension springs 247 is secured at one end to studs 248 on the upper frame member 245 and at the other end to the transverse spring-retaining pin 243 of the lower carriage frame so that during normal operation the upper carriage frame 245 and the lower carriage frame 241 reciprocate longitudinally as one unit. The lower carriage frame 241 is reciprocally supported by four rollers 249 riding in tracks 250 of side rail guide members 251, running the full length of the basic unit, and the upper carriage frame member 245 is supported by four rollers 252, likewise riding in the same tracks 250.

The carriage structure described has the advantage of permitting interruption of the card feed from the magazine 200 without interrupting operation of other parts of the machine, such as the work operator 300 for the sensor and punch, the counter, the card return and the stacker. Thus, if the upper carriage frame 245 is held in its extreme left position, as illustrated in FIGURES 4 and 11 by means to be described under the heading of "Card Interrupt Mechanism," the work shaft 145 is free to continue its rotation inasmuch as the lower carriage frame 241 and the card feed assemblies 214–218 can continue the reciprocating movement actuated by the roller 235 on the crank pin 233, the springs 247 then being stretched during each card-advancing stroke of the lower carriage frame 241. If desired, the lower carriage frame 241 may also be held near its extreme right position.

In normal operation, therefore, the upper and lower carriage assembly 240–248 is made to reciprocate longitudinally as a single unit by action of the rollers 235 and 236 against the wear plates 240 and 244. The reciprocating motion of this carriage assembly is counterbalanced by the counterbalance crank 232 on the drive shaft 230 and the transverse sliding counterweight 238. As the carriage assembly 240–248 advances from its extreme left position guided by the rollers 249 and 252 in the tracks 250 of the side rail guide members 251, the pickers 206 engage the trailing edge of the lowermost card in the magazine 200. They push the card under the shoes 209 and past the first set of spring-biased stops 213 into the transfer position. During the return stroke of the carriage assembly, the ends of the card are engaged by assemblies 214–218 and the card is accurately centered therein while it is retained against movement to the left by stops 213. Also during the return stroke of the carriage assembly 240–248, the pickers 206 pass beneath the stack of cards in the magazine 200 so as to be ready to pick up another card on the next forward stroke.

As the carriage continues to reciprocate longitudinally, the card is advanced from the transfer station to successive work stations, one with each forward stroke, by assemblies 214–218, the card being accurately positioned over and held at each work station by stops 213 while the assemblies 214–218, being fixed to block members 242 and reciprocable within the grooves 223 of the rails 224, make their return strokes. This intermittent advancement continues until the card is engaged by the card return 700.

Card Holding Mechanism

As indicated in the description of the card feed mechanism, it is desirable to provide means for interrupting the movement of cards through the machine. It may, for example, be desirable to record identical information from a single record card on several record cards, dick strips, or the like, moving through an auxiliary unit operated by the basic unit. In this event, it is of course imperative that the feed of record cards from the magazine 200 likewise be stopped.

A preferred embodiment of the mechanism for accomplishing these functions is illustrated in FIGURES 4 and 21 to 30, inclusive.

In order to hold the record cards at their various stations, longitudinal shafts 260 and 261 secured for limited rotation to frame members 110 by bearing blocks 262 are provided with curved fingers 263, the tips of which are movable into the path of the cards, as best illustrated in FIGURE 21. As shown in FIGURE 4, opposed fingers are provided at the forward edge of each work station so that when actuated to engage the leading edges of the cards, the cards will not be advanced by the reciprocating movement of the card rail assembly shown in FIGURE 20.

The feed of cards from the magazine 200 is arrested at the same time by simultaneous actuation of a stop latch 264 for engaging a stop block 265 on the upper carriage frame 245, as shown in FIGURES 27 to 30, so that the upper carriage frame will be locked near its extreme left position, as seen in FIGURE 4, while the lower carriage frame 241 continues its longitudinal reciprocation.

The curved fingers 263 for arresting the forward movement of the record cards across the work table are actuated by a rocking of shafts 260 and 261. Shaft 260 is given a counterclockwise rocking motion and shaft 261 a clockwise rocking motion, as seen in FIGURE 21, by similar rocking motions imparted to arms 266 and 267 upon movement to the right of a connecting link 268 biased by spring 269 to follow the outer peripheral surface 270 of cam 149 on the work shaft 145 through the medium of a cam follower 271. So long as no signal is received for actuating the card interrupt mechanism, the link 268, and therefore shafts 260, 261 and fingers 263, will be kept immobile by the action of a latch 272 in engagement with a latch stop 273 fixed to the link 268.

Upon receiving a signal through the medium of a Bowden wire 274, the end of the Bowden wire in a Bowden angle block 275 supported on a plate 151 mounted on bulkhead 105 rotates an L-shaped leaf spring 276 about a pin 277 and against the action of a tension spring 278 to urge a small dual cam follower 279 against the face 280 of the cam 149. This cam follower 279 then also engages a second peripheral cam surface 281 on the cam 149, as shown best in FIGURE 23, and operates, when actuated by the crest 282 of the cam surface 281, to rotate a crank 283 on which the small cam 279 is mounted by means of pin 284 and friction-retaining spring 285, to be rotated clockwise, as seen in FIGURE 21, on a pivot pin 286 against the action of spring 287 to release the latch 272 from the latch stop 273. After passing the crest 282 of the cam surface 281 the cam follower 279 is moved longitudinally by the action of the inclined face 280 of the cam 149 so as to disengage the cam follower 279 from the peripheral cam surface 281 until it is again actuated by a signal transmitted by a Bowden wire 274.

After releasing the latch 272 from the latch stop 273, the spring 269 urges the link 268 to now follow the peripheral cam surface 270 which, during one revolution of the cam 149, causes the entire link 268 to move first to the right and then again to the left, as seen in FIGURE 21. This in turn imparts equal but opposite angular oscillation to the arms 266 and 267 and therefore to shafts 260 and 261 which in turn move the curved fingers 263 into the path of the record card, as indicated in dashed lines on FIGURE 21.

To also stop feeding of the record cards from the magazine 200 by stopping reciprocation of the slats 203 and pickers 206, the shaft 260 is provided, at the left end as seen in FIGURE 4, with a U-shaped leaf spring 290 made fast against the shafts 260 and 261 by a U-shaped block 291 and guide post 292 retained in position by a bolt 293. The rocking of the shaft 260 actuated by the initial movement to the right of the link 268 causes the assembly 290-293 resiliently to push the stop latch 264 inward to engage the block 265 on the upper carriage frame member 245, as shown successively in FIGURES 27, 28 and 29, and thus prevent the upper carriage frame member from advancing with the lower carriage frame member 241 under the action of springs 247. When the shafts 260, 261 are rocked back to their initial positions, as shown in FIGURE 30, the leaf spring 290 urges the stop latch 264 outwardly so that as the lower carriage frame assembly 240-243 returns toward its leftmost position under the urging of tension springs 247 and the binding force of the stop block 265 on the latch 264 in a guide block 294 diminishes, the latch 264 is released to its outermost position. Reciprocation of the upper carriage frame 245, and therefore feed of the record cards from the magazine 200, can then be resumed.

If desired, the reciprocating motion of the lower carriage frame 241 can also be halted near the forward end of its stroke by devices similar to those described with reference to the upper carriage frame member 245.

In operation, therefore, the receipt of a signal in the form of a push by the end of a Bowden wire 274 moves the dual cam follower 279 into engagement with the cam surfaces 280 and 281. This operates to disengage the latch 272 from the latch stop 273 and to enable the spring 269 to urge the cam follower 271 to follow the cam surface 270 of the card interrupt cam 149. As a result, the link 268 moves to the right and then again to the left, as seen in FIGURE 21, to oscillate the shafts 260 and 261 whereby the card interrupt fingers 263 are moved into the path of the cards and the resilient assembly 290-293 operates to lock the upper carriage frame 245 in its leftmost position.

The pickers 206, being mounted on the upper carriage frame 245, are thereby restrained from advancing the next lowest card in the magazine 200 and the fingers 263, being depressed in the paths of the cards engaged by the still reciprocating assembly 214-218, engage the leading edges of the cards and prevent their advancement in much the same way as the spring-biased stops 213 prevent the cards from being moved to the left by engagement with their trailing edges. The cam surface 280 on the cam 149 operates to bring the dual cam follower 279 out of engagement with the cam surface 281 and, unless the signal is repeated, thereby permits the latch 272 to lock against the latch stop 273 upon return of the fingers 263 and upper carriage frame locking assembly 290-293 in their retracted positions when the link 268 reaches its extreme left position, as seen in FIGURE 21.

The card interrupt mechanism can readily be converted into a card release device by means of which the record cards are allowed to advance from one station to the next only upon receipt of a signal by one of the Bowden ends 274. In this modification, the positions of link 268 and arms 266 and 267 are the reverse of that shown in FIGURE 21, arms 266 and 267 being connected to shafts 261 and 260, respectively. The spring 269 and the cam follower 271 remain in the same positions, and are therefore mounted on the other side of the link 268 so that in the latched position of the link 268 the curved fingers 263 and the locking assembly 290-293 will be turned inward to engage the leading edges of the cards and lock the upper carriage frame 245. Upon receipt of a signal, the latch 272 will be momentarily unlocked by the action of cam follower 279 and the spring 269 will urge the cam follower 271 to follow the contour 270 of the cam 149 to move the link 268 first to the right and then to the left in one cycle, thereby to rotate shaft 260 clockwise and shaft 261 counterclockwise to momentarily inactivate fingers 263 and locking assembly 290-293.

*Work Operator*

The work operator is an assembly designed to provide the forces necessary to a proper operation of sensing units, punch units and possibly other units on the work table of the basic unit. Basically this is accomplished by imparting vertical reciprocation to substantially the entire sensing unit and punching unit, for example, in such a manner as to relieve sensing elements and Bowden wires, individually or in groups, from exerting the entire force necessary to perform their respective functions in a given sensing or punching operation, as will become more evident in the detailed descriptions of the sensing and punching units that are to follow.

Underneath the longitudinal frame members 109 and between the longitudinal frame members 110, and to the right of the record card magazine 200 and rails 201, 202, as seen in FIGURE 4, a rectangular frame 300 is provided for vertical reciprocation guided by four bearing blocks 301. As seen in FIGURE 31, the work operator frame 300 is divided into any desired number of sections by means of cross members 302 to accommodate sensing and punching assemblies described later.

H-shaped spring plates 303 are suitably made fast, one to each of the ends of the work operator frame 300, for carrying the upper ends of a plurality of tension springs 304. The lower ends are secured to U-shaped spring plates 305 carried by generally Y-shaped braces 306 that are secured to longitudinal frame members 109 and 110.

The work operator frame 300 is supported against the downward pulling action of the tension springs 304 by links 307 pivotally connected to the ends of the frame and also to arms 308 and 309 adjacent the left end of the work operator frame 300. The ends of the arms 308 and 309 are linked together by another link 310, as shown best in FIGURE 32. The arms are keyed to the ends of oscillatable shafts 311 and 312 which are parallel to and below the sides of the work operator frame 300. The other ends of the shafts 311 and 312 are made fast to arms 313 and 314 each carrying, like arms 308 and 309, links 307 having one end pivoted on the right end of the work operator frame 300.

The arm 308 fast on the shaft 311 is provided with a cam follower 315 for following the contour of the work operator cam 150 on the work shaft 145.

It is apparent, therefore, that as the work operator cam 150 rotates, the cam follower 315 will be urged to follow its contour by action of springs 304 so as to oscillate the arms 308 and 309, and therefore also shafts 311 and 312 which in turn oscillate the arms 313 and 314 so that the four links 307 act simultaneously and with equal force to raise and lower the work operator frame 300 once for each revolution of the work shaft 145. The relatively short, substantially circular portions of the work operator cam contour intermediate the high and low portions thereof, as shown best in FIGURE 32, operate momentarily to slow the movements of the work operator frame between the lower and upper portions of its vertical stroke.

*Sensor*

One or more sensor assemblies may, if desired, be supported on the frame for actuation by a work operator 300. In the basic unit illustrated by way of example in FIGURES 35 to 50 of the drawing, a sensor 400 is shown in the first work station immediately to the right of the rail members 201 and 202 of the card feed mechanism.

It is the function of the sensor to sense whatever perforations there are in a record card advanced to the sensing station and to transmit the sensed information to other parts of the basic unit, e.g., the punch, the counter or the stacking mechanism or any combination thereof and, if auxiliary units are operated in conjunction with the basic unit, to said auxiliary units as well. The sensing mechanism is also capable of receiving a repeat signal that will cause the sensor to lock in a sensed signal pattern and to repeat the same signal for a number of cycles depending upon the information sensed and to transmit such signals to one or more auxiliary units and, if desired, to the counter. Signal-receptive means are also provided for releasing a locked-in signal pattern.

A unique feature of the sensing mechanism described is that it can readily be adapted, as will appear, to the sensing of either circular or the more closely spaced rectangular perforations that are predominantly used in record cards today, as well as to other perforated record indicia. It is also unique in that it does not require a massive supporting structure to surround the card being sensed and therefore has the advantage of easy correction in the event of a jam. The sensing mechanism is entirely below the work table of the basic unit, only a cover plate, which is readily removable, being above the path of the cards.

As best shown in FIGURES 35 to 50, the sensor comprises a rectangular frame that includes a left face plate 401 (left as viewed from the front of the basic unit 100 and as in FIGURE 36), a right face plate 402, a front end block 403 and a rear end block 404, these frame members being fastened together rigidly by means of machine screws and locating pins, not shown.

Up to twelve intermediate plates 405 are secured between and parallel to plates 401 and 402 by means of aligning rods 406 and chamfered aligning buttons 407, the intermediate plate 405 adjacent the right face plate 402 being spaced from the interior face thereof by a ledge 408 on the plate 402.

The entire frame, including plates 401, 402 and 405, and blocks 403 and 404, is supported on cross braces 409 between longitudinal frame members 109 and 110, at the left side, by means of rails 201 and 202 and machine screws 410 threaded into left face plate 401 and at the right side by means of a bevelled plate 411 and machine screws 410 threaded into right face plate 402.

The upper ends 412 of the intermediate plates 405 form a sensing table that is preferably covered by a cover 413 on which a card rests while in sensing position. The cover has holes large enough to permit penetration by sensor fingers 414 but small enough to prevent chad accidentally entrained with the cards from entering the sensor, as shown in FIGURE 35, and secured, under rails 201 and 202, to the left cross brace 409.

To help maintain a record card that has been advanced to the sensing position by the assemblies 214–218 reciprocating longitudinally in the grooves 223 of the rails 224 and properly positioned over the sensing station by a pair of spring-biased stops 213 against the upward thrust of sensor fingers 414, a cover 415 is releasably locked over and across the path of the cards by suitable snap locks 416. As shown best in FIGURES 38 and 41, the locks 416 comprise plates 417 slidable in longitudinal blocks 418 for engaging lips 419 of the cover 415 under the actions of springs 420. The cover 415 can, therefore, readily be removed if desired simply by pulling knobs 421 and lifting.

To enable the sensor fingers 414 to move through a card perforation, as shown in phantom in FIGURE 46, the underside of the cover 415 is provided with longitudinal grooves 422. The ribs 423 formed between the grooves 422 are suitably bevelled as shown at 424 to assist in properly guiding the record cards and spaced to avoid sensor fingers penetrating through either round holes or the more closely spaced rectangular perforations of cards being processed. The tops of the intermediate plates 405 are preferably also bevelled, as shown at 425, particularly if operation without the cover 413 is contemplated.

As shown best in FIGURES 36 to 38, the underside of the cover 415 is preferably also provided with narrow transverse grooves 426 to accommodate a card detecting mechanism, and a wider transverse groove 427 for avoiding contact, and possible smearing, of printed matter on the faces of the cards. To assist in reading the printed matter, which is often applied to the cards in reverse, the cover is preferably made of a transparent material and provided with a mirror 428.

With the exception of the sensor fingers 414, the parts of the sensor mechanism thus far described remain stationary during operation.

The sensor fingers 414 are, as shown best in FIGURES 45 and 46, the upper extremities of sensor slides 430, which are slidable vertically in the slots 431, as shown in FIGURE 35, of the intermediate plates 405. Inasmuch as the construction and operation of all the sensor slides are alike, the description thereof with reference to one sensor slide 430 will suffice.

In the reset position illustrated in FIGURE 45 the sensor slide 430, confined for vertical movement in the slot 431 by adjacent sensor guide channels 432 parallel to and between the plates 430, is pushed upward by upward movement of a flipper 433 in the same slot 431, the cammed head 434 thereof being in engagement with the cammed foot 435 of the slide 430.

The flipper 433 has a notch 436 engaged by the toe 437 of a flipper channel 438 mounted at its ends 439, as shown best in FIGURES 38 and 50, on front and rear operating channels 440 for vertical reciprocation between adjacent intermediate plates 405. The operating channels 440, together with a front face plate 441 and a rear face plate 442, are secured by means of mounting blocks 443 to the work operator frame 300. It will be apparent, therefore, that as the work operator frame 300 moves up and down once during each revolution of the work shaft 145 and as determined by the contour of the work operator cam 150, the operating channels 440 and face plates 441, 442, and therefore the flippers 433, will likewise be raised and lowered.

In order to urge the sensor slide 430 to rise and thereby the finger 414 to sense a record card in the sensing position when the flipper 433 rises, the flipper is biased for counterclockwise rotation about the toe 437 of the flipper channel, as seen in FIGURE 45, by means of a spring 445, the upper and lower ends of which are anchored in the upper bend of the next adjacent flipper channel 438 and in the body of the flipper 433, respectively. This, as well as the moment applied to the flipper by upward movement of the toe 437, urges the cammed head 434 against the foot 435 and so transmits the upward movement of the work operator frame 300 to the sensing finger 414.

If there is a perforation in the card at the position being sensed by the finger 414, as illustrated in FIGURE 45, the finger encounters no obstruction to movement into a groove 422 of the cover 415, thus permitting the sensor slide 430 and flipper 433 to move upward, slowly at first, during the latter part of the upward movement of the work operator frame 300 without changing their positions relative to one another. The flipper 433 is lowered on the downstroke of the flipper channel 438 in the position shown in FIGURE 45 to thereby engage and press down with its foot 446, as illustrated in FIGURE 47, staggered Bowden cables protruding upward from a Bowden terminal plate 448 made fast to the underside of the sensor frame by means of machine screws 449 threaded into the left and right face plates 401, 402. The signalling of a perforation is, therefore, accomplished by pushing the corresponding Bowden ends while the sensed card is moved to its next station.

Before proceeding further with the description, it is noted that the sensing and signalling mechanism described is as readily adaptable to record cards having more closely spaced rectangular perforations as it is to those having round holes, the only departures from the mechanism specifically described herein for illustrative purposes being that the intermediate plates 405 would be provided with a correspondingly greater number of more closely spaced slots 431 to accommodate the greater number of sensor slide and flipper assemblies 430, 433 required, and the feet 446 of the flippers would be made smaller so as directly to actuate one rather than two Bowden cables in view of the limitation on the spacing thereof.

It is to be understood also that in many instances there is no necessity for sensing more than a limited area of the record cards to be sensed. It is within the scope of the invention, therefore to include a lesser number of sensor slide and flipper assemblies 430, 433, guide channels 432 and flipper channels 438 than can be accommodated within the confines of the sensor frame members 401–404.

Simultaneously with the downward movement of the flipper 433 actuated by the flipper channel 438, the raised sensor slide 430 (the finger 414 not having been obstructed from moving into a groove 422) is urged to follow and remain in contact with the flipper 433 by the action of the foot 450 of the descending guide channel 432 against a lug 451 so that the finger 414 will be withdrawn from a sensed perforation in a card. The guide channels 432, being fitted at their ends under the upper rails of the operating channels 440, as shown in FIGURE 38, move downwardly with the latter and, therefore simultaneously with the flippers 433.

If, on the other hand, there is no perforation in the card at the position being sensed by the finger 435, the sensor slide 430 is prevented, on the upstroke of the work operator frame 300, from moving any higher than the position indicated in solid lines in FIGURE 46. This forces the cam surface of the flipper head 434 to slide over the cam surface of the sensor slide foot 435, causing the flipper 433 to rotate clockwise against the action of spring 445 to the position shown in FIGURE 46 as the flipper channel 438 carries it upward. On the downstroke of the flipper channel 438, the sensor slide 430 is carried down with the flipper 433 by reason of a pinching of the slide 430 between the flipper head 434 and the adjacent flipper channel 438, and further by the engagement of heel 452 against the lip 453, until the flipper foot 446, due to the rotated position of the flipper 433, has avoided the Bowden pins 447, as shown in FIGURE 48, and come down beside them near the bottom of the stroke. At this point, the corner 454 engages a reset bar 455, thus arresting further downward movement of the slide 430 and causing the heel 452 and lip 453 to slide over one another. As soon as the upstroke has gone far enough for the foot 446 to clear the tops of the Bowden ends 447, the flipper snaps back to the position shown in FIGURE 45 under the influence of the spring 445.

To avoid having all the sensor slide and flipper assemblies 430, 433 operate to actuate a signal for all associated Bowden ends 447 when there is no record card in the sensing station, card detectors 460 are provided for movement within the transverse grooves 426 in the cover 415. The detectors 460, as shown in FIGURES 36, 37 and particularly in FIGURES 39, 40, 43, 44 and 49, are L-shaped levers, the feet 461 of which are pivoted on pins 462 at the heel ends within slots 463, as shown in FIGURE 39, of the left face plate 401.

As shown best in FIGURES 43 and 44, a top stop slide 464 is slidably mounted next to and for actuation by each card detector 460. The left end is accommodated in slot 463 of the plate 401 alongside the foot 461 of the card detector 460; it has a horizontal slot 465 for slidably engaging pin 462; it has a slot 466 engaged by a bent toe 467 on the foot of the card detector; and a stop 468 for selective abutment against the top of a guide channel 432. The right end is accommodated in and passes through a slot 470, as shown in FIGURE 40, of the right face plate 402; has a horizontal slot 471 for slidable support by a pin 472; a stop 473 for selective abutment against the top of a guide channel 432; and a vertical slot 474 for actuating a slide connector 475 mounted in a horizontal groove 476 on the outside face of the plate 402 and spring-biased by a compression spring 477 to rotate the slide connector 475 in a clockwise direction as seen in FIGURES 43, 44 and 49.

It will be apparent that when the card detectors 460 are depressed by a card against the action of compression spring 477 between slide connector 475 and right face plate 402, the toe 467 acting in the slot 466 thereof causes the top stop slides 464 to move toward the left face plate 401 (to the left as seen in FIGURE 44) and therefore to allow the guide channels 432 to move up with the operating channels 440. When, however, a card is not detected and the arms of the detectors 460 are free to rise into their associated grooves 426, the spring 477 moves the slides 464 to the right, as seen in FIGURE 43, whereupon the stops 468 and 473 are positioned directly over the end guide channels 432. On the upstroke of the operating channels 440, the channels 432 abut the stops 468 and 473 and are therefore prevented from continuing their upward movement against the action of tension springs 480, which connect spring angles 481 to support the channels 432 resiliently against the top rails of the operating channels 440, as shown best in FIGURE 38. As a result, the feet 450 of the various guide channels 432 engage lugs 451 to hold all the sensor slides 430 down and to make the flippers 433, in their continued upstroke, pivot clockwise so that on the downstroke their feet 446 will all avoid the Bowden ends and therefore not send a signal.

The sensor 400 illustrated in the drawing is also provided with a mechanism for repeating a given combination of signals sent by actuation of a given group of Bowden ends 447 in the plate 448 without requiring a number of identical record cards equal in number to the repetitions of signal. By this means, a given card can be sensed once and then continue its passage through the machine while the signal or combination of signals transmitted to the Bowden ends by the sensor will be repeated a predetermined number of times.

To accomplish this result, the reset bars 455, which normally do not move vertically and engage the corners 454 of the sensor slides 430 on the downstroke of the operating channels 440 so as to reset the assemblies 430, 433 from the position shown in FIGURE 46 to that illustrated in FIGURE 45, are actuated to move up and down with the assemblies and thereby to maintain the flippers 433 in the non-striking, rotated position. To this end, the slotted ends of the reset bars 455 are supported on two lift bars 489, as shown best in FIGURE 38. The lift bars 489 pass through slots 490 of the guide channels 432 and the ends thereof are supported for simultaneous vertical movement in notches 491 of repeat sensing plates 492, as shown best in FIGURES 39 and 40. One of the plates 492 is movable vertically in a generally cross-shaped groove in the interior surface of the left face plate 401, the groove having a head portion 493, a foot portion 494, an arm portion 495 and a body portion 496. The other plate 492 is movable vertically in a similar groove in the interior surface of the right face plate 402, this groove being a mirror image of the cross-shaped groove in plate 401 and having a head portion 493a, foot portion 494a, arm portion 495a and body portion 496a directly opposite the corresponding groove portions in the plate 401.

The repeat sensing plates 492, like the grooves in which they are movable, comprise head portions 497, foot portions 498, arms 499 and body portions 500. The head and foot portions 497, 498 are slidable longitudinally (vertically) in the groove portions 493 and 494 (493a and 494a of plate 402) and the arm and body portions 499, 500 carrying the ends of the lift bars 489 are slidable laterally (vertically) in groove portions 495 and 496 (495a and 496a of plate 402). The face plates 401 and 402 are drilled at 501 to accommodate plungers 502 spring-biased against the upper surfaces of the body portions 500 so as to urge the repeat sensing plates 492, and hence the reset bars 455, toward their lowermost non-operative positions.

Referring specifically to FIGURE 43 showing the repeat mechanism in the non-operative position, it will be noted that the feet 500 and 500a of the repeat sensing plates 492 abut against projections 503 and 504 on an understop slide 505 under the urging of the spring plungers 502. Since the repeat sensing plates 492 cannot go down any further than the positions shown in FIGURE 43 so long as they abut projections 503 and 504, the lift bars 489 and therefore the reset bars 455 likewise cannot move down with the downstroke of the operating channel 440 with the result that the upper edges of the reset bars 455 will engage corners 454 of the sensor slides and thereby disengage the flippers 433 from the position shown in FIGURE 46 to that shown in FIGURE 45.

Upon receipt of a signal transmitted by way of either of the Bowden cables 506, shown in FIGURE 43, the cable ends engage one of the buttons 507 on a lever 508 pivoted on a pin 509 within a slot 510 in the right face plate 402. This rotates the lever 508 in a clockwise direction against the action of a spring 511 hooked at one end to the lever 508 by pin 512 and at the other end to a latch 513 pivoted on a pin 514 within a slot 515 in the left face plate 401.

Upon receiving a signal for a repeat operation and clockwise rotation of the lever 508, the end of the latch 513 engages a catch 516 on the lever 508 to lock the lever 508 into its rotated position. Also upon rotation of the lever 508 a pin 517 secured to the lever 508 is caused to move to the right, as seen in FIGURE 43, along a slot 518 in one end of the understop slide 505. A spring 519 hooked at one end over the pin 517 and at the other end over a pin 520 on the slide 505 urges the slide 505 to the right. When the operating channels 440 reach the top of the upstroke, the lower end of the channel adjacent the rear face plate 442 comes into contact with the lower edges of ears 529 on the repeat sensing plates 492 and thus briefly jogs them momentarily to remove their pressure on the projections 503 and 504 and permit the understop slide 505 to slide to the right under the urging of spring 519 on the pins 517 and 521 which is mounted in a slot 522 of the left face plate 401 after receipt of a signal to inactivate the repeat mechanism.

It will become apparent that as long as the understop slide 505 is locked in the repeat position, shown in FIGURE 44, i.e., by engagement of the end of the latch 513 with the notch 516 in the lever 508 and the tension thereby applied to spring 519, the foot portions 500 and 500a of the repeat sensing plates 492 will be able to move down alongside the projections 503 and 504 under the urging of spring plungers 502. This in turn releases the lift bars 489 and therefore also the reset bars 455 so they can move down with the operating channel 440 and thereby follow the movements of the sensor slide and flipper assemblies 430, 433 to avoid disturbing their no signal relationship shown in FIGURE 46.

Ordinarily there will be no movement of record cards over the sensing station so long as the repeat signal is in effect and the understop slide 505 is in the position shown in FIGURE 44. To avoid having the card detector mechanism maintain the topstop slides 464 in the stop position shown in FIGURE 43 under the urging of spring 477, however, a connecting lever 523 pivotally mounted on a pin 524 within a vertical slot 525 in the outer face of the right face plate 402 is provided, as shown best in FIGURES 40, 43, 44 and 49. The end 526 of the lever 508 engages the foot 528 of the lever 523 to rotate the lever about the pivot pin 524 in a counterclockwise direction and thereby to rotate the slide connector 475 counterclockwise against the action of compression spring 477 in order to maintain the topstop slides 464 in the release position, shown in FIGURE 44, so that the guide channels 432 will be free to reach the top of their stroke.

Upon receipt of a signal through either or both of Bowden wires 527 to inactivate the repeat mechanism, the latch 513 is caused to rotate counterclockwise about pivot pin 514 by the action of the Bowden ends against buttons 528, thereby releasing the end of the latch from the notch 516 of the lever 508. By reason of the tension of the spring 511, the lever 508 is thereupon rotated counterclockwise to the position shown in FIGURE 43. The pin 517 on the lever 508 pushes against the end of slot 518 in the understop slide 505 so that as soon as the lower edges of the body portions 500 and 500a of the repeat sensing plates 492 are raised sufficiently during the upstroke of the operating channels 440, the understop slide 505 will likewise move to the left so that projections 503 and 504 thereon will be in position immediately underneath the body portions 500 and 500a and therefore stop any further downward movement of the repeat sensing plates 492. This in turn prevents the lift bars 489 and the reset bars 455 from moving down during the downstroke of the operating channels 440 with the result that all the flippers 433 in the non-striking position, illustrated in FIGURE 46, will be reset to the striking position by virtue of the engagement of the upper edges of the reset bars 455 with the corners 454 of the sensor slides 430.

At the same time the movement to the left, as seen in FIGURES 43 and 44, of the end 526 of the lever 508 causes the connecting lever 523 to rotate clockwise around its pivot pin 524 under the urging of spring 477. This in turn, as described previously, urges the topstop slide 464 to the right to activate the card detectors 460.

While ordinarily there will be no movement of record cards over the sensing station while the repeat signal is in effect, it is to be understood that such cards may nevertheless be moved over the sensing station. If such cards have perforations in all of the positions for which the fingers 414 are set to be moved into the grooves 422 of the cover 415 at each upstroke, there will be no effect on the setting of the sensor. If, however, one such card does not have a perforation at a location where a finger 414 is set to penetrate the card, then the sensor slide 430 for that location will be stopped by the card during the upstroke and the flipper 433 for that sensor slide will assume the position illustrated in FIGURE 46. Thereafter, with each stroke of the sensor the foot 446 of the flipper 433, whose position relative to the sensor slide 430 has thus been altered, will avoid contact with the Bowden ends 447 and therefore not send a signal until the repeat mechanism has been inactivated.

In order to provide means for sending a signal for each stroke of the work operator regardless of whether it is in the repeat or non-repeat position and whether or not there is a card in the sensing position, the rear face plate 442, as shown best in FIGURE 38, is provided at its bottom with a bent portion 530 for engagement with a Bowden end 531.

If all cards to be sensed do not have at least one perforation in a given location, means can nevertheless be provided for counting the number of sensing strokes in a given run. This is accomplished by using a sensor slide 430 not having a finger 414 and connecting the corresponding signal dispatching means so as to actuate a counter in the counter assembly 900. Such a sensor slide, never making contact with a card, will not change the position of its associated flipper to the no-signal position. The associated flipper will, therefore, remain in the signal position shown in FIGURE 45 unless the card detector mechanism, not detecting a card at the station, causes all flippers to be moved to the no-signal position.

*Punch Assembly*

It is the function of the punch assembly 600, as the name indicates, to perforate a record card in response to signals received from another part of the machine, e.g., the sensor, or from an external source. The assembly and its component parts and structure are illustrated in FIGURES 51 to 68 of the drawing.

The punch assembly specifically described herein for purposes of illustration is provided with a mechanism for nullifying the effects of punch signals received by the assembly unless a special qualifying signal is also received, as well as with a device for locking the mechanism so that it will punch in accordance with actuating signals regardless of whether a qualifying signal is received.

Referring now primarily to FIGURES 51, 52, 53 and 60, the assembly comprises a die plate 601 in a die bed 602 supported on longitudinal blocks 418 above the card path, and a fixed frame including a top punch plate 603, a punch bed 604, a punch under plate 605, left and right spacer bars 606, a punch flipper plate 607, and rear and front end plates 608 and 609, respectively, below the card path.

The die plate 601 is perforated with round or rectangular holes, depending upon the record indicia system employed, round holes being shown for purposes of illustration. The plate 601 is dowel fitted and screwed to the die bed 602 and, as shown best in FIGURE 52, is latched to longitudinal block 418 by means of a spring-biased lock 416 similar to that for the sensor cover plate 415 so that the die plate-die bed assembly 601, 602 can be removed simply by pulling the knobs 421 and lifting them off as a unit.

The top punch plate 603 is properly located with respect to the punch position of the cards by means of dowels 610 in the top punch plate and in cross brace members 409 and the left (as seen in FIGURES 51 and 53) card guide plate 411. The plate 603 is clamped by punch bed 604 bolted to longitudinal blocks 418 against rails 224 by means of bolts as shown best in FIGURE 52. Aligning pins 612 are used to align the holes in the top punch plate 603 accurately with those in the die plate 601.

The screws 614, tapped into spacer bars 606, clamp plate 605 to bed 604 and in effect support the entire lower and most readily removable portion of the punch assembly 600. Flipper plate 607 is made fast to spacer bars 606 and plate 605 by machine screws 615 and in turn supports end plates 608 and 609 on bosses 616, as shown best in FIGURES 53 and 60. The lower portions of the end plates 608 and 609 are connected to bosses 617 on side plates 618, from which a Bowden connector block 619 is hung and between which a group, twelve in the embodiment shown, of intermediate flipper guide plates 620 are fixed by means of aligning rods 621.

The parts described to this point are all stationary during the operation of the punch assembly 600. It will be apparent that by unscrewing the screws 614 and disengaging the rail blocks 640 from the work operator, the entire lower portion of the assembly including punch under plate 605 and the parts beneath it can readily be dismounted for inspection or replacement.

The flipper guide plates 620 are slotted, as best shown in FIGURE 59, slidably to receive set-up blanks 622, the upper end of which have bent ears 623 slidably engaged with flippers 624, the upper socket ends 625 of which are in turn connected to punches 626, as shown in FIGURES 63 to 65. Each set-up blank 622 is provided with a positioning slot 627 slidable on a stud 628 on a lift bar 629, and is retained thereon by an adjacent spacer plate 630.

When a punch signal is received by upward movement of a Bowden end 631, it acts on a foot 632 to elevate set- up blank 622 to the position shown in FIGURE 65, the blank 622 at the same time being pivoted counterclockwise against the action of a spring 633 on a spring sheet 634 due to movement of the slot 627 of the stud 628. This causes ear 623 to pivot flipper 624 clockwise around the ball end of punch 626 so that the point 635 will be brought into a position directly in line with a notch 636 on lift bar 629.

It is to be understood that when the punch assembly is set up to punch more closely spaced rectangular or other shaped holes, the set-up blanks 622 will be closer together and that each will of necessity be provided with a foot engageable by only one Bowden end, rather than two, as shown. It may also be necessary, due to spacing requirements, to stagger the rows of Bowden ends 631 in the block 619.

The spring sheet 634, lift bar 629 and spacer plate 630 are repeated in sequence across the narrow length of the punch assembly. These members are positioned in slots 637 of side rails 638 and held in place by keys 639, as shown best in FIGURES 53 and 68. When the punch assembly is set up to punch more closely spaced rectangular holes in the record card, the spacer plates 630 are replaced by spring sheet and lift plate assemblies 634, 629. It is to be understood of course that by variation of the spacing of the slots 637 in the side rail members 638 various types of cards can be accommodated. The rail members are reciprocated vertically by abutment with rail blocks 640 so as to travel with the work operator 300 for the upper portion of its stroke.

It will be apparent, therefore, that when a Bowden end 631 moves up in response to a signal, the corresponding flipper 624 is moved so that the pointed end 635 thereof will be in line for engagement by the notch 636. At the beginning of the upper portion of its stroke, the work operator 300 makes contact with the side rails 638, and thereupon, during the upper part of its stroke, will elevate the entire assembly including spring sheets 634, lift bar 629, spacer plates 630, flippers 624 and punch 626 to punch a hole in the card at the punch station. The material punched from the card is pushed up through the die plate 601 and into the die bed 602 for disposal.

When a punch signal is not received, upward movement of the lift bar 629 will simply cause the notch 636 to move up past the flipper point 635 so that the corresponding punch 626 will not be actuated.

To retract an actuated punch 626, the lower edge of a punch stripper plate 641 abuts against and pushes down the flipper 624, the punch stripper plate being urged downwardly by compression springs 642, shown in FIGURE 60, abutting at the upper end against plates 605 and at the lower end against movable end plates 643 fast to side rails 638. The punch 626 is thereby pulled down by the socket in the upper end of flipper 624. The socket end of the flipper 624, shown in FIGURES 63 to 65, is so shaped that when the punch stripper plate 641 bears against it, it tends to rotate the flipper in counterclockwise direction, aided by spring 633, so as to avoid reengagement of point 635 with notch 636. The downward travel of the assembly 638, 641, 643 is arrested by the punch stripper plate 641 coming to rest on the punch flipper plate 607.

To retract the set-up blank 622 while an actuated punch 626 is performing its function, a reset bar 644, shown in FIGURES 53, 60 and 63 to 65, is provided to engage a ledge 645 on set-up blank 622 with its lower edge, normally after the side rails 638 have been engaged by the rail blocks 640 and the notch 636 has engaged the pointed end of flipper 624. The ends of the reset bars 644 are mounted on notched cross keys 646 and 646a which are in turn connected at their respective ends to reset links 647, as shown best in FIGURES 53 and 55. The links 647 each have a roller 648 for vertical movement in slots 649 of the stationary side plates 618 and are actuated for vertical reciprocation by slide cams 650 by engagement of ears 651 on links 647 in recesses 652 in slide cams 650, the ears 651 and end portions of links 647 being bent outward to the planes of the associated slide cams 650, as shown best in FIGURE 59.

During normal operation, the slide cam 650, shown best in FIGURES 54 to 59, is movable vertically and horizontally by reason of the camming action of rollers 653 in angle slots 654 in slide cams 650. The rollers 653 are rotatable on studs fixed to a cam follower plate 655 (see FIGURE 55) slidable horizontally below and in the same plane as the central portion of reset link 647 on rollers 656 mounted for rotation on the stationary side plate 618. The cam follower plate 655 on each side of the assembly 600 carries a cam follower 657 engaged with a cam slot 658 in a cam plate 659 that is fast to and vertically reciprocable with rail block 640, as shown best in FIGURES 53, 54, 56 and 57.

It will be apparent, therefore, that as the work operator 300, rail blocks 640 and cam plates 659 move up and down, their vertical motion is translated into a horizontal sliding movement of the cam follower plates 655, to the right as seen in FIGURES 54 to 59 on the upstroke and to the left on the downstroke. As the plates 655 and their rollers 653 move to the right during the upstroke, they carry with them, to the right, the slide cams 650 until the oblique edges 660 thereon abut complementary edges 661 on the outwardly bent portions at the right ends of reset links 647. The links 647 and slide cams 650 are at all times retained at the same elevation relative to one another by horizontal sliding engagement of ears 651 on links 647 with recesses 652 in slide cams 650 and the said members 647 and 650 are, up to the time of abutment between edges 660 and 661, resiliently restrained against downward movement by means of tension springs 662 anchored on studs 663 in stationary rear and front end plates 608 and 609 and hooked into suitable holes in the reset links 647, as shown in FIGURES 54 and 56 to 59.

As the upstroke of the work operator 300 continues and the slide cams 650 can no longer move to the right with cam follower plates 655 due to abutment of edges 660 and 661, the rollers 653 on cam follower plate 655 move along angular slots 654 from the position shown in FIGURE 56 to that shown in FIGURE 57 to depress the slide cams 650 and thereby also reset links 647. Thus it follows that after some delay while the slide cams 650 slide over links 647, the links 647 carry cross keys 646 and therefore reset bars 644 down during the upstroke of the work operator, thereby to return Bowden-actuated set-up blanks 622 and incidentally also Bowden ends 631 to the signal-receptive position, shown in FIGURES 63 and 64, by engagement of ledges 645 thereon with the bottom edges of the descending reset bars 644 while the associated punches 626 are elevated by the work operator 300 by way of rail blocks 640, side rails 638, lift bars 629 and notch-engaged flippers 624.

It will also be apparent, of course, that during the succeeding downstroke of the work operator 300, the cam plates 659 will force the cam follower plates 655 to the left, as seen in FIGURES 54 to 59, the slide cams 650 up and to the left, and the reset links 647 up, thereby to elevate the reset bars 644 to the positions shown in FIGURES 63 to 65.

In order to make it possible to cancel out, at will, signals transmitted by Bowden ends 631, as for example when it is desired to punch a card in response to signals received from a sensor only when the sensed card has a perforation in a preselected location, the punch assembly 600 is provided with a quick reset device. This allows the punch assembly to operate in the manner described only if a special qualifying signal is received. If such a signal is not received, the quick reset device retracts all set-up blanks 622 that have been actuated by signals from Bowden ends 631 before the corresponding flippers 624 have been engaged in their respective notches 636, and thereby completely avoids punching on that upstroke.

To this end, the key 646 at the rear end of the assembly 600 adjacent rear end plate 608 is, unlike key 646a at the front end, provided with stud 664 pivotally carrying a latch 665, a second stud 666 carrying a rocking link 667, projections 668 and 669 for guiding a first selector slide 670, and projections 671 and 672 for guiding a second selector slide 673, as shown best in FIGURES 60 to 62, and cam stop hooks 674 are made fast to slide cams 650, as shown in FIGURES 54 to 62.

When the qualifying signal referred to previously is received, as manifested by an upward movement of Bowden end 675, it pushes against a toe 676 of a link 677 to rotate the link clockwise about a pivot 678 on rear end plate 608 from the position shown in FIGURE 62 to that shown in FIGURE 61. A bent finger 679 on link 677 slidably engages a vertical slot in selector slide 670 to retract it to the right, as seen in FIGURES 61 and 62, against the tension of a spring 680 until the latch 665 engages a ledge 681 on the slide 670 to lock it into the position shown in FIGURE 61. At the same time, the rocking link 667, engaged at its ends in notches on the slides 670 and 673, is rotated clockwise to retract slide 673 to the left.

It will be apparent, therefore, that when the link 677 is actuated by the Bowden end 675, the selector slides 670 and 673 will be retracted to and locked in the position shown in FIGURE 61 so that the depending fingers 682 and 683 on slides 670 and 673, respectively, move out of the notches 684 of the cam stop hooks 674, thus permitting slide cams 650 to move to the right, as seen in FIGURES 54 to 59, with cam follower plates 655 before depressing the slide cams 650 and therefore also the reset links 647 during the upstroke of the work operator 300 and generally to permit the flippers 624 corresponding to actuated set-up blanks 622 to be engaged by the notches 636 of the lift bars 629 and therefore to complete the punching operation at the top of the upstroke.

When the reset links 647 descend, as previously described, they also carry with them the cross key 646 and therefore the assembly of selector slides 670, 673, latch 665 and rocking link 667. As this assembly descends from the position shown in FIGURE 61 to that shown in FIGURE 62, the lower arm of the latch 665 is cammed for clockwise rotation against a stud 685 on rear end plate 608. As descent continues and the latch 665 is rotated clockwise due to the action of stud 685, the latch is released from engagement with ledge 681 on the selector slide 670 whereupon the spring 680 moves the slide 670 to the left and slide 673 to the right, i.e., to the position shown in FIGURE 62, so that the fingers 682 and 683 reengage the cam stop hooks 674 by entering their notches 684 and the link 677 is in position to receive another qualifying signal from Bowden end 675.

It will be apparent, therefore, that unless another qualifying signal is received and transmitted by the Bowden end 675 to the link 677, the cam stop hooks 674, and therefore slide cams 650, will be restrained against movement to the right, as seen in FIGURES 54 to 59, with cam follower plates 655 at the beginning of the upstroke of the work operator 300. As a result, the rollers 653 on cam follower plates 655 in their movement to the right will, due to their engagement with the angle slots 654, depress the slide cams 650 at the beginning of the upstroke, consequently also depressing reset links 647 and therefore cross keys 646 and 646a and reset bars 644.

Since there are spaces between the notches 636 and points 635 of the flippers 624 associated with the previously actuated set-up blanks 622 and the lift bars 629 carrying the notches 636 will not begin their upstroke until the rail blocks 640 make contact with the side rails 638 in the latter portion of the upstroke of the work operator, the early descent of the reset bars 644 gives the lower edges thereof an opportunity to engage the ledges 645 on actuated set-up blanks 622 and thereby to depress them before the associated flippers 624 are engaged by the notches 636. As the set-up blanks 622 are lowered by the reset bars 644 they are pivoted clockwise due to the cooperative action of slots 627 and studs 628, thus permitting the flippers 624 to rotate counterclockwise and out of the way of notches 636 due to movement to the right, as seen in FIGURES 63 to 65, of the bent ears 623 and the action of springs 633. As a result, all of the signals of the Bowden ends 631 are effectively nullified when a qualifying signal is not received by way of Bowden end 675.

It is often desirable to operate the punch assembly without requiring a qualifying signal to be transmitted to it by way of Bowden ends 675 in order to punch cards in the manner signaled by Bowden ends 631. This can be accomplished by omitting the selector slides 670, 673 and associated parts, or by inserting a locking pin through the vertical slot in the selector slide 670 that is occupied by the bent finger 679 of the link 677 and threading it into a tapped hole 686 in the cross key 646, as shown best in FIGURE 60. It will readily be apparent that this procedure will lock the selector slides 670 and 673 in the position illustrated in FIGURE 61 so that the fingers 682 and 683 will not engage cam stop hooks 674 and thus permit slide cams 650 to move to the right with cam follower plates 655 at the beginning of the upstroke of the work operator 300 before depressing reset links 647 and therefore reset bars 644.

Card Return

The card return mechanism illustrated schematically at 700 in FIGURES 1, 3 and 5 and in more detail in FIGURES 69 to 74 is designed to accept the cards after they have passed through the operating section of the basic unit at the work table level, and any auxiliary units attached thereto, and to move these cards down for feeding to a conveyor mechanism ultimately depositing the cards in a stacker 800. In order that the signal sensed in the sensing station be properly utilized in the selective stacking of any particular card, it is extremely important that each card be transported to the stacker mechanism 800 at exactly the right time and that therefore there be no slippage while the card is transferred from one conveying mechanism to another by the card return unit 700.

It is the purpose of the card return 700, therefore, to take the cards individually from the last operating section of the basic unit or of the last auxiliary unit in a series of units and to deliver them in timed relation to the conveyor mechanism for transportation to the stacker. This must be done without injuring the cards or permitting them to be displaced from their transverse positions relative to the direction of advancement.

Generally, the cards advancing over the work table are, in the embodiment illustrated in FIGURES 69 to 74, nipped between two pairs of nip rollers 701 and 702, transferred to between two belts 703 and 704 for movement around a timing sprocket 705 downwardly along a convexly curved backing plate 706 around an idler sprocket 707 and out of the card return unit 700 between nip rollers 708 and 709 for discharge to the conveying means for the stacker unit 800, as best seen in FIGURE 71.

The card return unit 700 is secured to the right end of the basic unit 100, in the embodiment shown, by any suitable locating and fastening means such that a drive shaft 710, mouted for rotation on a support plate 711 secured to side frame members 712 and an intermediate frame member 712a will be in alignment with the main drive shaft 121 of the basic unit so that a coupling member 713 on the shaft 710 can be coupled to the coupling member 136 by pins or the like 714.

The drive is transmitted from the shaft 710 to the lower nip rollers 702 by way of miter gears 715, shaft 716 journalled for rotation in the frame members 712, friction wheels 717 fast to the shaft 716 and intermediate rollers 718. To insure positive driving of the lower nip rollers 702 from the friction wheels 717 by way of the intermediate rollers 718, the intermediate rollers 718 are mounted on a shaft 719 supported in L-shaped slots 720 and spring urged against the friction wheels 717 and the lower nip rollers 702 by the action of springs 721 secured to posts 722. The L-shaped slots 720 are located in, and the spring posts 722 are mounted on the frame members 712. The upper nip rollers 701 are frictionally driven by the lower nip rollers 702 which are mounted on a shaft 723 resiliently secured to the frame members 712 by means of leaf springs 724 and block members 725.

In the event the card return unit 700 is attached to an auxiliary unit across which the primary record cards move and the mechanism for conveying the cards across the auxiliary unit is one that intermittently advances the cards by means including an intermittently rotating roller represented in phantom in FIGURE 71 by the reference numeral 726, the nip rollers 701 and 702 are advantageously also given an intermittent rotating motion by driving them from the rollers 726 of the auxiliary unit instead of from the drive shaft 10. This is readily accomplished by moving the shaft 719 for the intermediate rollers 718 to the upper ends of the L-shaped slots 720 and hooking the springs 721 onto posts 727 so that the peripheries of the intermediate rollers 718 will be urged into simultaneous contact with the peripheries of the lower nip rollers 702 and the intermittently rotating rollers 726.

From between the nip rollers 701 and 702 the record cards are inserted between the belts 703 and 704. The belt 703 is a timing belt geared to the timing sprocket 705 which is fast to the shaft 716. The timing belt 703 slides downwardly over the convexly curved backing plate 706 mounted on frame member 712a and passes around the idler sprocket 707 which is advantageously mounted for vertical adjustment in a slot 728 of the frame member 712a. The belt 704 is frictionally driven by contact with the timing belt 703 and passes successively over the timing sprocket 705 and idler sprocket 707 while in contact with the timing belt 703 and thence around nip roller 709, an idler roller 729, a tension roller 730 and upper spacing rollers 731 and 732.

The tension roller 730 is mounted between bell cranks 733 pivoted at 734 and subject to the tensioning influence of a spring 735. The upper end of the spring 735 is connected to small bell cranks 736 pivoted for independent articulation at 737 and carrying the roller 709 to equalize the pressure of contact between the belt 704 and a pair of rubber tires 738 around the roller 708 at the point of exit, the nip roller 708 being rotatable on a stud 739 mounted on frame member 712a, as shown best in FIGURE 71A.

In the upper portion of the card return unit 700, as shown best in FIGURES 69 to 72, the upper nip rollers 701 are mounted for rotation on cantilever bar members 740 secured to a cross brace 741, and the spacing rollers 731 and 732 for the belt 704 are rotatably mounted on studs 742 and 743 on a plate 744 likewise fastened to cross brace 741. In order to make the belt 704 track properly, the stud 742 is adjustably secured to the plate 744 by means of screws 745 and collar 746 so as to permit tilting of the axis of the roller 731 to a position most conducive for guiding the belt 704 into the proper tracking path.

It will be noted that from the time a card is gripped between the belts 703 and 704 until it is nipped between the tires 738 on the roller 708 and the belt 704 while passing over the roller 709, the cards are constantly curved over either the peripheries of the timing sprocket 705 or idler sprocket 707 or the curved surface of the backing plate 706. As a result, there is always a positive pressure between the belts 703 and 704 to assure accurately timed conveyance of the card through the unit.

To assist in conducting the cards around the idler sprocket 707 in the lower portion of the card return unit 700 prior to delivery, a series of parallel guide plates 747 and 748, shown best in FIGURES 70, 71, 73 and 74, are provided. The upper guide plates 747 are secured to the frame members 712 by suitable studs 749 and spacers 750 while the lower parallel guide plates 748 are fastened by means of studs 751 and spacers 752 to a lower frame member 753 supported by cross piece 754 secured to side frame members 712. As seen particularly in FIGURE 74, the lower contour 755 of the upper guide plates 747 and the upper contour 756 of the lower guide plates 748 are such as to form a curved and narrowing passage 757 for the cards as they approach the exit zone.

*Stacker*

The stacker mechanism indicated generally at 800 is located in the lower portion of the basic unit 100 between the second and third bulkheads 105 and 106 and is driven from a drive pulley 802 by way of belt 138 which in turn is driven from pulley 137 on the drive shaft 121 and is maintained under tension by means of tensioning idler pulley 803, as illustrated in FIGURES 1, 3, 5 and 10.

The function of the stacker is to receive the record cards that have travelled through the basic unit, the card return and across any auxiliary units and, in response to signals stored in a memory wheel and usually, but not necessarily, received from the sensor, to sort the cards into two or more stacks. When card sorting is not desired, they are of course all collected in a single stack.

The pulley 802 drives the main stacker cam shaft 801 at a speed of one revolution per cycle. The shaft 801 is supported for rotation in bearing brackets 804, as shown best in FIGURE 76. The cam shaft carries four identical but 90° displaced cams 805a, b, c and d, a spiral worm gear 806, a miter gear 807 and a coupling member 808 at the right end. The miter gear 807 drives a companion miter gear 809 for conveyor driving sprockets 810 by way of shaft 811. The coupling member 808 is provided for extending the effective length, if desired, of the cam shaft 801 to drive similar stackers in auxiliary units that may be used in conjunction with the basic unit 100.

The sprockets 810 in cooperation with idler pulleys 812 carry two timing belts 813 provided with pusher assemblies 814 and sprocket engaging teeth 815, shown best in FIGURES 85 and 86, that engage the sprockets 810 for accurately timed movement in relation to the remainder of the apparatus. As seen in FIGURE 79, the sprockets 810 are so positioned that the pusher assemblies 814 on the belts 813 will engage the trailing edge of a card delivered slightly in advance of the pusher assemblies from between the nip rollers 708 and 709 of the card return 700 or from similar nip rollers in an intermediate auxiliary unit. It is the function of the pusher fingers 814 on the belt 813 to push a card through the stacker unit toward the left, as seen in FIGURES 75 to 79, until the card is selectively collected in one of the stacker stations 816a, b, c and d and to do so in accurately timed relation with the other parts of the machine at a linear speed of one station per quarter cycle, i.e., the pusher assemblies move from one station 816 to the next while the cam shaft 801 turns 90°.

The framework of the stacker comprises two transverse rods 817 secured at one end to the front longitudinal brace 107, shown in FIGURES 5, 10 and 75, and at the other end to the rear longitudinal brace 108, shown in FIGURES 10 and 78, and two intermediate longitudinal braces 820, shown in FIGURES 75, 78, 79, 80 and 81, which carry the bearing brackets 804. Between the main stacker belt sprockets 810 and 812 the rods 817 support a pair of U-shaped plates 821, the upturned edges 822 of which form four rails for the support of the cards advancing through the stacker. The rails 822 have upwardly sloping cam surfaces 822a at the feed or right end of the stacker unit, as best shown in FIGURE 79, for engaging the incoming cards and elevating them above the level of the belts 813, as shown in FIGURE 80.

In order selectively to pick the record cards off the rails 822 as they are pushed to the left by the pusher fingers 814 on the belts 813 and to stack them, card collecting units are provided at two or more stacker stations 816, four being shown in the drawing and only one being required when sorting is not desired. Each collecting unit is self-contained and includes a housing for supporting the various parts of the unit, an elevator for picking cards off the rails 822, a retaining device for supporting stacked cards while the elevator moves up and down, and a guide for keeping the stacked cards in alignment. Inasmuch as the card collecting units are identical, with one minor exception to be mentioned, the following description of one will apply to all.

As shown best in FIGURES 75, 80 and 81, the housing for each collecting unit comprises parallel upright wall members 823 and 824 supported on longitudinal braces 107 and 108 and connected by cover members 825.

Bifurcated parallel motion cranks 826 are mounted for rotation on pins 827 between the wall members 823 and 824, one at each end. Arms 830 of cranks 826 are pivotally connected to a transversely reciprocable tie rod 831 carrying a bracket 832 at one end, the rods 831 at the stacker stations 816a and 816d being bent, as shown in FIGURES 75 and 79, at 831a and 831d to avoid the sprockets 810 and 812 for the belts 813. The bracket 832 carries a cam follower 833 spring urged by a spring 834 secured at one end to a stud 835 to follow the contour of cam 805, as shown best in FIGURES 80, 81 and 83, so that the rod 831 will be reciprocable between the extreme right position shown in FIGURE 80 and the extreme left position shown in FIGURE 81.

The other arms 837 of the cranks 826 are pivotally connected to the extremities of an elevator bar 839 in order to raise the bar when the rod 831 is moved to the right, as seen in FIGURE 80, and to lower the bar when rod 831 is moved to the left, as seen in FIGURE 81. One end of the bar 839 is curved as shown to avoid hitting the central portion of bell crank 826.

The elevator bar 839 carries three polished shoe plates 840 for guiding cards onto the elevator bar when it is in the lower pick-up position shown at station 816a and for keeping the cards on the rails 822 when it is in the upper position shown at stations 816b, c and d. In the embodiment shown, the shoe plates 840 are carried on three of five shoe sections 841, the intermediate shoe sections being utilized as auxiliary guides for the cards. The elevator bar 839 also carries dependent and bevelled fingers 842 for keeping cards advancing beneath the elevator bar 839 centered on the rails 822, and a stop 843 to prevent the elevator bar 839 from descending to the lower position under circumstances to be described. Advantageously, the upper surface of the elevator bar 839 is also provided with a shallow recess 844 to avoid contact of the bar 839 with the portion of the cards bearing printed matter and thus to minimize smudging thereof.

It will be apparent, therefore, that as a card advances to the left, as seen in FIGURE 79, over the rails 822 due to urging by the pusher assemblies 814 on the belts 813, they will slide under the polished shoe plates 840 of the elevator bars 839 and be centered, if necessary, on the rails by the dependent bevelled alignment fingers 842 until they are picked up by the shoe plates 840 of an elevator bar 839 that is in the lower pick-up position, illustrated by way of example at station 816a. The card thereupon slides up and onto the depressed elevator bar 839 and is pushed against the wall member 824 by the pusher assemblies 814, which thereupon pass beneath the elevator bar 839, being momentarily depressed by the card against the action of a spring 845, as best shown in FIGURES 85 and 86. The elevator bar 839, having thus intercepted the card, rises to its uppermost position as the shaft 801 and the cam 805 make a quarter turn.

It will also be apparent, inasmuch as the elevator bars 839 are actuated by cams 805 which are identical to one another but sequentially displaced 90° from one another, i.e., cam 805b is displaced 90° relative to cam 805a, cam 805c is displaced 90° relative to cam 805b and 180° relative to cam 805a, etc., that each of the elevator bars 839 will have an opportunity to descend to the pick-up position once for each revolution of the drive shaft 801 and further that, if allowed to descend, they would reach their pick-up positions sequentially at one-quarter cycle intervals in time with the arrival of a card advanced by the pusher assemblies 814.

In order that an elevator bar 839 which has already picked up a card may pick up another card without interference from the card or cards already picked up, means are provided in each collecting unit to support a stack of cards whenever an elevator bar 839 is actuated to descend and pick up another card. The mechanism for accomplishing this includes, as best shown in FIGURES 75, 77, 78, 79, 80, 81, 82 and 85, support fingers 846 on slides 847 in slots 848 of the upright wall members 823 and 824. The slides 847 are provided with angular slots 849 engaged by studs 850 in the slots 848 so that when the slides 847 are reciprocated longitudinally, the support fingers 846 will be projected into and retracted from the space between the upright wall members 823 and 824 in which the record cards are stacked against a guide plate 851 having convexly curved feet 852 for engaging the trailing edge of a newly picked up card and preventing it from sliding back onto the rails 822 before being elevated to join the stack. The tips of the support fingers 846 are provided with knife edges 853 to avoid buckling any of the cards as the support fingers are projected into the card magazine.

In order to project the support fingers 846 into the card magazine to support the lowermost card in a stack of cards as the elevator bar 839 begins its descent to pick up another card and to retract the support fingers 846 when the elevator bar 839 returns with another card to add to the bottom of the stack, the slides 847 are provided at one of their ends with a perforated angle portion 854 engaged by studs 855 on a finger drive lever 856 pivoted on the wall members 823 and 824 at 857 and actuated for oscillation by cam follower 859 urged by spring 834 to follow the contour of the cam 805, the spring 834 having one end anchored to a stud 860 on the finger drive lever 856 and the other end, as previously described, to stud 835 on bracket 832.

It is apparent, therefore, that the cam followers 833 and 859, riding on opposite sides of the same cam 805, coact to raise and lower the elevator bar 839 and to move the card support fingers 846 into and out of card supporting position in timed relation with one another. It will also be noted that inasmuch as the support fingers in the upright wall members 823 are at a lower elevation than those in the wall members 824, the slight periodic vibration or jogging of the cards in the stack accumulated at any given station 816 will cause them to rest against and be guided in their upward movement as other cards are added from below by the guide plate 851.

The stacker therefore has the advantage of placing the first card on top of each stack and of providing ample space, due to the absence of an opposed guide plate at the high side of each stack, to permit removal of cards at will and without halting the machine. Furthermore, the inclination of the upper surface of the elevator bar 839 is such that there is a minimum of disturbance to the stack during the transition period between support thereof by the bar 839 on the one hand and by support fingers 846 on the other. The convexity of the upper surface of the bar 839 favors a bowing upward of a card thereon and minimizes the possibility of damage to the leading and trailing edges of the card as it is elevated past the support fingers 846 to join the stack.

Figure 77:
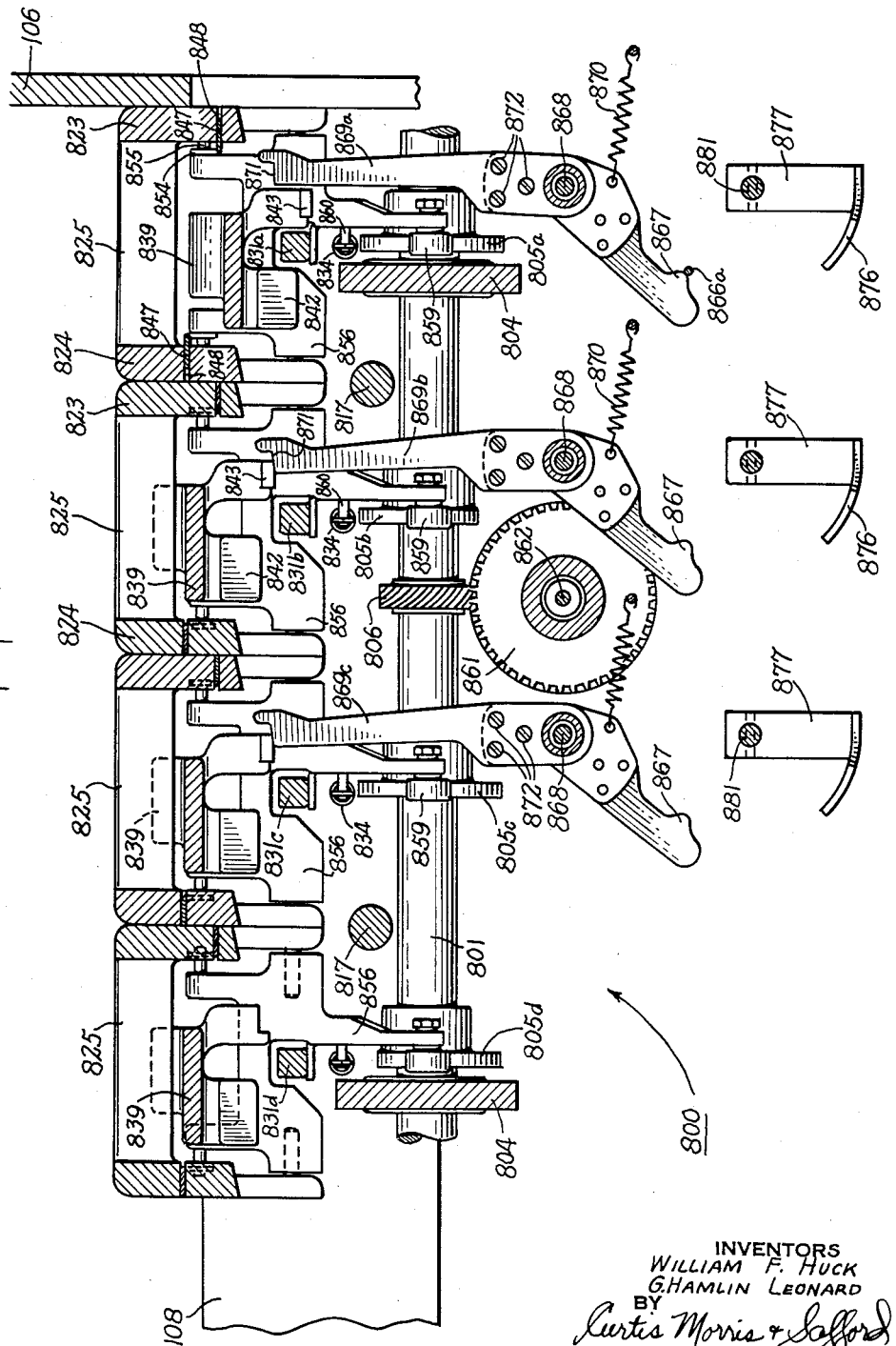

The selection of the particular station 816 in which a given card advancing along the rails 822 is to be stacked is governed by a signal received, stored and acted upon by a stacker control mechanism, best shown in FIGURES 77, 78, 79 and particularly 87 and 88.

The control group is driven from the main stacker cam shaft 801 by way of a spiral worm gear 806, a helical gear 861 on shaft 862, through pinion 863 and idler 864 which is shown, in FIGURE 78, as being in engagement with delayer wheels 865b and 865c provided for elevator bars 839b and c, respectively. A third delayer wheel 865a for the elevator bar 839a is driven by way of an idler 864a in mutual engagement with delayer wheels 865a and b. The gear ratio, in the embodiment illustrated, between the cam shaft 801 and the delayer wheels 865a, b and c is 24:1 so that the wheels make one revolution per twenty-four cycles.

No delayer wheel is shown for the elevator bar 839d in the particular embodiment described because the elevator bar 839d, being last in the series, is designed to pick up any card that has not been picked up by a preceding elevator. Consequently, the elevator bar 839d will, in the embodiment shown, move up and down with each cycle and requires no control.

Each of the delayer wheels 865 is provided with a plurality of actuating pins 866, the embodiment illustrated having twenty-four on each control wheel. It is the function of these pins which are frictionally retained by a peripheral spring 878, when displaced from their rest position in a wheel 865 to an actuating position, to make contact with a cam surface 867 of a stack selector lever 869 fulcrumed at 868 in order to pivot the upper arm thereof clockwise, as seen in FIGURE 77, against the action of spring 870 so that the upper cam surface 871 of the lever 869 will be displaced, as seen at station 816a in FIGURE 77, from the normal position of the lever 869b and c to the position of the lever 869a. By this displacement, the stop 843 on the elevator bar 839 is disengaged from the cam surface 871 and the cam follower 823 for that elevator bar 839 is permitted to follow the cam surface 805 and thus depress the elevator bar to its lower position to pick up a card. When a pin 866 does not engage a cam surface 867 the stack selector lever 869 remains in its normal position under the influence of spring 870 so that the upper cam surface 871 thereof engages the stop 843 of the corresponding elevator bar and therefore prevents the elevator from moving down to the pick-up position.

The position of the lever 869 with relation to the associated cam surface 867 is adjustable by means of screws 872. The actuating pins 866 are selectively moved into position for later actuating the lever 869 by receipt of a signal from a Bowden wire 873 acting through a Bowden end 874, spring-biased pin actuator 875 pivoted on pin 879 to displace the pin 866 to the position shown in FIGURE 88. When the wheel 865 carrying the pin 866 thus displaced has turned sufficiently to bring it into actuating contact with the cam surface 867, the signal of the Bowden cable 873 is translated into movement of the associated elevator bar 839 to the pick-up position. Upon further turning of the delayer wheel 865, the displaced pin, which has now accomplished its function, is returned to the non-operating position by engagement with a cam surface 876 mounted on a cam support 877.

Inasmuch as the basic unit of this machine is adaptable for use by itself or with one or more auxiliary units, it will be appreciated that the time and distance of travel of a given card from a sensing or other unit at the top of the basic unit back to the stacker and selector mechanism will vary. In order to compensate for such differences in time between the creation of a signal and the time of its translation into an action of the selector mechanism, a plate 880, supporting shaft 881 of the delayer wheel 865 is provided with sixty-nine equidistantly spaced and numbered holes 882, as shown in FIGURE 79.

A timing lever 883 rotatable on shaft 881 and having a Bowden receiving hole 884 and a peep hole 885 is locked to the plate 880 in any preselected angular position by inserting the signal discharging end of the Bowden cable 873 into the hole 884 and the opposite hole 882 after setting the position of the lever 883 with the aid of the peep hole 885 and the numbers on the plate 880. The Bowden cable 873 is then locked into position by sliding a spring latch 886 carried on the timing lever 883.

In order to transmit a signal from the Bowden end 874 to an actuating pin 866, the actuator 875 is generally U-shaped, as shown in FIGURE 78, and pivoted on pin 879 in the shaft 881, as illustrated in FIGURES 78 and 88. To return the actuator 875 to the at rest position shown in FIGURE 87 after delivering a signal, it carries a pin 887 movable in an enlarged hole 888 in an actuator block 889 and is spring-biased by a spring and ball assembly 890 in the actuator block to rotate the actuator 875 in a clockwise direction, as seen in FIGURES 87 and 88, about the pivot pin 879.

It will be apparent, therefore, that once Bowden 873 has been locked in hole 884 and a selected hole 882 in plate 880, the actuator 875 and the cam support 877 are in fixed relation to one another while delaying wheel 865 is free to rotate about shaft 881.

Inasmuch as the delayer wheels 865 are each driven at a speed such that one pin 866 will occupy the position of the previous pin after one cycle, it follows that the angular position of the timing lever 883 and therefore of the signal receiving mechanism with relation to the point at which the pin 866 could actuate a cam 867 determines the time interval between receipt of the signal and actuation of the elevator bar 839. It is also apparent that since the speed of travel of the card beneath the elevator bar 839 is such that it would pass beneath four elevator bars in one cycle, the angular setting of the timing lever 883*b* for elevator bar 839*b* should be one hole 882 removed from the setting of the timing lever 883*a* for the elevator 839*a* and that the setting of the timing lever 883*c* should be two holes 882 from that of 883*a*, assuming simultaneous input of pick-up signals.

*Counter Assembly*

The counter assembly 900 is an optional feature conveniently mounted on top and to the rear of the basic unit 100, as shown in FIGURES 1 and 3. It has a unique structure that enables a signal of small force from a Bowden cable to be translated into a stroke of ample power to operate one or a group of counters. It is also provided with means for resetting all or a selected portion of the counters simultaneously and has provision for accommodating an indefinite number of similar counter assemblies.

The assembly illustrated in FIGURES 89 to 96 comprises front and rear plates 901 and 902, left and right end support members 904 and 906, top and rear cover plates 907 and 909, thirty-six counters 910 of the swinging arm, ratchet type, three front cover channels 911, and a reset cover strip 912. A bracket beam 914 extends from members 904 to 906 and provides support for an upper plate 916. Three Bowden angle brackets 917 are likewise mounted between support members 904 and 906, the lower bracket 917 supporting a lower plate 919.

The Bowden angle brackets 917 are drilled, as shown at 920 in FIGURE 90, to receive the ends of Bowden cables 921, one for each counter 910. Twelve bell cranks 922, one for each counter, are pivotally mounted on a pivot pin 924 and spring urged, by means of springs 926 to rotate counterclockwise, as seen in FIGURE 90, to bear against an associated Bowden end 927.

The spring 926 for each crank 922 is fastened to crank bracket 929 fastened to an angle bracket 917. In addition to the spring 926, the crank bracket 929 also carries a pivot pin 924 for the associated bell crank 922 and, as shown best in FIGURE 95, a permanent magnet 930 for attracting to it an actuating wire 931 bent over the upright arm of its associated bell crank 922 at one end and fastened at the other end to the crank 932 of its associated counter 910.

A series of vertical counter slides 934 are mounted for vertical reciprocation opposite the magnet 930 and on vertical bent guide plates 936 fastened at the top and bottom to upper and lower plates 916 and 919. As shown best in FIGURE 94, the top of each slide 934 is provided with a hook 937 secured to a spring 939 that is anchored at 940 to urge the slide 934 against the guide plate 936 and downwardly to bear against a slide actuating tube 941.

It will be apparent, therefore, that unless a bell crank 922 is actuated to pivot clockwise, as seen in FIGURE 90, by a signal from its associated Bowden end 927, the actuating wire 931 will be held out of engagement with its associated counter slide 934 and will, therefore, not actuate the crank 932 of a counter 910. When, however, a given bell crank 922 receives a signal from Bowden end 927, it is pivoted against the action of spring 926 to move the actuating wire 931 away from the magnet 930 and into a notch 942 of the slide 934.

As the drive shaft 121 rotates from the position shown in FIGURES 89 and 90, the eccentrics 129, balanced by counter weights 944 to minimize vibration, cause the crank arms 946 to impart a vertical linear reciprocating motion to the slide actuating tube 941 guided by rails 947 on end plates 904 and 906. This in turn causes the slide 934, bottomed on tube 941 and urged against it by spring 939, to reciprocate vertically, taking the magnet-released actuating wire 931 with it by engagement with the upper surface of associated notch 942 and thus utilizing the force of the spring 939, rather than that of the signalling Bowden end 927, to actuate the crank arm 932 of the associated counter 910.

In the meantime, as soon as the Bowden end 927 permits, the bell crank is returned to its rest position under the urging of spring 926 so that the actuating wire 931 can be cammed back into contact with the associated magnet 930 by the lower cam surface of the notch 942 on the succeeding upstroke of the slide 934.

To permit individual manual adjustment of the readings of the counters 910, they are provided with knobs 950 that are readily accessible from in front of the basic unit 100, as shown in FIGURE 89. In addition, the counters 910 are resettable by engagement of their gear wheels 951 with racks 952 operable by a pinion rod 954 which may be split, as illustrated at 956 in FIGURE 89, if it is desired to avoid resetting all banks of counters at once.

To keep each rack 952 in engagement with the gear wheels 951 of the bank of counters that it serves, the rack is provided with a longitudinal groove, as shown best in FIGURE 95, slidable on a track 957 formed on the bent guide plate 936 and retained thereon by an auxiliary guide plate 959.

The pinion rod 954 is suitably journaled for rotation in bearings 960 supported on bearing brackets 961 and, at the end plates 904, 906, in a reset stop 962 in which the pinion rod 954, reduced in diameter, is freely rotatable. As shown best in FIGURES 89 and 96, the end of the pinion rod 954 is drilled to receive a pin 964, the ends of which lie in a groove in the inner face of a reset crank 966 to make the rod 954 rotatable with the crank. The extreme end of the pinion rod 954 is provided with a peripheral groove for receiving a spring clip 967 for maintaining the crank 966 on the rod.

To avoid turning the pinion rod 954 so far as to disengage it from the racks 952 and yet to insure a complete revolution of the reset gear wheels 951 for the counters 910 while taking into account the smaller pitch diameter of the pinion rod, it is necessary to limit the rotation of the pinion rod to a maximum of one plus a fraction of a revolution. This is accomplished by the reset stop 962 and stop pins 969 and 970. Pin 969 is set in and protrudes beyond the inner face of the reset crank 966 for rotation around and adjacent the arcuate surfaces 971 of reset stop 962. Pin 970 is set in and protrudes from end plate 904 to permit rotation of the reset stop from a position of engagement with the pin 970 at stop surface 972, as shown in FIGURE 96, to engagement with stop surface 974.

It will be apparent, therefore, that when the reset crank 966 is turned counterclockwise from the position shown in FIGURE 96, it will be free to turn the pinion rod 954 through mutual engagement with the pin 964 without actuating the reset stop 962 until the pin 969 has engaged the opposite side of a finger 976 and thereby rotated the reset stop until the fixed pin 970 engages the stop surface 974. On the return stroke, the pin 969 will revolve around the reset stop 962 until it reengages the finger 976 and rotates the reset stop to a position at which the stop surface 972 is in abutment with the fixed pin 970.

In order to avoid accidental manipulation of the crank 966 while any of the counters capable of being reset by movement thereof are being actuated, a lock bar 977, biased to rotate counterclockwise, is pivotally supported at 979 on the end plate 904. The lock bar 977 has a notch 980 for engaging the end of a pin 981 which also retains an operating knob 982 on the reset crank 966 and may, if desired, rest on a fixed pin 984.

It will be understood that the reset mechanism can be duplicated on the other side of the counter assembly, that all the counters in the assembly can be resettable from one side if the pinion rod is not split, or that any desired banks of counters can be made nonresettable by omitting the reset racks, the pinion rod, or both for said banks. It is also apparent, particularly from FIGURES 89, 90 and 91, that additional tiers of counters can readily be added simply by removing the top cover plate 907 and placing the additional tiers on top of the assembly shown. In this event, the vertical counter slides, for example, of the added tier or tiers will be spring urged down onto the top of the counter slides 934 shown in the drawing and, therefore, be effectively operable by vertical movement of the slide actuating tube 941.

It will also be understood that while the machine described specifically by way of illustration of the best mode now contemplated, the invention is not limited to a machine containing all of the subcombinations described or to a combination or subcombination that is necessarily dependent upon Bowden-type cables for signal transmission. Thus, it is within the scope of the invention to use any one or more of the card feed and, if desired, card interrupt mechanism, the sensor, the punch, the card return, the stacker assembly, and the counter assembly in a machine capable of performing other functions by other means. It is also within the scope of the invention to use solenoid-actuated electrical circuits or other signal transmitting means in place of or in addition to the Bowden cables referred to in the description; to multiply, coordinate or store such signals whenever necessary by known means; to transmit signals from one or more component mechanisms or assemblies to one or more other component mechanisms or assemblies; to receive signals from external sources; and to transmit signals to external destinations by known means; all as indicated in the accompanying self-explanatory flow sheet, FIGURE 97.

These and other modifications of the machine embodying the invention, as well as other variations, applications and uses of the several subcombinations of the invention described will readily be apparent to those skilled in the art upon reading the description, and are intended to be included within the scope of the invention as set forth in the claims.

We claim:

1. In a machine of the class described, card feed means comprising a longitudinally reciprocable carriage carrying concave slats for supporting the cards in a magazine above the slats and spaced picker fingers extending above the slats a distance equal to a fraction of the thickness of a card for engaging the bottom card in the magazine and advancing it to a transfer station in a card path during a forward stroke of the carriage, said slats and picker fingers being pivotally mounted on the carriage to rock about axes extending longitudinally of the path of movement of the carriage to adapt the slats and pickers to conform to the curvature of the cards, pivotally mounted shoes adjacent the magazine and resting on the slats, said shoes having a profile cooperative with the curvature of the slats for passing said single card and holding other cards in the stack, card gripping assemblies reciprocable with the carriage and slidable in longitudinal rail members at the sides of the card path for frictionally engaging an advanced card during the return stroke of the carriage and for intermittently advancing said card during the forward strokes thereof, and stops in the card path adjacent the transfer station for engaging the trailing edge of a card advanced to said station and holding it against rearward movement for frictional engagement thereof by said reciprocable card gripping assemblies on the return stroke thereof.

2. Card feed means for a machine of the class described comprising a longitudinally reciprocable carriage carrying means for engaging the bottom card in a stack of cards and advancing it to a transfer station during a forward stroke of the carriage, means for passing said bottom card and holding other cards in the stack, and means mounted on and longitudinally reciprocable with the carriage for engaging a card advance to the transfer station for further advancement along a card path.

3. The card feed means set forth in claim 2, wherein the means for engaging the bottom card comprises a card supporting slat and spaced picker fingers extending above the slat a distance less than the thickness of a single card and adapted to engage the trailing edge thereof.

4. The card feed means set forth in claim 2, wherein the means for engaging the bottom card comprises card supporting slats pivotally mounted on the carriage to conform to the curvature of the bottom card and spaced picker fingers movable with the slats, extending above them a distance equal to a fraction of the thickness of a card, and positioned on the carriage to engage the trailing edge of the lowest card at the beginning of the forward stroke of the carriage.

5. The card feed means set forth in claim 2, wherein the means for engaging the bottom card comprises card supporting slats, spaced picker fingers adjacent the slats and extending above them a distance no greater than the thickness of a card, the slats having shallow relief areas between the picker finger, and a card weight for weighting the card in the stack, said weight having projections on the underside thereof complementary to said relief areas for urging the bottom card into positive engagement with the slats and the picker fingers.

6. The card feed means set forth in claim 2, wherein the means for passing the bottom card and holding others in the stack comprises shoe means adjacent the stack of cards and fast against reciprocation with the carriage but pivotally free to conform to and relatively slidable over a card support on the carriage, said shoe means having a profile permitting passage of a single card between it and said support but abutting the leading edge of a card higher in the stack.

7. The card feed means set forth in claim 2, wherein the means for passing the bottom card and holding others in the stack comprises shoes having squared toes adjacent the stack of cards and fast against reciprocation with the carriage, and card support slats reciprocable with the carriage under the shoes, said slats having concave surfaces extending under the toes of the shoes and flat surfaces at the forward ends for supporting the shoes when the carriage is retracted to a card pick-up position, the curvature of the slats being just sufficient to provide a space between one and two card thicknesses between the toes and the corresponding slats.

8. The card feed means set forth in claim 2, wherein the means on the carriage for engaging a card advanced to the transfer station comprises a card gripping assembly reciprocable in longitudinal rail members at the sides of the card path and frictionally engaging the end portions of the cards to advance them as the carriage advances.

9. The card feed means set forth in claim 2, wherein the means for engaging a card advanced to the transfer station comprises a card gripping assembly on the carriage and slidable in longitudinal rail members at the sides of the card path, said assembly comprising rail engaging slide strips, base strips fast to the slide strips, intermediate pressure strips, and means urging the pressure strips against one of said other strips for frictionally engaging card edges therebetween.

10. The card feed means set forth in claim 2, wherein the means for engaging a card advanced to the transfer station comprises a card gripping assembly on the carriage and slidable in longitudinal rail members at the sides of the card path, said assembly comprising rail engaging slide strips, base strips fast to the slide strips, intermediate pressure strips, and means urging the pressure strips against said slide strips for frictionally engaging card edges therebetween, the ends of said card engaging strips nearest the transfer station having converging surface portions for guiding card edges between them.

11. The card feed means set forth in claim 2, wherein the means for engaging a card advanced to the transfer station comprises a card gripping assembly mounted on the carriage and slidable in longitudinal rail members at the sides of the card path, and spring-biased stops in the card path adjacent the transfer station for engaging the trailing edge of a card advanced thereto and holding it there for engagement with the card gripping assembly.

12. The card feed means set forth in claim 2, wherein the means for engaging a card for advancement along a card path comprises a card gripping assembly mounted on the reciprocating carriage and slidable in longitudinal rail members at the sides of the card path, and spring-biased stops in the card path adjacent the transfer station and successive work stations for engaging the trailing edge of a card advanced thereto and holding it there during return strokes of the said gripping assembly.

13. The card feed means set forth in claim 2, wherein the carriage comprises separable upper and lower portions spring-biased to reciprocate as a unit, the upper portion carrying means for engaging the bottom card in a stack of cards and advancing it to a transfer station during a forward stroke of the carriage, and the lower portion carries the means for engaging a card advanced to the transfer station for further advancement along a card path.

14. In a machine of the class described having card feed means comprising a longitudinally reciprocable carriage carrying first means for engaging the bottom card in a stack of cards and advancing it to a transfer station during a forward stroke of the carriage, and second means engaging the card advanced to the transfer station and for further advancing said card to successive stations in a card path during the forward strokes thereof, a card holding means comprising fingers insertable into the card path adjacent a station therein for engaging the leading edge of a card and holding it against advancement along the card path during forward movement of the second means on the carriage, rocker shafts carrying said fingers for movement thereof into and out of their card holding positions, and means for momentarily actuating said rocker arms and fingers.

15. In a machine of the class described having card feed means comprising a longitudinally reciprocable carriage carrying first means for engaging the bottom card in a stack of cards and advancing it to a transfer station during a forward stroke of the carriage, and second means engaging the card advanced to the transfer station and for further advancing said card to successive stations in a card path during the forward strokes thereof, a card holding means comprising fingers insertable into the card path adjacent a station therein for engaging the leading edge of a card and holding it against advancement along the card path during forward movement of the second means on the carriage, rocker shafts carrying said fingers for movement thereof into and out of their card holding positions, a link connecting the rocker shafts, a latch for locking said link against actuation of the rocker arms and means for releasing said latch and permitting the link to actuate said rocker arms and fingers.

16. In a machine of the class described having card feed means comprising a longitudinally reciprocable carriage carrying first upper means for engaging the bottom card in a stack of cards and advancing it to a transfer station during a forward stroke of the carriage, and second lower means engaging the card advanced to the transfer station and for further advancing said card to successive stations in a card path during the forward strokes thereof, card holding means comprising stop fingers insertable upon signal into the card path adjacent a station therein for engaging the leading edge of a card and holding it against advancement along the card path during the succeeding forward stroke of the second means of the carriage, rocker shafts carrying said stop fingers for movement thereof into and out of their card holding positions, and means for momentarily actuating said rocker arms and stop fingers.

17. In a machine of the class described having card feed means comprising a longitudinally reciprocable carriage carrying a first upper portion for engaging the bottom card in a stack of cards and advancing it to a transfer station during a forward stroke of the carriage, and a second lower portion engaging the card advanced to the transfer station and for further advancing said card to successive stations in a card path during the forward strokes thereof, card holding means comprising fingers in the card path adjacent a station therein for engaging the leading edge of a card and holding it against advancement along the card path during the forward strokes of the second lower portion of the carriage, rocker shafts carrying said fingers for movement thereof into and out of their card holding positions, and means for momentarily actuating said rocker arms and fingers to move out of the card path and release a card engaged thereby for movement to the next station in the card path.

18. In a machine of the class described having card feed means comprising a longitudinally reciprocable carriage having separable upper and lower portions spring-biased to reciprocate as a unit, the upper portion carrying first means for engaging the bottom card in a stack of cards and advancing it to a transfer station during a forward stroke of the carriage, and the lower portion of the carriage carrying second means for engaging the card advanced to the transfer station for further advancing said card to successive stations in a card path during the forward strokes of the lower portion of the carriage, card holding means comprising a resilient latch actuating lever for locking and releasing the upper portion of the carriage adjacent the end of its return stroke, a rocker shaft carrying said resilient latch actuating lever for movement thereof into and out of carriage locking positions, and means for actuating said rocker arms and resilient latch actuating lever momentarily to lock the upper portion of the carriage.

19. In a machine of the class described having card feed means comprising a longitudinally reciprocable carriage having separable upper and lower portions spring-biased to reciprocate as a unit, the upper portion carrying first means for engaging the bottom card in a stack of cards and advancing it to a transfer station during a forward stroke of the carriage, and the lower portion of the carriage carrying second means for engaging the card advanced to the transfer station for further advancing said card to successive stations in a card path during the forward strokes of the lower portion of the carriage, card holding means comprising a resilient latch actuating lever for locking and releasing the upper portion of the carriage adjacent the end of its return stroke, rocker shafts carrying said resilient latch actuating lever for movement thereof into and out of carriage locking positions, and means for actuating said rocker arms and resilient latch actuating lever momentarily to release the upper portion of the carriage.

20. In a machine of the class described having card feed means comprising a longitudinally reciprocable carriage having separable upper and lower portions spring-biased to reciprocate as a unit, the upper portion carrying first means for engaging the bottom card in a stack of cards and advancing it to a transfer station during a forward stroke of the carriage, and the lower portion of the carriage carrying second means for engaging the card advanced to the transfer station for further advancing said card to successive stations in a card path during the forward strokes of the lower portion of the carriage, card holding means comprising fingers movable into and out of the card path adjacent a station therein, a resilient latch actuating lever for locking the upper portion of the carriage adjacent the end of its return stroke, rocker shafts carrying said fingers and said resilient latch actuating lever for movement thereof into and out of their respective card holding and carriage locking positions, and means for actuating said rocker arms, fingers and resilient latch actuating lever momentarily to move the fingers into the card path for holding a card at a station against advancement to the next station during the next forward movement of the lower portion of the carriage and momentarily to lock the upper portion of the carriage against forward movement thereof with the lower portion of the carriage.

21. In a machine of the class described having card feed means comprising a longitudinally reciprocable carriage having separable upper and lower portions spring-biased to reciprocate as a unit, the upper portion carrying first means for engaging the bottom card in a stack of cards and advancing it to a transfer station during a forward stroke of the carriage, and the lower portion of the carriage carrying second means for engaging the card advanced to the transfer station for further advancing said card to successive stations in a card path during the forward strokes of the lower portion of the carriage, card holding means comprising fingers movable into and out of the card path adjacent a station therein, a resilient latch actuating lever for locking the upper portion of the carriage adjacent the end of its return stroke, rocker shafts carrying said fingers and said resilient latch actuating lever for movement thereof into and out of their respective card holding and carriage locking positions, and means for actuating said rocker arms, fingers and resilient latch actuating lever momentarily to move the fingers out of the card path for releasing a card for advancement to the next station during the next forward movement of the lower portion of the carriage and momentarily to release the upper portion of the carriage for forward movement thereof with the lower portion of the carriage.

References Cited in the file of this patent

UNITED STATES PATENTS

| | | |
|---|---|---|
| 1,312,807 | Powers | Aug. 12, 1919 |
| 1,710,691 | Carroll | Apr. 30, 1929 |
| 1,847,533 | Lasker | Mar. 1, 1932 |
| 2,032,805 | Lake | Mar. 3, 1936 |
| 2,040,500 | Sadgebury et al. | May 12, 1936 |
| 2,097,065 | Holzner | Oct. 26, 1937 |
| 2,275,396 | Johnson | Mar. 3, 1942 |
| 2,320,836 | Tauschek | June 1, 1943 |
| 2,484,114 | Page et al. | Oct. 11, 1949 |
| 2,558,941 | Durfee | July 3, 1951 |
| 2,704,186 | Braun | Mar. 15, 1955 |
| 2,705,142 | Gollwitzer | Mar. 21, 1955 |
| 2,723,118 | Malmros et al. | Nov. 8, 1955 |
| 2,823,788 | Chase | Feb. 18, 1958 |
| 2,866,550 | Nelson et al. | Dec. 30, 1958 |